(12) United States Patent
Gu

(10) Patent No.: US 9,451,822 B2
(45) Date of Patent: Sep. 27, 2016

(54) COLLAPSIBLE SHELL COVER FOR COMPUTING DEVICE

(71) Applicant: Microsoft Technology Licensing, LLC, Redmond, WA (US)

(72) Inventor: Jiawei Gu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 156 days.

(21) Appl. No.: 14/516,228

(22) Filed: Oct. 16, 2014

(65) Prior Publication Data

US 2015/0293606 A1    Oct. 15, 2015

(51) Int. Cl.
```
G06F 1/16      (2006.01)
A47B 23/04     (2006.01)
F16M 11/04     (2006.01)
F16M 11/10     (2006.01)
F16M 11/38     (2006.01)
F16M 13/00     (2006.01)
```

(52) U.S. Cl.
CPC ........... *A47B 23/044* (2013.01); *F16M 11/041* (2013.01); *F16M 11/10* (2013.01); *F16M 11/38* (2013.01); *F16M 13/00* (2013.01)

(58) Field of Classification Search
CPC ...... G06F 1/16; G06F 1/1603; G06F 1/1628; G06F 1/1662; G06F 1/1666
USPC .................................................... 361/679.41
See application file for complete search history.

(56) References Cited

U.S. PATENT DOCUMENTS

| | | | |
|---|---|---|---|
| 4,823,283 A | 4/1989 | Diehm et al. | |
| 5,045,997 A | 9/1991 | Watanabe | |
| 5,046,001 A | 9/1991 | Barker et al. | |
| 5,168,426 A | 12/1992 | Hoving et al. | |
| 5,189,732 A | 2/1993 | Kondo | |
| 5,258,748 A | 11/1993 | Jones | |
| 5,297,032 A | 3/1994 | Trojan et al. | |

(Continued)

FOREIGN PATENT DOCUMENTS

| | | |
|---|---|---|
| CN | 1512301 | 7/2004 |
| CN | 1650250 | 8/2005 |

(Continued)

OTHER PUBLICATIONS

"International Search Report and Written Opinion", Application No. PCT/CN2014/089867, Jun. 26, 2015, 15 pages.

(Continued)

*Primary Examiner* — Anthony Q Edwards
(74) *Attorney, Agent, or Firm* — Sandy Swain; Micky Minhas

(57) ABSTRACT

A collapsible shell cover for a computing device having a holder portion, an input device portion, and kickstand portion is described that is configured to support a computing device at a viewing angle in an open configuration and to form a shell cover for the computing device in a collapsed configuration. The holder may receive the computing device between edge members having support lips for support. The input device and kickstand are rotatably secured to the holder at opposing ends of the edge members. In the open configuration, the holder is positioned at the viewing angle, the kickstand is rotated for support at a rear of the holder, and the input device is rotated to extend outward from a front of the holder. In the collapsed configuration, the holder, input device, and kickstand portion are aligned in a common plane to form the shell cover for the computing device.

20 Claims, 12 Drawing Sheets

(56) References Cited

U.S. PATENT DOCUMENTS

| | | |
|---|---|---|
| 5,321,750 A | 6/1994 | Nadan |
| 5,339,392 A | 8/1994 | Risberg et al. |
| 5,406,307 A | 4/1995 | Hirayama et al. |
| 5,432,932 A | 7/1995 | Chen et al. |
| 5,463,725 A | 10/1995 | Henckel et al. |
| 5,485,197 A | 1/1996 | Hoarty |
| 5,487,143 A | 1/1996 | Southgate |
| 5,495,566 A | 2/1996 | Kwatinetz |
| 5,515,495 A | 5/1996 | Ikemoto |
| 5,574,836 A | 11/1996 | Broemmelsiek |
| 5,598,523 A | 1/1997 | Fujita |
| 5,603,053 A | 2/1997 | Gough et al. |
| 5,611,060 A | 3/1997 | Belfiore et al. |
| 5,623,613 A | 4/1997 | Rowe et al. |
| 5,640,176 A | 6/1997 | Mundt et al. |
| 5,650,827 A | 7/1997 | Tsumori et al. |
| 5,657,049 A | 8/1997 | Ludolph et al. |
| 5,659,693 A | 8/1997 | Hansen |
| 5,675,329 A | 10/1997 | Barker |
| 5,687,331 A | 11/1997 | Volk et al. |
| 5,712,995 A | 1/1998 | Cohn |
| 5,771,042 A | 6/1998 | Santos-Gomez |
| 5,793,415 A | 8/1998 | Gregory et al. |
| 5,819,284 A | 10/1998 | Farber et al. |
| 5,844,547 A | 12/1998 | Minakuchi et al. |
| 5,859,636 A | 1/1999 | Pandit |
| 5,860,073 A | 1/1999 | Ferrel et al. |
| 5,889,517 A | 3/1999 | Ueda et al. |
| 5,905,492 A | 5/1999 | Straub et al. |
| 5,914,720 A | 6/1999 | Maples et al. |
| 5,940,076 A | 8/1999 | Sommers et al. |
| 5,943,041 A | 8/1999 | Allison et al. |
| 5,959,621 A | 9/1999 | Nawaz et al. |
| 5,963,204 A | 10/1999 | Ikeda et al. |
| 6,008,809 A | 12/1999 | Brooks |
| 6,008,816 A | 12/1999 | Eisler |
| 6,009,519 A | 12/1999 | Jones et al. |
| 6,011,542 A | 1/2000 | Durrani et al. |
| 6,028,600 A | 2/2000 | Rosin et al. |
| 6,057,839 A | 5/2000 | Advani et al. |
| 6,064,383 A | 5/2000 | Skelly |
| 6,104,418 A | 8/2000 | Tanaka et al. |
| 6,108,003 A | 8/2000 | Hall, Jr. et al. |
| 6,111,585 A | 8/2000 | Choi |
| 6,115,040 A | 9/2000 | Bladow et al. |
| 6,166,736 A | 12/2000 | Hugh |
| 6,188,405 B1 | 2/2001 | Czerwinski et al. |
| 6,211,921 B1 | 4/2001 | Cherian et al. |
| 6,212,564 B1 | 4/2001 | Harter et al. |
| 6,216,141 B1 | 4/2001 | Straub et al. |
| 6,266,098 B1 | 7/2001 | Cove et al. |
| 6,278,448 B1 | 8/2001 | Brown et al. |
| 6,281,940 B1 | 8/2001 | Sciammarella |
| 6,311,058 B1 | 10/2001 | Wecker et al. |
| 6,346,935 B1 | 2/2002 | Nakajima et al. |
| 6,369,837 B1 | 4/2002 | Schirmer |
| 6,385,630 B1 | 5/2002 | Ejerhed |
| 6,396,963 B2 | 5/2002 | Shaffer |
| 6,411,307 B1 | 6/2002 | Rosin et al. |
| 6,424,338 B1 | 7/2002 | Anderson |
| 6,426,753 B1 | 7/2002 | Migdal |
| 6,433,789 B1 | 8/2002 | Rosman |
| 6,448,987 B1 | 9/2002 | Easty et al. |
| 6,449,638 B1 | 9/2002 | Wecker et al. |
| 6,456,334 B1 | 9/2002 | Duhault |
| 6,489,977 B2 | 12/2002 | Sone |
| 6,505,243 B1 | 1/2003 | Lortz |
| 6,507,643 B1 | 1/2003 | Groner |
| 6,510,144 B1 | 1/2003 | Dommety et al. |
| 6,510,466 B1 | 1/2003 | Cox et al. |
| 6,510,553 B1 | 1/2003 | Hazra |
| 6,538,635 B1 | 3/2003 | Ringot |
| 6,570,582 B1 | 5/2003 | Sciammarella et al. |
| 6,570,597 B1 | 5/2003 | Seki et al. |
| 6,577,323 B1 | 6/2003 | Jamieson et al. |
| 6,577,350 B1 | 6/2003 | Proehl et al. |
| 6,591,244 B2 | 7/2003 | Jim et al. |
| 6,597,374 B1 | 7/2003 | Baker et al. |
| 6,628,309 B1 | 9/2003 | Dodson et al. |
| 6,636,246 B1 | 10/2003 | Gallo et al. |
| 6,662,023 B1 | 12/2003 | Helle |
| 6,675,387 B1 | 1/2004 | Boucher et al. |
| 6,690,387 B2 | 2/2004 | Zimmerman et al. |
| 6,697,825 B1 | 2/2004 | Underwood et al. |
| 6,707,449 B2 | 3/2004 | Hinckley et al. |
| 6,710,771 B1 | 3/2004 | Yamaguchi et al. |
| 6,721,958 B1 | 4/2004 | Dureau |
| 6,724,403 B1 | 4/2004 | Santoro et al. |
| 6,727,894 B1* | 4/2004 | Karidis ............... G06F 1/1616 178/18.01 |
| 6,784,925 B1 | 8/2004 | Tomat et al. |
| 6,798,421 B2 | 9/2004 | Baldwin |
| 6,798,649 B1 | 9/2004 | Olodort |
| 6,801,203 B1 | 10/2004 | Hussain |
| 6,807,558 B1 | 10/2004 | Hassett et al. |
| 6,832,355 B1 | 12/2004 | Duperrouzel et al. |
| 6,857,104 B1 | 2/2005 | Cahn |
| 6,865,297 B2 | 3/2005 | Loui |
| 6,873,329 B2 | 3/2005 | Cohen et al. |
| 6,876,312 B2 | 4/2005 | Yu |
| 6,885,974 B2 | 4/2005 | Holle |
| 6,904,597 B2 | 6/2005 | Jin |
| 6,920,445 B2 | 7/2005 | Bae |
| 6,938,101 B2 | 8/2005 | Hayes et al. |
| 6,961,731 B2 | 11/2005 | Holbrook |
| 6,971,067 B1 | 11/2005 | Karson et al. |
| 6,972,776 B2 | 12/2005 | Davis et al. |
| 6,975,306 B2 | 12/2005 | Hinckley |
| 6,975,507 B2* | 12/2005 | Wang .................. G06F 1/1616 16/333 |
| 6,976,210 B1 | 12/2005 | Silva et al. |
| 6,978,303 B1 | 12/2005 | McCreesh et al. |
| 6,983,310 B2 | 1/2006 | Rouse |
| 6,987,991 B2 | 1/2006 | Nelson |
| 7,013,041 B2 | 3/2006 | Miyamoto |
| 7,017,119 B1 | 3/2006 | Johnston et al. |
| 7,019,757 B2 | 3/2006 | Brown et al. |
| 7,025,274 B2 | 4/2006 | Solomon et al. |
| 7,028,264 B2 | 4/2006 | Santoro et al. |
| 7,032,187 B2 | 4/2006 | Keely, Jr. et al. |
| 7,036,090 B1 | 4/2006 | Nguyen |
| 7,036,091 B1 | 4/2006 | Nguyen |
| 7,042,460 B2 | 5/2006 | Hussain et al. |
| 7,051,291 B2 | 5/2006 | Sciammarella et al. |
| 7,054,441 B2* | 5/2006 | Pletikosa ............ G06F 1/1626 361/679.24 |
| 7,058,955 B2 | 6/2006 | Porkka |
| 7,065,385 B2 | 6/2006 | Jarrad et al. |
| 7,065,386 B1 | 6/2006 | Smethers |
| 7,075,535 B2 | 7/2006 | Aguera y Arcas |
| 7,089,507 B2 | 8/2006 | Lection et al. |
| 7,091,998 B2 | 8/2006 | Miller-Smith |
| 7,093,201 B2 | 8/2006 | Duarte |
| 7,106,349 B2 | 9/2006 | Baar et al. |
| 7,111,044 B2 | 9/2006 | Lee |
| 7,133,707 B1 | 11/2006 | Rak |
| 7,133,859 B1 | 11/2006 | Wong |
| 7,139,800 B2 | 11/2006 | Bellotti et al. |
| 7,146,573 B2 | 12/2006 | Brown et al. |
| 7,155,729 B1 | 12/2006 | Andrew et al. |
| 7,158,123 B2 | 1/2007 | Myers et al. |
| 7,158,135 B2 | 1/2007 | Santodomingo et al. |
| 7,178,111 B2 | 2/2007 | Glein et al. |
| 7,194,506 B1 | 3/2007 | White et al. |
| 7,197,702 B2 | 3/2007 | Niyogi et al. |
| 7,210,099 B2 | 4/2007 | Rohrabaugh et al. |
| 7,216,588 B2 | 5/2007 | Suess |
| 7,249,326 B2 | 7/2007 | Stoakley et al. |
| 7,251,782 B1 | 7/2007 | Albers |
| 7,262,775 B2 | 8/2007 | Calkins et al. |
| 7,263,668 B1 | 8/2007 | Lentz |
| 7,277,924 B1 | 10/2007 | Wichmann et al. |
| 7,280,097 B2 | 10/2007 | Chen et al. |
| 7,283,620 B2 | 10/2007 | Adamczyk |

(56) References Cited

U.S. PATENT DOCUMENTS

| | | |
|---|---|---|
| 7,289,806 B2 | 10/2007 | Morris et al. |
| 7,296,184 B2 | 11/2007 | Derks et al. |
| 7,296,242 B2 | 11/2007 | Agata et al. |
| 7,304,638 B2 | 12/2007 | Murphy |
| 7,310,100 B2 | 12/2007 | Hussain |
| 7,333,092 B2 | 2/2008 | Zadesky et al. |
| 7,333,120 B2 | 2/2008 | Venolia |
| 7,336,263 B2 | 2/2008 | Valikangas |
| 7,343,567 B2 | 3/2008 | Mann et al. |
| 7,369,647 B2 | 5/2008 | Gao et al. |
| 7,376,907 B2 | 5/2008 | Santoro et al. |
| 7,386,807 B2 | 6/2008 | Cummins et al. |
| 7,388,578 B2 | 6/2008 | Tao |
| 7,403,191 B2 | 7/2008 | Sinclair |
| 7,408,538 B2 | 8/2008 | Hinckley et al. |
| 7,412,663 B2 | 8/2008 | Lindsay et al. |
| 7,433,920 B2 | 10/2008 | Blagsvedt et al. |
| 7,447,520 B2 | 11/2008 | Scott |
| 7,461,151 B2 | 12/2008 | Colson et al. |
| 7,469,380 B2 | 12/2008 | Wessling et al. |
| 7,469,381 B2 | 12/2008 | Ording |
| 7,478,326 B2 | 1/2009 | Holecek et al. |
| 7,479,949 B2 | 1/2009 | Jobs |
| 7,480,870 B2 | 1/2009 | Anzures |
| 7,483,418 B2 | 1/2009 | Maurer |
| 7,484,182 B1 | 1/2009 | Smith |
| 7,487,467 B1 | 2/2009 | Kawahara et al. |
| 7,496,830 B2 | 2/2009 | Rubin |
| 7,500,175 B2 | 3/2009 | Colle et al. |
| 7,512,966 B2 | 3/2009 | Lyons, Jr. et al. |
| 7,577,918 B2 | 8/2009 | Lindsay |
| 7,581,034 B2 | 8/2009 | Polivy et al. |
| 7,593,995 B1 | 9/2009 | He et al. |
| 7,595,810 B2 | 9/2009 | Louch |
| 7,599,790 B2 | 10/2009 | Rasmussen et al. |
| 7,600,189 B2 | 10/2009 | Fujisawa |
| 7,600,234 B2 | 10/2009 | Dobrowski et al. |
| 7,606,714 B2 | 10/2009 | Williams et al. |
| 7,607,096 B2 | 10/2009 | Oreizy et al. |
| 7,607,106 B2 | 10/2009 | Ernst et al. |
| 7,610,563 B2 | 10/2009 | Nelson et al. |
| 7,614,018 B1 | 11/2009 | Ohazama et al. |
| 7,619,615 B1 | 11/2009 | Donoghue |
| 7,640,518 B2 | 12/2009 | Forlines et al. |
| 7,644,361 B2 | 1/2010 | Wu et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,664,067 B2 | 2/2010 | Pointer |
| 7,669,140 B2 | 2/2010 | Matthews et al. |
| 7,671,756 B2 | 3/2010 | Herz et al. |
| 7,681,138 B2 | 3/2010 | Grasser et al. |
| 7,702,683 B1 | 4/2010 | Kirshenbaum |
| 7,730,425 B2 | 6/2010 | de los Reyes et al. |
| 7,746,388 B2 | 6/2010 | Jeon |
| 7,755,674 B2 | 7/2010 | Kaminaga |
| 7,765,490 B2 | 7/2010 | Lai et al. |
| 7,834,861 B2 | 11/2010 | Lee |
| 7,840,979 B2 | 11/2010 | Poling et al. |
| 7,877,707 B2 | 1/2011 | Westerman et al. |
| 7,880,728 B2 | 2/2011 | De Los Reyes et al. |
| 7,889,180 B2 | 2/2011 | Byun et al. |
| 7,895,309 B2 | 2/2011 | Belali et al. |
| 7,898,529 B2 | 3/2011 | Fitzmaurice et al. |
| 7,924,271 B2 | 4/2011 | Christie et al. |
| 7,933,632 B2 | 4/2011 | Flynt et al. |
| 7,962,281 B2 | 6/2011 | Rasmussen et al. |
| 7,983,718 B1 | 7/2011 | Roka |
| 7,987,431 B2 | 7/2011 | Santoro et al. |
| 8,006,276 B2 | 8/2011 | Nakagawa et al. |
| 8,050,030 B2 | 11/2011 | Wu et al. |
| 8,065,628 B2 | 11/2011 | Oshiro et al. |
| 8,077,151 B2 | 12/2011 | Morooka |
| 8,086,275 B2 | 12/2011 | Wykes |
| 8,108,781 B2 | 1/2012 | Laansoo et al. |
| 8,131,808 B2 | 3/2012 | Aoki et al. |
| 8,134,727 B1 | 3/2012 | Shmunis et al. |
| 8,138,869 B1 | 3/2012 | Lauder et al. |
| 8,150,924 B2 | 4/2012 | Buchheit et al. |
| 8,175,653 B2 | 5/2012 | Smuga |
| 8,176,438 B2 | 5/2012 | Zaman et al. |
| 8,190,707 B2 | 5/2012 | Trivedi et al. |
| 8,209,623 B2 | 6/2012 | Barletta et al. |
| 8,225,193 B1 | 7/2012 | Kleinschnitz et al. |
| 8,238,876 B2 | 8/2012 | Teng |
| 8,245,152 B2 | 8/2012 | Brunner et al. |
| 8,245,156 B2 | 8/2012 | Mouilleseaux et al. |
| 8,250,494 B2 | 8/2012 | Butcher |
| 8,255,473 B2 | 8/2012 | Eren et al. |
| 8,255,812 B1 | 8/2012 | Parparita et al. |
| 8,255,818 B2 | 8/2012 | Bales et al. |
| 8,259,437 B2 | 9/2012 | Vesely |
| 8,269,736 B2 | 9/2012 | Wilairat |
| 8,272,104 B2 | 9/2012 | Chen et al. |
| 8,280,901 B2 | 10/2012 | McDonald |
| 8,289,688 B2 | 10/2012 | Behar et al. |
| 8,300,392 B2 | 10/2012 | Weng |
| 8,312,383 B2 | 11/2012 | Gilfix |
| 8,334,871 B2 | 12/2012 | Hamilton et al. |
| 8,355,698 B2 | 1/2013 | Teng et al. |
| 8,384,726 B1 | 2/2013 | Grabowski et al. |
| 8,385,952 B2 | 2/2013 | Friedman et al. |
| 8,411,046 B2 | 4/2013 | Kruzeniski et al. |
| 8,429,565 B2 | 4/2013 | Agarawala et al. |
| 8,448,083 B1 | 5/2013 | Migos et al. |
| 8,473,870 B2 | 6/2013 | Hinckley et al. |
| 8,525,808 B1 | 9/2013 | Buening |
| 8,527,892 B2 | 9/2013 | Sirpal et al. |
| 8,539,384 B2 | 9/2013 | Hinckley et al. |
| 8,548,431 B2 | 10/2013 | Teng et al. |
| 8,549,430 B2 | 10/2013 | Russell et al. |
| 8,560,959 B2 | 10/2013 | Zaman et al. |
| 8,584,150 B2 | 11/2013 | Wallace |
| 8,589,815 B2 | 11/2013 | Fong et al. |
| 8,612,874 B2 | 12/2013 | Zaman et al. |
| 8,615,707 B2 | 12/2013 | Fortuna et al. |
| 8,615,713 B2 | 12/2013 | Sun et al. |
| 8,627,227 B2 | 1/2014 | Matthews et al. |
| 8,639,819 B2 | 1/2014 | Pohja et al. |
| 8,687,023 B2 | 4/2014 | Markiewicz et al. |
| 8,689,123 B2 | 4/2014 | Zaman et al. |
| 8,749,960 B2 | 6/2014 | Mori |
| 8,766,921 B2 | 7/2014 | Ballagas et al. |
| 8,811,008 B2 * | 8/2014 | Selkirk .............. G06F 13/4081 312/245 |
| 8,839,953 B2 | 9/2014 | Igarashi |
| 8,875,879 B2 | 11/2014 | Diebel et al. |
| 8,922,982 B1 * | 12/2014 | Chen .................... F16M 11/10 361/679.08 |
| 8,988,876 B2 | 3/2015 | Corbin et al. |
| 9,052,820 B2 | 6/2015 | Jarrett et al. |
| 9,078,338 B2 | 7/2015 | Ohtaka |
| 9,131,756 B2 | 9/2015 | Hurst et al. |
| 9,189,019 B2 | 11/2015 | Jenkins et al. |
| 9,280,181 B2 | 3/2016 | Tomita et al. |
| 2001/0022621 A1 | 9/2001 | Squibbs |
| 2002/0000963 A1 | 1/2002 | Yoshida et al. |
| 2002/0018051 A1 | 2/2002 | Singh |
| 2002/0035607 A1 | 3/2002 | Checkoway |
| 2002/0054117 A1 | 5/2002 | van Dantzich et al. |
| 2002/0060701 A1 | 5/2002 | Naughton et al. |
| 2002/0070961 A1 | 6/2002 | Xu et al. |
| 2002/0077156 A1 | 6/2002 | Smethers |
| 2002/0091755 A1 | 7/2002 | Narin |
| 2002/0097264 A1 | 7/2002 | Dutta et al. |
| 2002/0105531 A1 | 8/2002 | Niemi |
| 2002/0105553 A1 | 8/2002 | Segre |
| 2002/0115476 A1 | 8/2002 | Padawer et al. |
| 2002/0128036 A1 | 9/2002 | Yach et al. |
| 2002/0129061 A1 | 9/2002 | Swart et al. |
| 2002/0138248 A1 | 9/2002 | Corston-Oliver et al. |
| 2002/0142762 A1 | 10/2002 | Chmaytelli et al. |
| 2002/0145631 A1 | 10/2002 | Arbab et al. |
| 2002/0152305 A1 | 10/2002 | Jackson et al. |

(56) References Cited

U.S. PATENT DOCUMENTS

| | | |
|---|---|---|
| 2002/0154176 A1 | 10/2002 | Barksdale et al. |
| 2002/0161634 A1 | 10/2002 | Kaars |
| 2002/0186251 A1 | 12/2002 | Himmel et al. |
| 2002/0194385 A1 | 12/2002 | Linder et al. |
| 2003/0003899 A1 | 1/2003 | Tashiro et al. |
| 2003/0008686 A1 | 1/2003 | Park et al. |
| 2003/0011643 A1 | 1/2003 | Nishihihata |
| 2003/0019996 A1 | 1/2003 | Shields |
| 2003/0020671 A1 | 1/2003 | Santoro et al. |
| 2003/0040300 A1 | 2/2003 | Bodic |
| 2003/0046396 A1 | 3/2003 | Richter et al. |
| 2003/0073414 A1 | 4/2003 | Capps |
| 2003/0096604 A1 | 5/2003 | Vollandt |
| 2003/0105827 A1 | 6/2003 | Tan et al. |
| 2003/0135582 A1 | 7/2003 | Allen et al. |
| 2003/0187996 A1 | 10/2003 | Cardina et al. |
| 2003/0222907 A1 | 12/2003 | Heikes et al. |
| 2003/0225846 A1 | 12/2003 | Heikes et al. |
| 2003/0234799 A1 | 12/2003 | Lee |
| 2004/0015553 A1 | 1/2004 | Griffin et al. |
| 2004/0066414 A1 | 4/2004 | Czerwinski et al. |
| 2004/0066418 A1 | 4/2004 | Tosey |
| 2004/0068543 A1 | 4/2004 | Seifert |
| 2004/0078299 A1 | 4/2004 | Down-Logan |
| 2004/0111673 A1 | 6/2004 | Bowman et al. |
| 2004/0114315 A1 | 6/2004 | Anlauff |
| 2004/0165010 A1 | 8/2004 | Robertson et al. |
| 2004/0185883 A1 | 9/2004 | Rukman |
| 2004/0212586 A1 | 10/2004 | Denny |
| 2004/0212617 A1 | 10/2004 | Fitzmaurice et al. |
| 2004/0212954 A1 * | 10/2004 | Ulla ............... G06F 1/1626 361/679.09 |
| 2004/0217954 A1 | 11/2004 | O'Gorman et al. |
| 2004/0217980 A1 | 11/2004 | Radburn et al. |
| 2004/0237048 A1 | 11/2004 | Tojo et al. |
| 2004/0246666 A1 | 12/2004 | Maskatia et al. |
| 2004/0250217 A1 | 12/2004 | Tojo et al. |
| 2005/0002158 A1 | 1/2005 | Olodort |
| 2005/0005241 A1 | 1/2005 | Hunleth et al. |
| 2005/0028208 A1 | 2/2005 | Ellis |
| 2005/0044058 A1 | 2/2005 | Matthews et al. |
| 2005/0050462 A1 | 3/2005 | Whittle et al. |
| 2005/0052831 A1 * | 3/2005 | Chen ............... G06F 1/1616 361/679.11 |
| 2005/0054384 A1 | 3/2005 | Pasquale et al. |
| 2005/0060647 A1 | 3/2005 | Doan et al. |
| 2005/0060658 A1 | 3/2005 | Tsukiori |
| 2005/0060663 A1 | 3/2005 | Arkeketa et al. |
| 2005/0060665 A1 | 3/2005 | Rekimoto |
| 2005/0079896 A1 | 4/2005 | Kokko et al. |
| 2005/0085215 A1 | 4/2005 | Kokko et al. |
| 2005/0085272 A1 | 4/2005 | Anderson et al. |
| 2005/0108655 A1 | 5/2005 | Andrea et al. |
| 2005/0114788 A1 | 5/2005 | Fabritius |
| 2005/0120306 A1 | 6/2005 | Klassen et al. |
| 2005/0125739 A1 | 6/2005 | Thompson et al. |
| 2005/0136953 A1 | 6/2005 | Jo |
| 2005/0143138 A1 | 6/2005 | Lee et al. |
| 2005/0149879 A1 | 7/2005 | Jobs et al. |
| 2005/0168925 A1 | 8/2005 | Fang et al. |
| 2005/0182798 A1 | 8/2005 | Todd et al. |
| 2005/0183021 A1 | 8/2005 | Allen et al. |
| 2005/0184999 A1 | 8/2005 | Daioku |
| 2005/0198159 A1 | 9/2005 | Kirsch |
| 2005/0198584 A1 | 9/2005 | Matthews et al. |
| 2005/0200762 A1 | 9/2005 | Barletta et al. |
| 2005/0207734 A1 | 9/2005 | Howell et al. |
| 2005/0216300 A1 | 9/2005 | Appelman et al. |
| 2005/0223057 A1 | 10/2005 | Buchheit et al. |
| 2005/0223069 A1 | 10/2005 | Cooperman et al. |
| 2005/0232166 A1 | 10/2005 | Nierhaus |
| 2005/0250547 A1 | 11/2005 | Salman et al. |
| 2005/0258021 A1 | 11/2005 | Liu et al. |
| 2005/0268237 A1 | 12/2005 | Crane et al. |
| 2005/0273614 A1 | 12/2005 | Ahuja et al. |
| 2005/0280719 A1 | 12/2005 | Kim |
| 2006/0004685 A1 | 1/2006 | Pyhalammi et al. |
| 2006/0005207 A1 | 1/2006 | Louch et al. |
| 2006/0007645 A1 | 1/2006 | Chen et al. |
| 2006/0010394 A1 | 1/2006 | Chaudhri et al. |
| 2006/0015562 A1 | 1/2006 | Kilian-Kehr et al. |
| 2006/0015736 A1 | 1/2006 | Callas et al. |
| 2006/0015812 A1 | 1/2006 | Cunningham |
| 2006/0015820 A1 | 1/2006 | Wood |
| 2006/0026013 A1 | 2/2006 | Kraft |
| 2006/0026521 A1 | 2/2006 | Hotelling et al. |
| 2006/0036425 A1 | 2/2006 | Le Cocq et al. |
| 2006/0048073 A1 | 3/2006 | Jarrett et al. |
| 2006/0048101 A1 | 3/2006 | Krassovsky et al. |
| 2006/0059430 A1 | 3/2006 | Bells |
| 2006/0070005 A1 | 3/2006 | Gilbert et al. |
| 2006/0074735 A1 | 4/2006 | Shukla et al. |
| 2006/0074771 A1 | 4/2006 | Kim et al. |
| 2006/0075360 A1 | 4/2006 | Bixler |
| 2006/0103623 A1 | 5/2006 | Davis |
| 2006/0107231 A1 | 5/2006 | Matthews et al. |
| 2006/0112354 A1 | 5/2006 | Park et al. |
| 2006/0114239 A1 | 6/2006 | Nakajima |
| 2006/0129543 A1 | 6/2006 | Bates et al. |
| 2006/0135220 A1 | 6/2006 | Kim et al. |
| 2006/0136773 A1 | 6/2006 | Kespohl et al. |
| 2006/0152803 A1 | 7/2006 | Provitola |
| 2006/0156247 A1 | 7/2006 | McCormack et al. |
| 2006/0172724 A1 | 8/2006 | Linkert et al. |
| 2006/0173911 A1 | 8/2006 | Levin et al. |
| 2006/0184901 A1 | 8/2006 | Dietz |
| 2006/0190833 A1 | 8/2006 | SanGiovanni et al. |
| 2006/0192689 A1 | 8/2006 | Wang et al. |
| 2006/0199598 A1 | 9/2006 | Lee et al. |
| 2006/0212806 A1 | 9/2006 | Griffin et al. |
| 2006/0218234 A1 | 9/2006 | Deng et al. |
| 2006/0218501 A1 | 9/2006 | Wilson et al. |
| 2006/0224993 A1 | 10/2006 | Wong et al. |
| 2006/0246955 A1 | 11/2006 | Nirhamo |
| 2006/0248471 A1 | 11/2006 | Lindsay et al. |
| 2006/0253685 A1 | 11/2006 | Wong et al. |
| 2006/0253801 A1 | 11/2006 | Okaro et al. |
| 2006/0259870 A1 | 11/2006 | Hewitt et al. |
| 2006/0259873 A1 | 11/2006 | Mister |
| 2006/0262134 A1 | 11/2006 | Hamiter et al. |
| 2006/0268100 A1 | 11/2006 | Karukka et al. |
| 2006/0271520 A1 | 11/2006 | Ragan |
| 2006/0281448 A1 | 12/2006 | Plestid et al. |
| 2006/0293088 A1 | 12/2006 | Kokubo |
| 2006/0294063 A1 | 12/2006 | Ali et al. |
| 2006/0294396 A1 | 12/2006 | Witman et al. |
| 2007/0005716 A1 | 1/2007 | LeVasseur et al. |
| 2007/0006094 A1 | 1/2007 | Canfield et al. |
| 2007/0011610 A1 | 1/2007 | Sethi et al. |
| 2007/0015532 A1 | 1/2007 | Deelman |
| 2007/0024646 A1 | 2/2007 | Saarinen |
| 2007/0030634 A1 | 2/2007 | Maskatia |
| 2007/0035513 A1 | 2/2007 | Sherrard et al. |
| 2007/0038567 A1 | 2/2007 | Allaire et al. |
| 2007/0050724 A1 | 3/2007 | Lee et al. |
| 2007/0054679 A1 | 3/2007 | Cho et al. |
| 2007/0061306 A1 | 3/2007 | Pell et al. |
| 2007/0061488 A1 | 3/2007 | Alagappan et al. |
| 2007/0061714 A1 | 3/2007 | Stuple et al. |
| 2007/0063995 A1 | 3/2007 | Bailey et al. |
| 2007/0067272 A1 | 3/2007 | Flynt |
| 2007/0067737 A1 | 3/2007 | Zielinski et al. |
| 2007/0067798 A1 | 3/2007 | Wroblewski |
| 2007/0073718 A1 | 3/2007 | Ramer |
| 2007/0076013 A1 | 4/2007 | Campbell |
| 2007/0080954 A1 | 4/2007 | Griffin |
| 2007/0082707 A1 | 4/2007 | Flynt et al. |
| 2007/0082708 A1 | 4/2007 | Griffin |
| 2007/0083746 A1 | 4/2007 | Fallon et al. |
| 2007/0083821 A1 | 4/2007 | Garbow et al. |
| 2007/0094597 A1 | 4/2007 | Rostom |
| 2007/0106635 A1 | 5/2007 | Frieden et al. |
| 2007/0120835 A1 | 5/2007 | Sato |
| 2007/0127638 A1 | 6/2007 | Doulton |

(56) References Cited

U.S. PATENT DOCUMENTS

| | | |
|---|---|---|
| 2007/0136677 A1 | 6/2007 | Agarwal |
| 2007/0150826 A1 | 6/2007 | Anzures et al. |
| 2007/0150842 A1 | 6/2007 | Chaudhri et al. |
| 2007/0157089 A1 | 7/2007 | Van Os et al. |
| 2007/0157099 A1 | 7/2007 | Haug |
| 2007/0157105 A1 | 7/2007 | Owens et al. |
| 2007/0171192 A1 | 7/2007 | Seo et al. |
| 2007/0171238 A1 | 7/2007 | Ubillos et al. |
| 2007/0180401 A1 | 8/2007 | Singh et al. |
| 2007/0182595 A1 | 8/2007 | Ghasabian |
| 2007/0182999 A1 | 8/2007 | Anthony et al. |
| 2007/0185847 A1 | 8/2007 | Budzik et al. |
| 2007/0192707 A1 | 8/2007 | Maeda et al. |
| 2007/0192730 A1 | 8/2007 | Simila et al. |
| 2007/0192733 A1 | 8/2007 | Horiuchi |
| 2007/0192739 A1 | 8/2007 | Hunleth et al. |
| 2007/0197196 A1 | 8/2007 | Shenfield et al. |
| 2007/0198420 A1 | 8/2007 | Goldstein |
| 2007/0208840 A1 | 9/2007 | Mcconville et al. |
| 2007/0211034 A1 | 9/2007 | Griffin et al. |
| 2007/0214422 A1 | 9/2007 | Agarwal et al. |
| 2007/0214429 A1 | 9/2007 | Lyudovyk et al. |
| 2007/0214454 A1 | 9/2007 | Edwards et al. |
| 2007/0216651 A1 | 9/2007 | Patel |
| 2007/0216661 A1 | 9/2007 | Chen et al. |
| 2007/0222769 A1 | 9/2007 | Otsuka et al. |
| 2007/0225022 A1 | 9/2007 | Satake |
| 2007/0233654 A1 | 10/2007 | Karlson |
| 2007/0236468 A1 | 10/2007 | Tuli |
| 2007/0238487 A1 | 10/2007 | Kuhl et al. |
| 2007/0238488 A1 | 10/2007 | Scott |
| 2007/0247435 A1 | 10/2007 | Benko et al. |
| 2007/0250583 A1 | 10/2007 | Hardy |
| 2007/0250787 A1 | 10/2007 | Kawahara et al. |
| 2007/0253758 A1 | 11/2007 | Suess |
| 2007/0255831 A1 | 11/2007 | Hayashi et al. |
| 2007/0256029 A1 | 11/2007 | Maxwell |
| 2007/0257891 A1 | 11/2007 | Esenther et al. |
| 2007/0257933 A1 | 11/2007 | Klassen |
| 2007/0260674 A1 | 11/2007 | Shenfield |
| 2007/0262964 A1 | 11/2007 | Zotov et al. |
| 2007/0263843 A1 | 11/2007 | Foxenland |
| 2007/0273663 A1 | 11/2007 | Park et al. |
| 2007/0273668 A1 | 11/2007 | Park et al. |
| 2007/0280457 A1 | 12/2007 | Aberethy |
| 2007/0281747 A1 | 12/2007 | Pletikosa |
| 2007/0291007 A1 | 12/2007 | Forlines et al. |
| 2008/0005668 A1 | 1/2008 | Mavinkurve |
| 2008/0024436 A1 | 1/2008 | Morooka |
| 2008/0028294 A1 | 1/2008 | Sell et al. |
| 2008/0032681 A1 | 2/2008 | West |
| 2008/0036743 A1 | 2/2008 | Westerman et al. |
| 2008/0040692 A1 | 2/2008 | Sunday et al. |
| 2008/0048986 A1 | 2/2008 | Khoo |
| 2008/0052370 A1 | 2/2008 | Snyder |
| 2008/0057910 A1 | 3/2008 | Thoresson et al. |
| 2008/0057926 A1 | 3/2008 | Forstall et al. |
| 2008/0059896 A1 | 3/2008 | Anderson et al. |
| 2008/0065607 A1 | 3/2008 | Weber |
| 2008/0066010 A1 | 3/2008 | Brodersen et al. |
| 2008/0072173 A1 | 3/2008 | Brunner et al. |
| 2008/0076472 A1 | 3/2008 | Hyatt |
| 2008/0082934 A1 | 4/2008 | Kocienda et al. |
| 2008/0084970 A1 | 4/2008 | Harper |
| 2008/0085700 A1 | 4/2008 | Arora |
| 2008/0092054 A1 | 4/2008 | Bhumkar et al. |
| 2008/0092057 A1 | 4/2008 | Monson et al. |
| 2008/0095100 A1 | 4/2008 | Cleveland et al. |
| 2008/0102863 A1 | 5/2008 | Hardy |
| 2008/0104544 A1 | 5/2008 | Collins et al. |
| 2008/0107057 A1 | 5/2008 | Kannan et al. |
| 2008/0113656 A1 | 5/2008 | Lee et al. |
| 2008/0114535 A1 | 5/2008 | Nesbitt |
| 2008/0120569 A1 | 5/2008 | Mann et al. |
| 2008/0120571 A1 | 5/2008 | Chang et al. |
| 2008/0122796 A1 | 5/2008 | Jobs |
| 2008/0132252 A1 | 6/2008 | Altman et al. |
| 2008/0141153 A1 | 6/2008 | Samson et al. |
| 2008/0153551 A1 | 6/2008 | Baek et al. |
| 2008/0155425 A1 | 6/2008 | Murthy et al. |
| 2008/0162651 A1 | 7/2008 | Madnani |
| 2008/0163104 A1 | 7/2008 | Haug |
| 2008/0165132 A1 | 7/2008 | Weiss et al. |
| 2008/0165136 A1 | 7/2008 | Christie et al. |
| 2008/0165141 A1 | 7/2008 | Christie |
| 2008/0165163 A1 | 7/2008 | Bathiche |
| 2008/0167058 A1 | 7/2008 | Lee et al. |
| 2008/0168349 A1 | 7/2008 | Lamiraux et al. |
| 2008/0168379 A1 | 7/2008 | Forstall et al. |
| 2008/0168382 A1 | 7/2008 | Louch et al. |
| 2008/0168402 A1 | 7/2008 | Blumenberg |
| 2008/0168403 A1 | 7/2008 | Westerman et al. |
| 2008/0172609 A1 | 7/2008 | Rytivaara |
| 2008/0174570 A1 | 7/2008 | Jobs et al. |
| 2008/0180399 A1 | 7/2008 | Cheng |
| 2008/0182628 A1 | 7/2008 | Lee et al. |
| 2008/0184112 A1 | 7/2008 | Chiang et al. |
| 2008/0189653 A1 | 8/2008 | Taylor et al. |
| 2008/0189658 A1 | 8/2008 | Jeong et al. |
| 2008/0192056 A1 | 8/2008 | Robertson et al. |
| 2008/0198141 A1 | 8/2008 | Lee et al. |
| 2008/0200142 A1 | 8/2008 | Abdel-Kader et al. |
| 2008/0208973 A1 | 8/2008 | Hayashi |
| 2008/0222273 A1 | 9/2008 | Lakshmanan |
| 2008/0222545 A1 | 9/2008 | Lemay et al. |
| 2008/0222547 A1 | 9/2008 | Wong et al. |
| 2008/0222560 A1 | 9/2008 | Harrison |
| 2008/0222569 A1 | 9/2008 | Champion |
| 2008/0242362 A1 | 10/2008 | Duarte |
| 2008/0250354 A1 | 10/2008 | Park |
| 2008/0259042 A1 | 10/2008 | Thorn |
| 2008/0261513 A1 | 10/2008 | Shin et al. |
| 2008/0261660 A1 | 10/2008 | Huh et al. |
| 2008/0263457 A1 | 10/2008 | Kim et al. |
| 2008/0270558 A1 | 10/2008 | Ma |
| 2008/0297475 A1 | 12/2008 | Woolf et al. |
| 2008/0299999 A1 | 12/2008 | Lockhart et al. |
| 2008/0301046 A1 | 12/2008 | Martinez |
| 2008/0301575 A1 | 12/2008 | Fermon |
| 2008/0307351 A1 | 12/2008 | Louch et al. |
| 2008/0307364 A1 | 12/2008 | Chaudhri et al. |
| 2008/0309626 A1 | 12/2008 | Westerman et al. |
| 2008/0313538 A1 | 12/2008 | Hudson |
| 2008/0316177 A1 | 12/2008 | Tseng |
| 2008/0317240 A1 | 12/2008 | Chang et al. |
| 2008/0320413 A1 | 12/2008 | Oshiro |
| 2009/0007009 A1 | 1/2009 | Luneau et al. |
| 2009/0007017 A1 | 1/2009 | Anzures et al. |
| 2009/0012952 A1 | 1/2009 | Fredriksson |
| 2009/0029736 A1 | 1/2009 | Kim et al. |
| 2009/0031247 A1 | 1/2009 | Walter et al. |
| 2009/0037469 A1 | 2/2009 | Kirsch |
| 2009/0037846 A1 | 2/2009 | Spalink et al. |
| 2009/0051671 A1 | 2/2009 | Konstas |
| 2009/0058821 A1 | 3/2009 | Chaudhri et al. |
| 2009/0061837 A1 | 3/2009 | Chaudhri et al. |
| 2009/0061948 A1 | 3/2009 | Lee et al. |
| 2009/0064055 A1 | 3/2009 | Chaudhri |
| 2009/0070673 A1 | 3/2009 | Barkan et al. |
| 2009/0077649 A1 | 3/2009 | Lockhart |
| 2009/0083656 A1 | 3/2009 | Dukhon |
| 2009/0085851 A1 | 4/2009 | Lim |
| 2009/0085878 A1 | 4/2009 | Heubel |
| 2009/0089215 A1 | 4/2009 | Newton |
| 2009/0089459 A1 | 4/2009 | Jeyaseelan et al. |
| 2009/0094562 A1 | 4/2009 | Jeong et al. |
| 2009/0103515 A1 | 4/2009 | Pointer |
| 2009/0106694 A1 | 4/2009 | Kraft et al. |
| 2009/0106696 A1 | 4/2009 | Duarte |
| 2009/0109243 A1 | 4/2009 | Kraft |
| 2009/0117942 A1 | 5/2009 | Boningue et al. |
| 2009/0125844 A1 | 5/2009 | Weir et al. |
| 2009/0140061 A1 | 6/2009 | Schultz et al. |
| 2009/0140986 A1 | 6/2009 | Karkkainen et al. |

(56) References Cited

U.S. PATENT DOCUMENTS

| | | |
|---|---|---|
| 2009/0144642 A1 | 6/2009 | Crystal |
| 2009/0144653 A1 | 6/2009 | Ubillos |
| 2009/0146962 A1 | 6/2009 | Ahonen et al. |
| 2009/0150618 A1 | 6/2009 | Allen, Jr. et al. |
| 2009/0153492 A1 | 6/2009 | Popp |
| 2009/0158144 A1 | 6/2009 | Griffin |
| 2009/0159763 A1 | 6/2009 | Kim |
| 2009/0160809 A1 | 6/2009 | Yang |
| 2009/0163182 A1 | 6/2009 | Gatti et al. |
| 2009/0164888 A1 | 6/2009 | Phan |
| 2009/0164928 A1 | 6/2009 | Brown et al. |
| 2009/0164936 A1 | 6/2009 | Kawaguchi |
| 2009/0174679 A1 | 7/2009 | Westerman |
| 2009/0178007 A1 | 7/2009 | Matas et al. |
| 2009/0182788 A1 | 7/2009 | Chung et al. |
| 2009/0184939 A1 | 7/2009 | Wohlstadter et al. |
| 2009/0192942 A1 | 7/2009 | Cottrille et al. |
| 2009/0199122 A1 | 8/2009 | Deutsch et al. |
| 2009/0199128 A1 | 8/2009 | Matthews et al. |
| 2009/0199130 A1 | 8/2009 | Tsern et al. |
| 2009/0205041 A1 | 8/2009 | Michalske |
| 2009/0215504 A1 | 8/2009 | Lando |
| 2009/0228825 A1 | 9/2009 | Van Os et al. |
| 2009/0228841 A1 | 9/2009 | Hildreth |
| 2009/0235200 A1 | 9/2009 | Deutsch et al. |
| 2009/0235203 A1 | 9/2009 | Iizuka |
| 2009/0248421 A1 | 10/2009 | Michaelis et al. |
| 2009/0249257 A1 | 10/2009 | Bove et al. |
| 2009/0265662 A1 | 10/2009 | Bamford |
| 2009/0271778 A1 | 10/2009 | Mandyam et al. |
| 2009/0284482 A1 | 11/2009 | Chin |
| 2009/0288044 A1 | 11/2009 | Matthews et al. |
| 2009/0292989 A1 | 11/2009 | Matthews et al. |
| 2009/0293007 A1 | 11/2009 | Duarte et al. |
| 2009/0293014 A1 | 11/2009 | Meuninck et al. |
| 2009/0298547 A1 | 12/2009 | Kim et al. |
| 2009/0303231 A1 | 12/2009 | Robinet et al. |
| 2009/0305732 A1 | 12/2009 | Marcellino et al. |
| 2009/0307105 A1 | 12/2009 | Lemay et al. |
| 2009/0307589 A1 | 12/2009 | Inose et al. |
| 2009/0307623 A1 | 12/2009 | Agarawala et al. |
| 2009/0313584 A1 | 12/2009 | Kerr et al. |
| 2009/0315839 A1 | 12/2009 | Wilson et al. |
| 2009/0315847 A1 | 12/2009 | Fujii |
| 2009/0318171 A1 | 12/2009 | Backholm et al. |
| 2009/0322760 A1 | 12/2009 | Kwiatkowski |
| 2009/0327969 A1 | 12/2009 | Estrada |
| 2010/0008490 A1 | 1/2010 | Gharachorloo et al. |
| 2010/0013782 A1 | 1/2010 | Liu et al. |
| 2010/0020025 A1 | 1/2010 | Lemort et al. |
| 2010/0020091 A1 | 1/2010 | Rasmussen et al. |
| 2010/0031186 A1 | 2/2010 | Tseng |
| 2010/0042911 A1 | 2/2010 | Wormald et al. |
| 2010/0050076 A1 | 2/2010 | Roth |
| 2010/0058248 A1 | 3/2010 | Park |
| 2010/0062811 A1 | 3/2010 | Park et al. |
| 2010/0066698 A1 | 3/2010 | Seo |
| 2010/0070931 A1 | 3/2010 | Nichols |
| 2010/0073380 A1 | 3/2010 | Kaplan et al. |
| 2010/0075628 A1 | 3/2010 | Ye |
| 2010/0077058 A1 | 3/2010 | Messer |
| 2010/0077310 A1 | 3/2010 | Karachale et al. |
| 2010/0077330 A1 | 3/2010 | Kaplan et al. |
| 2010/0079392 A1 | 4/2010 | Chiang et al. |
| 2010/0079413 A1 | 4/2010 | Kawashima et al. |
| 2010/0081475 A1 | 4/2010 | Chiang et al. |
| 2010/0086022 A1 | 4/2010 | Hunleth et al. |
| 2010/0087169 A1 | 4/2010 | Lin |
| 2010/0087173 A1 | 4/2010 | Lin |
| 2010/0088635 A1 | 4/2010 | Louch |
| 2010/0100839 A1 | 4/2010 | Tseng et al. |
| 2010/0102998 A1 | 4/2010 | Fux |
| 2010/0103118 A1 | 4/2010 | Townsend et al. |
| 2010/0103124 A1 | 4/2010 | Kruzeniski |
| 2010/0105370 A1 | 4/2010 | Kruzeniski |
| 2010/0105424 A1 | 4/2010 | Smuga |
| 2010/0105438 A1 | 4/2010 | Wykes |
| 2010/0105439 A1 | 4/2010 | Friedman |
| 2010/0105440 A1 | 4/2010 | Kruzeniski |
| 2010/0105441 A1 | 4/2010 | Voss |
| 2010/0106607 A1 | 4/2010 | Riddiford et al. |
| 2010/0106915 A1 | 4/2010 | Krishnaprasad et al. |
| 2010/0107067 A1 | 4/2010 | Vaisanen |
| 2010/0107068 A1 | 4/2010 | Butcher |
| 2010/0107100 A1 | 4/2010 | Schneekloth |
| 2010/0122110 A1 | 5/2010 | Ordogh |
| 2010/0122924 A1 | 5/2010 | Andrews |
| 2010/0131901 A1 | 5/2010 | Takahashi et al. |
| 2010/0138767 A1 | 6/2010 | Wang et al. |
| 2010/0138834 A1 | 6/2010 | Agarwal et al. |
| 2010/0145675 A1 | 6/2010 | Lloyd et al. |
| 2010/0146437 A1 | 6/2010 | Woodcock et al. |
| 2010/0157157 A1 | 6/2010 | Yi |
| 2010/0159966 A1 | 6/2010 | Friedman |
| 2010/0159994 A1 | 6/2010 | Stallings et al. |
| 2010/0159995 A1 | 6/2010 | Stallings et al. |
| 2010/0162180 A1 | 6/2010 | Dunnam et al. |
| 2010/0167699 A1 | 7/2010 | Sigmund et al. |
| 2010/0169766 A1 | 7/2010 | Duarte et al. |
| 2010/0169772 A1 | 7/2010 | Stallings et al. |
| 2010/0175018 A1 | 7/2010 | Petschnigg et al. |
| 2010/0175029 A1 | 7/2010 | Williams |
| 2010/0180233 A1 | 7/2010 | Kruzeniski |
| 2010/0185932 A1 | 7/2010 | Coffman et al. |
| 2010/0192102 A1 | 7/2010 | Chmielewski et al. |
| 2010/0216491 A1 | 8/2010 | Winkler et al. |
| 2010/0248688 A1 | 9/2010 | Teng |
| 2010/0248689 A1 | 9/2010 | Teng |
| 2010/0248741 A1 | 9/2010 | Setlur et al. |
| 2010/0248787 A1 | 9/2010 | Smuga |
| 2010/0248788 A1 | 9/2010 | Yook et al. |
| 2010/0251153 A1 | 9/2010 | SanGiovanni et al. |
| 2010/0265196 A1 | 10/2010 | Lee et al. |
| 2010/0281402 A1 | 11/2010 | Staikos et al. |
| 2010/0281409 A1 | 11/2010 | Rainisto et al. |
| 2010/0283743 A1 | 11/2010 | Coddington et al. |
| 2010/0289806 A1 | 11/2010 | Lao et al. |
| 2010/0293056 A1 | 11/2010 | Flynt et al. |
| 2010/0293501 A1 | 11/2010 | Russ et al. |
| 2010/0295795 A1 | 11/2010 | Wilairat |
| 2010/0298034 A1 | 11/2010 | Shin et al. |
| 2010/0302148 A1 | 12/2010 | Fleizach et al. |
| 2010/0302172 A1 | 12/2010 | Wilairat |
| 2010/0302176 A1 | 12/2010 | Nikula et al. |
| 2010/0302278 A1 | 12/2010 | Shaffer et al. |
| 2010/0302712 A1 | 12/2010 | Wilairat |
| 2010/0311470 A1 | 12/2010 | Seo et al. |
| 2010/0313165 A1 | 12/2010 | Louch et al. |
| 2010/0321403 A1 | 12/2010 | Inadome |
| 2010/0325411 A1 | 12/2010 | Jung et al. |
| 2010/0328431 A1 | 12/2010 | Kim et al. |
| 2010/0333008 A1 | 12/2010 | Taylor |
| 2011/0004839 A1 | 1/2011 | Cha et al. |
| 2011/0004845 A1 | 1/2011 | Ciabarra |
| 2011/0018806 A1 | 1/2011 | Yano |
| 2011/0029598 A1 | 2/2011 | Arnold et al. |
| 2011/0029904 A1 | 2/2011 | Smith et al. |
| 2011/0029927 A1 | 2/2011 | Lietzke et al. |
| 2011/0029934 A1 | 2/2011 | Locker et al. |
| 2011/0043527 A1 | 2/2011 | Ording et al. |
| 2011/0050063 A1 | 3/2011 | Wang et al. |
| 2011/0055773 A1 | 3/2011 | Agarawala et al. |
| 2011/0057953 A1 | 3/2011 | Horodezky |
| 2011/0074699 A1 | 3/2011 | Marr et al. |
| 2011/0074710 A1 | 3/2011 | Weeldreyer et al. |
| 2011/0074719 A1 | 3/2011 | Yeh et al. |
| 2011/0078624 A1 | 3/2011 | Missig et al. |
| 2011/0087739 A1 | 4/2011 | Lin |
| 2011/0087988 A1 | 4/2011 | Ray et al. |
| 2011/0093778 A1 | 4/2011 | Kim et al. |
| 2011/0093816 A1 | 4/2011 | Chang et al. |
| 2011/0093821 A1 | 4/2011 | Wigdor et al. |
| 2011/0107272 A1 | 5/2011 | Aguilar |
| 2011/0109563 A1 | 5/2011 | Liu |

(56) References Cited

U.S. PATENT DOCUMENTS

| | | |
|---|---|---|
| 2011/0113337 A1 | 5/2011 | Liu et al. |
| 2011/0113486 A1 | 5/2011 | Hunt et al. |
| 2011/0119586 A1 | 5/2011 | Blinnikka et al. |
| 2011/0126156 A1 | 5/2011 | Krishnaraj et al. |
| 2011/0154235 A1 | 6/2011 | Min et al. |
| 2011/0157027 A1 | 6/2011 | Rissa |
| 2011/0161845 A1 | 6/2011 | Stallings et al. |
| 2011/0163968 A1 | 7/2011 | Hogan |
| 2011/0167341 A1 | 7/2011 | Cranfill et al. |
| 2011/0170252 A1 | 7/2011 | Jones et al. |
| 2011/0173556 A1 | 7/2011 | Czerwinski et al. |
| 2011/0173568 A1 | 7/2011 | Royal, Jr. et al. |
| 2011/0173569 A1 | 7/2011 | Howes et al. |
| 2011/0175930 A1 | 7/2011 | Hwang et al. |
| 2011/0179386 A1 | 7/2011 | Shaffer et al. |
| 2011/0179387 A1 | 7/2011 | Shaffer et al. |
| 2011/0184960 A1 | 7/2011 | Delpha et al. |
| 2011/0185318 A1 | 7/2011 | Hinckley et al. |
| 2011/0191675 A1 | 8/2011 | Kauranen |
| 2011/0202866 A1 | 8/2011 | Huang et al. |
| 2011/0209039 A1 | 8/2011 | Hinckley et al. |
| 2011/0209089 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0216064 A1 | 9/2011 | Dahl et al. |
| 2011/0225547 A1 | 9/2011 | Fong et al. |
| 2011/0231796 A1 | 9/2011 | Vigil |
| 2011/0252346 A1 | 10/2011 | Chaudhri |
| 2011/0252380 A1 | 10/2011 | Chaudhri |
| 2011/0252381 A1 | 10/2011 | Chaudhri |
| 2011/0276864 A1 | 11/2011 | Oules |
| 2011/0279461 A1 | 11/2011 | Hamilton et al. |
| 2011/0290687 A1 | 12/2011 | Han |
| 2011/0297564 A1* | 12/2011 | Kim ................. A45C 11/00 206/320 |
| 2011/0297566 A1 | 12/2011 | Gallagher et al. |
| 2011/0316884 A1 | 12/2011 | Giambalvo et al. |
| 2011/0320978 A1 | 12/2011 | Horodezky et al. |
| 2012/0005584 A1 | 1/2012 | Seago et al. |
| 2012/0009000 A1 | 1/2012 | Starrett |
| 2012/0009903 A1 | 1/2012 | Schultz et al. |
| 2012/0012483 A1 | 1/2012 | Fan |
| 2012/0023101 A1 | 1/2012 | Heimendinger et al. |
| 2012/0028687 A1 | 2/2012 | Wykes |
| 2012/0037285 A1 | 2/2012 | Diebel et al. |
| 2012/0037523 A1 | 2/2012 | Diebel et al. |
| 2012/0050185 A1 | 3/2012 | Davydov et al. |
| 2012/0050332 A1 | 3/2012 | Nikara et al. |
| 2012/0057288 A1* | 3/2012 | Chou ................. G06F 1/1628 361/679.09 |
| 2012/0072853 A1 | 3/2012 | Krigstrom et al. |
| 2012/0072953 A1 | 3/2012 | James et al. |
| 2012/0084704 A1 | 4/2012 | Lee et al. |
| 2012/0102433 A1 | 4/2012 | Falkenburg |
| 2012/0125791 A1 | 5/2012 | Parker et al. |
| 2012/0151397 A1 | 6/2012 | Oberstein et al. |
| 2012/0159395 A1 | 6/2012 | Deutsch et al. |
| 2012/0159402 A1 | 6/2012 | Nurmi et al. |
| 2012/0161791 A1 | 6/2012 | Shaw |
| 2012/0162266 A1 | 6/2012 | Douglas et al. |
| 2012/0167008 A1 | 6/2012 | Zaman |
| 2012/0167011 A1 | 6/2012 | Zaman |
| 2012/0174005 A1 | 7/2012 | Deutsch et al. |
| 2012/0174029 A1 | 7/2012 | Bastide et al. |
| 2012/0174034 A1 | 7/2012 | Chae et al. |
| 2012/0176401 A1 | 7/2012 | Hayward et al. |
| 2012/0179992 A1 | 7/2012 | Smuga |
| 2012/0180001 A1 | 7/2012 | Griffin et al. |
| 2012/0194448 A1 | 8/2012 | Rothkopf |
| 2012/0210265 A1 | 8/2012 | Delia et al. |
| 2012/0211377 A1 | 8/2012 | Sajid |
| 2012/0212495 A1 | 8/2012 | Butcher et al. |
| 2012/0216139 A1 | 8/2012 | Ording et al. |
| 2012/0233571 A1 | 9/2012 | Wever et al. |
| 2012/0235930 A1 | 9/2012 | Lazaridis et al. |
| 2012/0244841 A1 | 9/2012 | Teng |
| 2012/0254780 A1 | 10/2012 | Mouton et al. |
| 2012/0254808 A1 | 10/2012 | Gildfind |
| 2012/0265644 A1 | 10/2012 | Roa et al. |
| 2012/0272181 A1 | 10/2012 | Rogers et al. |
| 2012/0278727 A1 | 11/2012 | Ananthakrishnan et al. |
| 2012/0290962 A1 | 11/2012 | Zielinski et al. |
| 2012/0293953 A1* | 11/2012 | Wu ................. F16M 11/10 361/679.56 |
| 2012/0299968 A1 | 11/2012 | Wong et al. |
| 2012/0300383 A1 | 11/2012 | Lauder et al. |
| 2012/0304068 A1 | 11/2012 | Zaman et al. |
| 2012/0304092 A1 | 11/2012 | Jarrett et al. |
| 2012/0304102 A1 | 11/2012 | LeVee et al. |
| 2012/0304106 A1 | 11/2012 | LeVee et al. |
| 2012/0304107 A1 | 11/2012 | Nan et al. |
| 2012/0304108 A1 | 11/2012 | Jarrett et al. |
| 2012/0304113 A1 | 11/2012 | Patten et al. |
| 2012/0304114 A1 | 11/2012 | Wong et al. |
| 2012/0304116 A1 | 11/2012 | Donahue et al. |
| 2012/0304117 A1 | 11/2012 | Donahue et al. |
| 2012/0304118 A1 | 11/2012 | Donahue et al. |
| 2012/0304131 A1 | 11/2012 | Nan et al. |
| 2012/0304132 A1 | 11/2012 | Sareen et al. |
| 2012/0304133 A1 | 11/2012 | Nan et al. |
| 2012/0311485 A1 | 12/2012 | Caliendo, Jr. et al. |
| 2012/0314342 A1 | 12/2012 | Sheu et al. |
| 2012/0323992 A1 | 12/2012 | Brobst et al. |
| 2012/0327580 A1* | 12/2012 | Gengler ................. G06F 1/1626 361/679.09 |
| 2013/0033525 A1 | 2/2013 | Markiewicz |
| 2013/0042203 A1 | 2/2013 | Wong et al. |
| 2013/0042206 A1 | 2/2013 | Zaman et al. |
| 2013/0044136 A1 | 2/2013 | Matthews |
| 2013/0044141 A1 | 2/2013 | Markiewicz |
| 2013/0047079 A1 | 2/2013 | Kroeger et al. |
| 2013/0047105 A1 | 2/2013 | Jarrett |
| 2013/0047117 A1 | 2/2013 | Deutsch |
| 2013/0047126 A1 | 2/2013 | Sareen |
| 2013/0057587 A1 | 3/2013 | Leonard et al. |
| 2013/0057588 A1 | 3/2013 | Leonard |
| 2013/0063442 A1 | 3/2013 | Zaman |
| 2013/0063443 A1 | 3/2013 | Garside |
| 2013/0063465 A1 | 3/2013 | Zaman |
| 2013/0063490 A1 | 3/2013 | Zaman et al. |
| 2013/0067381 A1 | 3/2013 | Yalovsky |
| 2013/0067390 A1 | 3/2013 | Kwiatkowski et al. |
| 2013/0067391 A1 | 3/2013 | Pittappilly |
| 2013/0067398 A1 | 3/2013 | Pittappilly |
| 2013/0067399 A1 | 3/2013 | Elliott |
| 2013/0067412 A1 | 3/2013 | Leonard et al. |
| 2013/0067420 A1 | 3/2013 | Pittappilly |
| 2013/0083953 A1* | 4/2013 | Chang ................. G06F 1/1628 381/333 |
| 2013/0088431 A1 | 4/2013 | Ballagas et al. |
| 2013/0093757 A1 | 4/2013 | Cornell |
| 2013/0102366 A1 | 4/2013 | Teng |
| 2013/0107438 A1 | 5/2013 | Lee et al. |
| 2013/0114198 A1* | 5/2013 | Gengler ................. B65D 25/00 361/679.08 |
| 2013/0134061 A1 | 5/2013 | Wu et al. |
| 2013/0145244 A1 | 6/2013 | Rothschiller et al. |
| 2013/0167058 A1 | 6/2013 | LeVee |
| 2013/0175200 A1 | 7/2013 | Poon et al. |
| 2013/0178155 A1* | 7/2013 | Shulenberger .......... G06F 1/162 455/41.1 |
| 2013/0179781 A1 | 7/2013 | Nan et al. |
| 2013/0220043 A1 | 8/2013 | hsu et al. |
| 2013/0235521 A1* | 9/2013 | Burch ................. G06F 1/1635 361/679.48 |
| 2013/0242490 A1 | 9/2013 | Ku |
| 2013/0268422 A1 | 10/2013 | Ram et al. |
| 2013/0270980 A1* | 10/2013 | Hsu ................. H05K 5/03 312/223.1 |
| 2013/0277271 A1 | 10/2013 | Toulotte |

(56) References Cited

U.S. PATENT DOCUMENTS

| | | | |
|---|---|---|---|
| 2013/0297700 A1 | 11/2013 | Hayton et al. | |
| 2013/0329375 A1 | 12/2013 | Chiang et al. | |
| 2013/0334020 A1 | 12/2013 | Lan | |
| 2014/0029189 A1 | 1/2014 | Chang et al. | |
| 2014/0035820 A1 | 2/2014 | Zheng | |
| 2014/0055937 A1 | 2/2014 | Wang | |
| 2014/0082552 A1 | 3/2014 | Zaman | |
| 2014/0083883 A1 | 3/2014 | Elias | |
| 2014/0109008 A1 | 4/2014 | Zaman | |
| 2014/0211393 A1* | 7/2014 | Lee | G06F 1/1626 361/679.12 |
| 2014/0218855 A1 | 8/2014 | Fujino | |
| 2014/0254079 A1* | 9/2014 | Yang | G06F 1/1632 361/679.09 |
| 2014/0262854 A1 | 9/2014 | Chen et al. | |
| 2014/0298062 A1 | 10/2014 | Lee | |
| 2014/0311880 A1* | 10/2014 | Krumpelman | H01H 13/14 200/5 A |
| 2014/0332418 A1 | 11/2014 | Cheung et al. | |
| 2015/0001105 A1* | 1/2015 | Nyholm | A45C 11/00 206/45.2 |
| 2015/0027603 A1 | 1/2015 | Mogol | |
| 2015/0113476 A1 | 4/2015 | Deutsch et al. | |
| 2015/0122850 A1 | 5/2015 | Quehl | |
| 2015/0280768 A1 | 10/2015 | Huang | |
| 2015/0286350 A1 | 10/2015 | Gu | |
| 2015/0286351 A1 | 10/2015 | Gu | |
| 2015/0286352 A1 | 10/2015 | Gu | |
| 2015/0286387 A1 | 10/2015 | Gu | |
| 2015/0293564 A1 | 10/2015 | Gu | |
| 2015/0293601 A1 | 10/2015 | Gu | |
| 2015/0296060 A1 | 10/2015 | Gu | |

FOREIGN PATENT DOCUMENTS

| | | |
|---|---|---|
| CN | 1735856 | 2/2006 |
| CN | 1749936 | 3/2006 |
| CN | 1786906 | 6/2006 |
| CN | 1851641 | 10/2006 |
| CN | 1936797 | 3/2007 |
| CN | 101006425 | 7/2007 |
| CN | 101075174 | 11/2007 |
| CN | 101114303 | 1/2008 |
| CN | 101150798 | 3/2008 |
| CN | 101228570 | 7/2008 |
| CN | 101316401 | 12/2008 |
| CN | 101354649 | 1/2009 |
| CN | 201477524 | 5/2010 |
| CN | 101770332 | 7/2010 |
| CN | 101809531 | 8/2010 |
| CN | 201556164 | 8/2010 |
| CN | 101976099 | 2/2011 |
| CN | 201741069 U | 2/2011 |
| CN | 102144213 | 8/2011 |
| CN | 102197702 | 9/2011 |
| CN | 202075698 | 12/2011 |
| CN | 202206156 | 4/2012 |
| CN | 102520803 | 6/2012 |
| CN | 102624970 | 8/2012 |
| CN | 202472496 U | 10/2012 |
| CN | 202904485 | 4/2013 |
| CN | 103105995 | 5/2013 |
| CN | 203025612 | 6/2013 |
| CN | 103197837 | 7/2013 |
| CN | 203133676 | 8/2013 |
| CN | 103475784 | 12/2013 |
| CN | 103513715 | 1/2014 |
| CN | 103562858 | 2/2014 |
| CN | 103562917 | 2/2014 |
| CN | 103629493 | 3/2014 |
| EP | 0583060 | 2/1994 |
| EP | 0965932 | 12/1999 |
| EP | 1337093 | 8/2003 |
| EP | 1526463 | 4/2005 |
| EP | 1752868 | 2/2007 |
| EP | 2172836 | 4/2009 |
| EP | 2535809 | 12/2012 |
| EP | 2677515 | 12/2013 |
| JP | 2004227393 | 8/2004 |
| JP | 2004357257 | 12/2004 |
| JP | 2006139615 | 6/2006 |
| KR | 200303655 | 2/2003 |
| KR | 20060019198 | 3/2006 |
| KR | 1020070036114 | 4/2007 |
| KR | 20070093585 | 9/2007 |
| KR | 1020070098337 | 10/2007 |
| KR | 20070120368 | 12/2007 |
| KR | 1020080025951 | 3/2008 |
| KR | 1020080041809 | 5/2008 |
| KR | 1020080076390 | 8/2008 |
| KR | 100854333 | 9/2008 |
| KR | 20080084156 | 9/2008 |
| KR | 1020080084156 | 9/2008 |
| KR | 1020080113913 | 12/2008 |
| KR | 20090002951 | 1/2009 |
| KR | 1020090041635 | 4/2009 |
| KR | 20090053143 | 5/2009 |
| KR | 20100010072 | 2/2010 |
| KR | 20100048375 | 5/2010 |
| KR | 20100056369 | 5/2010 |
| KR | 1020100056369 | 5/2010 |
| TW | 201023026 | 6/2010 |
| TW | 201106128 | 2/2011 |
| WO | WO-9926127 | 5/1999 |
| WO | WO-0129976 | 4/2001 |
| WO | WO-2005026931 | 3/2005 |
| WO | WO-2005027506 | 3/2005 |
| WO | WO-2006019639 | 2/2006 |
| WO | WO-2007121557 | 11/2007 |
| WO | WO-2007134623 | 11/2007 |
| WO | WO-2008030608 | 3/2008 |
| WO | WO-2008031871 | 3/2008 |
| WO | WO-2008035831 | 3/2008 |
| WO | WO-2008084211 | 7/2008 |
| WO | WO-2008146784 | 12/2008 |
| WO | WO-2009000043 | 12/2008 |
| WO | WO-2009012398 | 1/2009 |
| WO | WO-2009049331 | 4/2009 |
| WO | WO-2009054809 | 4/2009 |
| WO | WO-2010024969 | 3/2010 |
| WO | WO-2010048229 | 4/2010 |
| WO | WO-2010048448 | 4/2010 |
| WO | WO-2010048519 | 4/2010 |
| WO | WO-2010117643 | 10/2010 |
| WO | WO-2010117661 | 10/2010 |
| WO | WO-2010119356 | 10/2010 |
| WO | WO-2010135155 | 11/2010 |
| WO | WO-2011041885 | 4/2011 |
| WO | WO-2013158110 | 10/2013 |

OTHER PUBLICATIONS

"International Search Report and Written Opinion", Application No. PCT/CN2014/089868, Aug. 3, 2015, 11 pages.

"Non-Final Office Action", U.S. Appl. No. 14/516,294, Oct. 29, 2015, 14 pages.

"Non-Final Office Action", U.S. Appl. No. 14/517,379, Oct. 7, 2015, 16 pages.

"Authoritative Dictionary of IEEE Standards Terms, 7th ed.", Definitions—processor, memory, and storage, 2000, 3 pages.

"Extended European Search Report", EP Application No. 11871863.4, May 11, 2015, 8 pages.

"Extended European Search Report", EP Application No. 11871917.8, May 11, 2015, 9 pages.

"Extended European Search Report", EP Application No. 11872137.2, Apr. 9, 2015, 12 pages.

"Foreign Office Action", CN Application No. 201210331158.8, May 11, 2015, 7 pages.

"Foreign Office Action", CN Application No. 201210331670.2, Mar. 25, 2015, 14 pages.

"Foreign Office Action", CO Application No. 13300256, Apr. 11, 2015, 8 Pages.

(56) References Cited

OTHER PUBLICATIONS

"Foreign Office Action", CO Application No. 13300265, Apr. 21, 2015, 11 Pages.
"Foreign Office Action", PH Application No. PH/1/2013/502367, Apr. 24, 2015, 3 pages.
"Non-Final Office Action", U.S. Appl. No. 13/073,300, Apr. 30, 2015, 15 pages.
"Non-Final Office Action", U.S. Appl. No. 13/229,693, Apr. 23, 2015, 28 pages.
"Non-Final Office Action", U.S. Appl. No. 13/550,432, Apr. 27, 2015, 15 pages.
"Non-Final Office Action", U.S. Appl. No. 13/904,880, May 4, 2015, 22 pages.
"Notice of Allowance", U.S. Appl. No. 13/118,333, May 4, 2015, 16 pages.
"Notice of Allowance", U.S. Appl. No. 13/229,702, Apr. 29, 2015, 7 pages.
"Notice of Allowance", U.S. Appl. No. 13/345,383, May 18, 2015, 5 pages.
"Rename a file", Retrieved from <http://windows.microsoft.com/en-us/windows7/rename-a-file> on Apr. 27, 2015, Aug. 24, 2009, 1 page.
Bederson,"Implementing a Zooming User Interface: Experience Building Pad++", Software Practice & Experience, Wiley & Sons, Aug. 1998, 34 pages.
Bederson,"Jazz: An Extensible Zoomable User Interface Graphics Toolkit in Java", Proceedings of the 2000 ACM SIGCPR Conference, Apr. 2000, 11 pages.
Jetter,"Materializing the Query with Facet-Streams—A Hybrid Surface for Collaborative Search on Tabletops", May 7, 2011, 10 pages.
"International Search Report and Written Opinion", Application No. PCT/CN2014/074788, Dec. 30, 2014, 12 pages.
"International Search Report and Written Opinion", Application No. PCT/CN2014/074988, Jan. 8, 2015, 13 pages.
"International Search Report and Written Opinion", Application No. PCT/CN2014/074825, Jan. 5, 2015, 15 pages.
"International Search Report and Written Opinion", Application No. PCT/CN2014/074783, Dec. 31, 2014, 15 pages.
"International Search Report and Written Opinion", Application No. PCT/CN2014/075038, Dec. 30, 2014, 16 pages.
"7 Genius Tablet Cover Features", retrieved from http://www.ebay.com/gds/7-Genius-Tablet-Cover-Features-/10000000177629377/g.html on Oct. 29, 2014, Apr. 28, 2014, 6 pages.
"Adobe Acrobat 8 Standard User Guide", Adobe Systems Incorporated, 2007, pp. 34 & 36.
"Advisory Action", U.S. Appl. No. 12/414,382, Jan. 20, 2012, 3 pages.
"Advisory Action", U.S. Appl. No. 12/433,605, Apr. 5, 2012, 3 pages.
"Airbender 2.0", Retrieved From: <http://www.newtrent.com/airbender-2-0-nt30b.html> Mar. 31, 2014, 2013, 2 Pages.
"Alltel Adds Dedicated Search Key to Phones", Retrieved from: <http://www.phonescoop.com/news/item.php?n=2159> on Nov. 26, 2008., Apr. 12, 2007, 2 Pages.
"Android 2.3 User's Guide", Aug-2.3-103, Android mobile technology platform 2.3, Dec. 13, 2010, 380 pages.
"Apple iPhone—8GB At&T", Retrieved from: <http://nytimes.com.com/smartphones/apple-iphone-8gb-at/4515-6452_7-32309245.html> on Nov. 20, 2008, Jun. 29, 2007, 11 pages.
"Application User Model IDs", Retrieved from: <http://msdn.microsoft.com/en-us/library/dd378459(VS.85).aspx> on Sep. 28, 2010, 2010, 6 pages.
"Ask Web Hosting", Retrieved from: <http://www.askwebhosting.com/story/18501/HTC_FUZE_From_ATandampT_Fuses_Fun_and_Function_With_the_One-Touch_Power_of_TouchFLO_3D.html> on May 5, 2009., Nov. 11, 2008, 3 pages.
"Basics of Your Device: Get Familiar with the Home Screen", Nokia USA—How to—retrieved from <http://www.nokia.ca/get-support-and-software/product-support/c6-01/how-to#> on May 11, 2011, 3 pages.

"Blackberry office tools: Qwerty Convert", Retrieved from: <http://blackberrysoftwarelistnet/blackberry/download-software/blackberry-office/qwerty_convertaspx> on Nov. 20, 2008, 1 page.
"Bluetooth 360 Rotating Removable Keyboard Case Cover Stand for iPad 2 3 4", Retrieved From: <http://www.ebay.com/itm/Bluetooth-360-Rotating-Removable-Keyboard-Case-Cover-Stand-for-iPad-2-3-44200999748037> Mar. 31, 2014, Mar. 19, 2014, 3 Pages.
"Calc4M", Retrieved from: <http://www.hellebo.com/Calc4M.html> on Dec. 11, 2008, Sep. 10, 2008, 4 Pages.
"Class ScrollView", Retrieved from: <http://www.blackberry.com/developers/docs/6.0.0api/net/rim/device/api/ui/ScrollView.html> on Sep. 28, 2010, 13 pages.
"Content-Centric E-Mail Message Analysis in Litigation Document Reviews", Retrieved from: <http://www.busmanagement.com/article/Issue-14/Data-Management/Content-Centric-E-Mail-Message-Analysis-in-Litigation-Document-Reviews/> on May 6, 2009, 2009, 5 Pages.
"Daphne v1.47", retrieved from <http://www.drk.com.ar/daphne.php> on Nov. 18, 2011, 3 pages.
"Dial a number", Retrieved from: <http://www.phonespell.org/ialhelp.html> on Nov. 20, 2008, 1 page.
"DuoSense™ Multi-Touch Gestures", Retrieved from: <http://www.n-trig.com/Data/Uploads/Misc/DuoSenseMTG_final.pdf>, Jul. 2008, 4 pages.
"Elecont Quick Desktop 1.0.43", Retrieved from: <http://handheld.softpedia.com/get/System-Utilities/Launcher-Applications/Elecont-Quick-Desktop-72131.shtml> on May 5, 2009., Mar. 13, 2009, 2 pages.
"Email Notification for Microsoft Outlook and Outlook Express", Retrieved from: <http://www.contextmagic.com/express-notification/> on Sep. 29, 2010, Jul. 21, 2004, 3 pages.
"Enhanced IBM Power Systems Software and PowerVM Restructuring", IBM United States Announcement 208-082, dated Apr. 8, 2008, available at <http://www.ibm.com/common/ssi/rep_ca/2/897/ENUS208-082/ENUS208082.PDF>,Apr. 8, 2008, pp. 1-19.
"Exclusive: Windows Mobile 7 to Focus on Touch and Motion Gestures", Retrieved from: <http://anti-linux.blogspot.com/2008/08/exclusive-windows-mobile-7-to-focus-on.html> on May 6, 2009, Aug. 1, 2008, 14 pages.
"Extended European Search Report", EP Application No. 09818253.8, Apr. 10, 2012, 7 pages.
"Extended European Search Report", EP Application No. 09822736.6, Dec. 18, 2012, 7 pages.
"Extended European Search Report", EP Application No. 10762112.0, Aug. 2, 2013, 7 Pages.
"eXtreme Energy Conservation: Advanced Power-Saving Software for Wireless Devices", White Paper, Freescale Semiconductor, Inc., Document No. XTMENRGYCNSVWP, Rev #0, available at <http://www.freescale.com/files/32bit/doc/white_paper/XTMENRGYCNSVWP.pdf>,Feb. 2006, 15 pages.
"Final Office Action", U.S. Appl. No. 11/305,789, Apr. 1, 2009, 10 pages.
"Final Office Action", U.S. Appl. No. 11/502,264, Feb. 4, 2010, 15 pages.
"Final Office Action", U.S. Appl. No. 11/502,264, Mar. 29, 2013, 16 pages.
"Final Office Action", U.S. Appl. No. 11/502,264, Apr. 3, 2009, 9 pages.
"Final Office Action", U.S. Appl. No. 12/244,545, Dec. 7, 2011, 16 pages.
"Final Office Action", U.S. Appl. No. 12/244,545, Sep. 7, 2012, 23 pages.
"Final Office Action", U.S. Appl. No. 12/413,977, Nov. 17, 2011, 16 pages.
"Final Office Action", U.S. Appl. No. 12/414,382, Dec. 23, 2011, 7 pages.
"Final Office Action", U.S. Appl. No. 12/414,476, Apr. 8, 2013, 25 pages.
"Final Office Action", U.S. Appl. No. 12/414,476, Dec. 1, 2011, 20 pages.
"Final Office Action", U.S. Appl. No. 12/433,605, Jul. 17, 2013, 13 pages.

(56) References Cited

OTHER PUBLICATIONS

"Final Office Action", U.S. Appl. No. 12/433,605, Feb. 3, 2012, 11 pages.
"Final Office Action", U.S. Appl. No. 12/433,667, Jan. 7, 2013, 17 pages.
"Final Office Action", U.S. Appl. No. 12/433,667, Sep. 13, 2011, 17 pages.
"Final Office Action", U.S. Appl. No. 12/469,458, Feb. 1, 2013, 19 pages.
"Final Office Action", U.S. Appl. No. 12/469,458, Nov. 17, 2011, 15 pages.
"Final Office Action", U.S. Appl. No. 12/469,480, Apr. 10, 2013, 21 pages.
"Final Office Action", U.S. Appl. No. 12/469,480, Feb. 9, 2012, 17 pages.
"Final Office Action", U.S. Appl. No. 12/480,969, Nov. 23, 2012, 18 pages.
"Final Office Action", U.S. Appl. No. 12/480,969, Jul. 24, 2013, 19 pages.
"Final Office Action", U.S. Appl. No. 12/484,799, Apr. 30, 2012, 13 pages.
"Final Office Action", U.S. Appl. No. 12/560,081, Mar. 14, 2012, 16 pages.
"Final Office Action", U.S. Appl. No. 12/577,400, Aug. 16, 2013, 25 pages.
"Final Office Action", U.S. Appl. No. 12/577,400, Sep. 14, 2012, 26 pages.
"Final Office Action", U.S. Appl. No. 12/721,422, Mar. 7, 2013, 10 pages.
"Final Office Action", U.S. Appl. No. 12/972,967, Oct. 11, 2013, 21 pages.
"Final Office Action", U.S. Appl. No. 12/983,106, Oct. 7, 2013, 19 pages.
"Final Office Action", U.S. Appl. No. 13/073,300, Apr. 1, 2014, 14 pages.
"Final Office Action", U.S. Appl. No. 13/118,181, Dec. 20, 2013, 18 pages.
"Final Office Action", U.S. Appl. No. 13/118,204, Nov. 21, 2013, 24 pages.
"Final Office Action", U.S. Appl. No. 13/118,221, Mar. 17, 2014, 21 pages.
"Final Office Action", U.S. Appl. No. 13/118,321, Dec. 19, 2013, 30 pages.
"Final Office Action", U.S. Appl. No. 13/118,333, Apr. 23, 2014, 22 pages.
"Final Office Action", U.S. Appl. No. 13/118,339, Aug. 22, 2013, 21 pages.
"Final Office Action", U.S. Appl. No. 13/118,347, Aug. 15, 2013, 25 pages.
"Final Office Action", U.S. Appl. No. 13/224,258, Sep. 11, 2013, 37 pages.
"Final Office Action", U.S. Appl. No. 13/229,693, Sep. 4, 2013, 23 pages.
"Final Office Action", U.S. Appl. No. 13/335,001, Nov. 22, 2013, 18 pages.
"Final Office Action", U.S. Appl. No. 13/345,383, Jul. 30, 2013, 27 pages.
"Final Office Action", U.S. Appl. No. 13/655,386, Jun. 6, 2013, 34 pages.
"Final Office Action", U.S. Appl. No. 13/656,354, Jun. 17, 2013, 14 pages.
"Final Office Action", U.S. Appl. No. 13/656,574, Aug. 23, 2013, 20 pages.
"Final Office Action", U.S. Appl. No. 13/657,621, Sep. 10, 2013, 18 pages.
"Final Office Action", U.S. Appl. No. 13/657,646, May 6, 2013, 12 pages.
"Final Office Action", U.S. Appl. No. 13/657,789, Jun. 21, 2013, 35 pages.
"Final Office Action", U.S. Appl. No. 13/658,694, Oct. 30, 2013, 17 pages.
"Flexible Water Resistant Full Size Keyboard USB", Retrieved from <http://www.fentek-ind.com/kbflusbps2b.htm#.VFCJpbUcwnt>, Jan. 26, 2013, 6 pages.
"Foreign Office Action", CN Application No. 200980142644.1, Aug. 20, 2013, 9 Pages.
"Foreign Office Action", CN Application No. 200980142661.5, Sep. 24, 2013, 8 Pages.
"Foreign Office Action", JP Application No. 2011-533353, Jul. 5, 2013, 9 Pages.
"Foreign Office Action", CL Application No. 2379-2011, Jul. 3, 2013, 8 pages.
"Foreign Office Action", CN Application No. 200980139831.4, Jul. 1, 2013, 12 pages.
"Foreign Office Action", CN Application No. 200980142632.9, Jun. 14, 2013, 6 pages.
"Foreign Office Action", CN Application No. 200980142632.9, Jan. 29, 2013, 11 pages.
"Foreign Office Action", CN Application No. 200980142644.1, Apr. 03, 2013, 10 pages.
"Foreign Office Action", CN Application No. 200980142661.5, Jan. 21, 2013, 12 pages.
"Foreign Office Action", CN Application No. 201080015728.1, May 16, 2013, 10 pages.
"Foreign Office Action", CN Application No. 201080015728.1, Dec. 26, 2012, 9 pages.
"Foreign Office Action", CN Application No. 201080015788.3, Jun. 5, 2013, 12 Pages.
"Foreign Office Action", CN Application No. 201080015788.3, Dec. 24, 2012, 10 pages.
"Foreign Office Action", CN Application No. 201080023212.1, Dec. 5, 2012, 10 pages.
"Foreign Office Action", CN Application No. 201080023212.1, Jun. 5, 2013, 8 pages.
"Foreign Office Action", CN Application No. 201080045865.X, Dec. 4, 2012, 10 pages.
"Foreign Office Action", CN Application No. 201080045865.X, Jun. 4, 2013, 10 pages.
"Foreign Office Action", CN Application No. 201110429183.5, Jan. 6, 2014, 10 Pages.
"Foreign Office Action", CN Application No. 201110437542.1, Jan. 6, 2014, 10 Pages.
"Foreign Office Action", CN Application No. 201110437572.2, Dec. 3, 2013, 7 pages.
"Foreign Office Action", CN Application No. 201110454251.3, Dec. 27, 2013, 12 Pages.
"Foreign Office Action", EP Application No. 10823883.3, Aug. 10, 2012, 5 pages.
"Foreign Office Action", JP Application No. 2012-503523, Apr. 22, 2013, 5 Pages.
"Freeware.mobi", Retrieved from: <http://www.palmfreeware.mobi/download-palette.html> on Nov. 6, 2008, Oct. 9, 2001, 2 pages.
"Getting started with Logitech® Fold-Up Keyboard", Retrieved from <http://www.logitech.com/assets/42319/fold-up-keyboard-for-ipad-2-quick-start-guide.pdf>, May 27, 2012, 12 pages.
"GnomeCanvas", Retrieved from: <http://library.gnome.org/devel/libgnomecanvas/unstable/GnomeCanvas.html> on Sep. 28, 2010, 11 pages.
"Google Apps versus Office 365: Audit Logs", Retrieved From: <http://www.linkgard.com/blog/google-apps/google-apps-vs-office-365-audit-logs.html> Mar. 29, 2014, Jul. 23, 2013, 8 pages.
"Heatmap", Retrieved From: <https://supportgoogle.com/drive/answer/91599?hl=en> Mar. 29, 2014, 2 Pages.
"How Do I Cancel a "Drag" Motion on an Android Seekbar?", retrieved from <http://stackoverflow.com/questions/2917969/how-do-i-cancel-a-drag-motion-on-an-android-seekbar> on Jun. 20, 2011, May 28, 2010, 1 page.
"How do I use Categories with my Weblog?", Retrieved from: <http://tpsupport.mtcs.sixapart.com/tp/us-tp1/how_do_i_use_categories_with_my_weblog.html> on Sep. 28, 2010, Sep. 16, 2009, 3 pages.

(56) References Cited

OTHER PUBLICATIONS

"How do you dial 1-800-FLOWERS", Retrieved from: <http://blogs.msdn.com/windowsmobile/archive/2007/02/06/how-do-you-dial-1-800-flowers.aspx> on Nov. 20, 2008, Feb. 6, 2007, 24 pages.
"How-to Close an Application in BlackBerry PlayBook?", retrieved from <http://stackoverflow.com/questions/5277027/how-to-close-an-application-in-blackberry-playbook> on Nov. 18, 2011, 2 pages.
"HTC Shows HTC Snap with Snappy Email Feature", Retrieved from: <http://www.wirelessandmobilenews.com/smartphones/ on May 5, 2009>, May 4, 2009, 10 Pages.
"IntelliScreen-New iPhone App Shows Today Screen Type Info in Lock Screen", Retrieved from: <http://justanotheriphoneblog.com/wordpress//2008/05/13/intelliscreen-new-iphone-app-shows-today-screen-type-info-on-lock-screen/> on Nov. 12, 2008, May 13, 2008, 11 pages.
"International Search Report and Written Opinion", Application No. PCT/US2010/028555, Oct. 12, 2010, 10 pages.
"International Search Report and Written Opinion", Application No. PCT/US2010/028699, Oct. 4, 2010, 10 pages.
"International Search Report and Written Opinion", Application No. PCT/US2013/059563, Nov. 7, 2013, 10 pages.
"International Search Report and Written Opinion", Application No. PCT/US2011/067075, Dec. 12, 2012, 10 pages.
"International Search Report and Written Opinion", Application No. PCT/US2009/061864, May 14, 2010, 10 pages.
"International Search Report and Written Opinion", Application No. PCT/US2009/061382, May 26, 2010, 10 pages.
"International Search Report and Written Opinion", Application No. PCT/US2011/055725, Sep. 27, 2012, 10 pages.
"International Search Report and Written Opinion", Application No. PCT/US2009/061735, Jun. 7, 2010, 11 pages.
"International Search Report and Written Opinion", Application No. PCT/US2010/034772, Dec. 29, 2010, 12 pages.
"International Search Report and Written Opinion", Application No. PCT/CN2014/074793, Sep. 30, 2014, 15 pages.
"International Search Report and Written Opinion", Application No. PCT/US2012/047091, Dec. 27, 2012, 15 pages.
"International Search Report and Written Opinion", Application No. PCT/CN2014/075046, Oct. 28, 2014, 16 pages.
"International Search Report and Written Opinion", Application No. PCT/US2013/061066, Feb. 4, 2014, 17 pages.
"International Search Report and Written Opinion", Application No. PCT/US2010/038730, Jan. 19, 2011, 8 pages.
"International Search Report and Written Opinion", Application No. PCT/US2011/055513, Mar. 27, 2012, 8 pages.
"International Search Report and Written Opinion", Application No. PCT/US2010/052119, May 2, 2011, 8 pages.
"International Search Report and Written Opinion", Application No. PCT/US2011/055514, May 22, 2012, 8 pages.
"International Search Report and Written Opinion", Application No. PCT/US2011/055512, May 24, 2012, 8 pages.
"International Search Report and Written Opinion", Application No. PCT/US2011/055520, May 9, 2012, 8 pages.
"International Search Report and Written Opinion", Application No. PCT/US2011/055524, Jun. 1, 2012, 8 pages.
"International Search Report and Written Opinion", Application No. PCT/US2011/065702, Aug. 29, 2012, 8 pages.
"International Search Report and Written Opinion", Application No. PCT/US2011/055736, Sep. 17, 2012, 8 pages.
"International Search Report and Written Opinion", Application No. PCT/US2011/067073, Sep. 17, 2012, 8 pages.
"International Search Report and Written Opinion", Application No. PCT/US2011/055511, Apr. 24, 2012, 9 pages.
"International Search Report and Written Opinion", Application No. PCT/US2011/055523, May 10, 2012, 9 pages.
"International Search Report and Written Opinion", Application No. PCT/US2011/055521, May 15, 2012, 9 pages.
"International Search Report and Written Opinion", Application No. PCT/US2011/055522, May 15, 2012, 9 pages.
"International Search Report and Written Opinion", Application No. PCT/US2011/055496, Sep. 12, 2012, 9 pages.
"International Search Report and Written Opinion", Application No. PCT/US2011/055712, Sep. 21, 2012, 9 pages.
"International Search Report and Written Opinion", Application No. PCT/US2011/055493, 9/26/212, 9 pages.
"International Search Report and Written Opinion", Application No. PCT/US2011/055478, Sep. 27, 2012, 9 pages.
"International Search Report and Written Opinion", Application No. PCT/US2011/055746, Sep. 27, 2012, 9 pages.
"International Search Report and Written Opinion", Application No. PCT/US2010/028553, Application Filing Date: Mar. 24, 2010,Nov. 9, 2010, 9 pages.
"Internet Explorer Window Restrictions", Retrieved from: http://technet.microsoft.com/en-us/library/cc759517(WS.10).aspx on Jun. 28, 2011, Microsoft TechNet, 5 pages.
"Introducing Application Styling for Windows Forms", Infragistics Software Manual, Version 7.3.20073.1043, Nov. 2007, 95 pages.
"Introduction to Windows Touch", Retrieved from: <http://download.microsoft.com/download/a/d/f/adf1347d-08dc-41a4-9084-623b1194d4b2/Win7_touch.docx>, Dec. 18, 2008, pp. 1-7.
"iPad User Guide", retrieved from <http://cyndidannerkuhn.info/CDK/iPads_Resources_files/iPad_User_Guide.pdf> on Jun. 17, 2011, 154 pages.
"iPod touch User Guide for iPhone OS 3.0 Software", Apple Inc., 2009, 153 pages.
"iwerkz Universal Foldable Bluetooth Keyboard", Retrieved from <http://mywerkz.com/wordpress/wp-content/uploads/2013/10/44652_Manual_FoldGuide_9_23A.pdf>, 2014, 2 pages.
"Keyboard (5)", Retrieved from: <http://landru.uwaterloo.ca/cgi-bin/man.cgi?section=5&topic=keyboard> on Dec. 11, 2008., Aug. 11, 1997, 8 Pages.
"Keyboard Case Adjustable 10inch Rotating Stand Bluetooth USB Apple !pad 2 3", Retrieved From:<http://shopping.rediff.com/product/keyboard-case-adjustable-10inch-rotating-stand-bluetooth-usb-apple-ipad-2-3/11935954> Mar. 31, 2014, 2 Pages.
"Keyboard Shortcuts", Retrieved from: <http://www.pctoday.com/editorial/article.asp?article=articles%2F2005%2Ft0311%2F26t11%2F26t11.asp> on Aug. 3, 2009., Nov. 2005, 5 pages.
"KeyFolio Pro™ for iPad Air", Retrieved From:<http://www.kensington.com/kensington/us/us/s/3478/keyfolio-pro%E2%84%A2-for-ipad-air.aspx#.UxYF5P1dV8F> Feb. 26, 2014, Dec. 15, 2013, 2 Pages.
"KeyFolio Thin X2™ for iPad® Air", retrieved from http://www.kensington.com/ce/ca/v/4462/1758/keyfolio-thin-x2™-for-ipad®-air#.VFBuffnLcpo on Oct. 29, 2014, 3 pages.
"Kiosk Browser Chrome Customization Firefox 2.x", Retrieved from: <http://stlouis-shopper.com/cgi-bin/mozdev-wiki/,pl?ChromeCustomization> on Oct. 22, 2008 Making a new chrome for the kiosk browser, Kiosk Project Kiosk Browser Chrome Customization Firefox-2.x,Aug. 16, 2007, 2 pages.
"Live Photo Gallery—Getting Started—from Camera to Panorama", Retrieved from: <http://webdotwiz.spaces.live.com/blog/cns!2782760752B93233!1729.entry> on May 5, 2009., Sep. 2008, 7 Pages.
"Logitech Ultrathin Keyboard Folio for iPad Air", Retrieved From: <http://store.apple.com/us/product/HE900VC/A/logitech-ultrathin-keyboard-folio-for-ipad-air> Mar. 28, 2014, 2013, 4 Pages.
"Magic mouse", Retrieved from: <http://www.apple.com/magicmouse/> on May 10, 2011, 3 pages.
"Meet ClamCase Pro", Retrieved From: <http://clamcase.com/bluetooth-ipad-keyboard-case.html?PID=6146810> Mar. 28, 2014, 6 Pages.
"MIDTB Tip Sheet: Book Courier", Retrieved from: <http://www.midtb.org/tipsbookcourier.htm> on Dec. 11, 2008., Sep. 26, 2005, 6 Pages.
"Mobile/UI/Designs/TouchScreen/workingUI", Retrieved from: <https://wiki.mozilla.org/Mobile/UI/Designs/TouchScreen/workingUI> on Oct. 26, 2009, 2009, 30 pages.
"moGo beta v.0.4", Retrieved from: <http://forum.xda-developers.com/showthread.php?t=375196> on Sep. 27, 2010, Mar. 7, 2008, 10 pages.

(56) References Cited

OTHER PUBLICATIONS

"Moko Slim Case with Wakeup Feature for the Google Nexus 7 tablet", article and video retrieved from http://www.youtube.com/watch?v=nZSgbmGuPjs on Oct. 29, 2014, Aug. 8, 2012, 2 pages.
"Multi-touch", Retrieved from <http://en.wikipedia.org/wiki/Multi-touch#Microsoft_Surface> on Apr. 24, 2009, Apr. 17, 2009, 8 pages.
"My Favorite Gadgets, System Monitor II", Retrieved from <http://www.myfavoritegadgets.info/monitors/SystemMonitorIIsystem-monitorII.html> on Mar. 12, 2013, Jun. 8, 2010, 5 pages.
"New Features in WhatsUp Gold v12.0", retrieved from <http://www.netbright.co.th/?name=product&file=readproduct&id=12> On Jun. 10, 2011, 4 pages.
"Nokia E61 Tips and Tricks for Keyboard Shortcuts", Retrieved from: <http://www.mobiletopsoft.com/board/1810/nokia-e61-tips-and-tricks-for-keyboard-shortcuts.html> on Dec. 17, 2008., Jan. 27, 2006, 2 Pages.
"Non-Final Office Action", U.S. Appl. No. 13/228,707, Oct. 25, 2013, 12 pages.
"Non-Final Office Action", U.S. Appl. No. 13/228,888, Feb. 10, 2014, 21 pages.
"Non-Final Office Action", U.S. Appl. No. 11/215,052, Jun. 23, 2011, 17 pages.
"Non-Final Office Action", U.S. Appl. No. 11/305,789, Sep. 21, 2009, 5 pages.
"Non-Final Office Action", U.S. Appl. No. 11/502,264, Sep. 30, 2009, 15 pages.
"Non-Final Office Action", U.S. Appl. No. 11/502,264, Sep. 14, 2012, 14 pages.
"Non-Final Office Action", U.S. Appl. No. 12/244,545, Mar. 27, 2012, 18 pages.
"Non-Final Office Action", U.S. Appl. No. 12/244,545, Aug. 17, 2011, 15 pages.
"Non-Final Office Action", U.S. Appl. No. 12/413,977, Jul. 19, 2011, 17 pages.
"Non-Final Office Action", U.S. Appl. No. 12/413,977, Jul. 20, 2012, 18 pages.
"Non-Final Office Action", U.S. Appl. No. 12/414,382, Jul. 26, 2011, 9 pages.
"Non-Final Office Action", U.S. Appl. No. 12/414,434, Jan. 17, 2012, 7 pages.
"Non-Final Office Action", U.S. Appl. No. 12/414,434, May 31, 2012, 7 pages.
"Non-Final Office Action", U.S. Appl. No. 12/414,434, Aug. 2, 2011, 6 pages.
"Non-Final Office Action", U.S. Appl. No. 12/414,455, Aug. 29, 2011, 8 pages.
"Non-Final Office Action", U.S. Appl. No. 12/414,458, Jul. 6, 2011, 8 pages.
"Non-Final Office Action", U.S. Appl. No. 12/414,476, Nov. 9, 2012, 22 pages.
"Non-Final Office Action", U.S. Appl. No. 12/414,476, Aug. 3, 2011, 21 pages.
"Non-Final Office Action", U.S. Appl. No. 12/433,605, Jan. 11, 2013, 7 pages.
"Non-Final Office Action", U.S. Appl. No. 12/433,605, Jun. 24, 2011, 10 pages.
"Non-Final Office Action", U.S. Appl. No. 12/433,667, Jun. 7, 2011, 15 pages.
"Non-Final Office Action", U.S. Appl. No. 12/433,667, Feb. 3, 2012, 16 pages.
"Non-Final Office Action", U.S. Appl. No. 12/469,419, Nov. 9, 2011, 15 pages.
"Non-Final Office Action", U.S. Appl. No. 12/469,419, May 23, 2012, 13 pages.
"Non-Final Office Action", U.S. Appl. No. 12/469,458, May 3, 2013, 21 pages.
"Non-Final Office Action", U.S. Appl. No. 12/469,458, Jul. 1, 2011, 15 pages.
"Non-Final Office Action", U.S. Appl. No. 12/469,458, Sep. 21, 2012, 14 pages.
"Non-Final Office Action", U.S. Appl. No. 12/469,480, Aug. 27, 2013, 22 pages.
"Non-Final Office Action", U.S. Appl. No. 12/469,480, Oct. 17, 2012, 16 pages.
"Non-Final Office Action", U.S. Appl. No. 12/469,480, Sep. 22, 2011, 14 pages.
"Non-Final Office Action", U.S. Appl. No. 12/470,558, Nov. 22, 2011, 9 pages.
"Non-Final Office Action", U.S. Appl. No. 12/480,969, Apr. 4, 2013, 22 pages.
"Non-Final Office Action", U.S. Appl. No. 12/480,969, Aug. 7, 2012, 15 pages.
"Non-Final Office Action", U.S. Appl. No. 12/484,799, Aug. 11, 2011, 12 pages.
"Non-Final Office Action", U.S. Appl. No. 12/484,799, Aug. 7, 2012, 13 pages.
"Non-Final Office Action", U.S. Appl. No. 12/484,845, Dec. 7, 2011, 16 pages.
"Non-Final Office Action", U.S. Appl. No. 12/560,081, Dec. 7, 2011, 16 pages.
"Non-Final Office Action", U.S. Appl. No. 12/577,400, Apr. 15, 2013, 25 pages.
"Non-Final Office Action", U.S. Appl. No. 12/577,400, Apr. 11, 2012, 22 pages.
"Non-Final Office Action", U.S. Appl. No. 12/721,422, Oct. 1, 2012, 7 pages.
"Non-Final Office Action", U.S. Appl. No. 12/972,967, Jan. 30, 2013, 19 pages.
"Non-Final Office Action", U.S. Appl. No. 12/977,584, Dec. 7, 2012, 8 pages.
"Non-Final Office Action", U.S. Appl. No. 12/978,184, Jan. 23, 2013, 7 pages.
"Non-Final Office Action", U.S. Appl. No. 12/983,106, Nov. 9, 2012, 17 pages.
"Non-Final Office Action", U.S. Appl. No. 13/073,300, Jul. 25, 2013, 13 pages.
"Non-Final Office Action", U.S. Appl. No. 13/118,181, Mar. 4, 2013, 22 pages.
"Non-Final Office Action", U.S. Appl. No. 13/118,204, Feb. 28, 2013, 13 pages.
"Non-Final Office Action", U.S. Appl. No. 13/118,221, Mar. 1, 2013, 22 pages.
"Non-Final Office Action", U.S. Appl. No. 13/118,257, Mar. 5, 2013, 19 pages.
"Non-Final Office Action", U.S. Appl. No. 13/118,302, Mar. 4, 2014, 10 pages.
"Non-Final Office Action", U.S. Appl. No. 13/118,314, Feb. 27, 2014, 13 pages.
"Non-Final Office Action", U.S. Appl. No. 13/118,321, Jun. 10, 2013, 32 pages.
"Non-Final Office Action", U.S. Appl. No. 13/118,333, Jul. 5, 2013, 18 pages.
"Non-Final Office Action", U.S. Appl. No. 13/118,339, Feb. 11, 2013, 15 pages.
"Non-Final Office Action", U.S. Appl. No. 13/118,347, Feb. 12, 2013, 14 pages.
"Non-Final Office Action", U.S. Appl. No. 13/196,272, Feb. 6, 2013, 10 pages.
"Non-Final Office Action", U.S. Appl. No. 13/196,272, Sep. 3, 2013, 5 pages.
"Non-Final Office Action", U.S. Appl. No. 13/224,258, Jan. 8, 2013, 35 pages.
"Non-Final Office Action", U.S. Appl. No. 13/228,876, Nov. 22, 2013, 14 pages.
"Non-Final Office Action", U.S. Appl. No. 13/228,931, Apr. 7, 2014, 21 pages.
"Non-Final Office Action", U.S. Appl. No. 13/228,945, Apr. 14, 2014, 22 pages.
"Non-Final Office Action", U.S. Appl. No. 13/229,155, Nov. 18, 2013, 14 pages.

(56) References Cited

OTHER PUBLICATIONS

"Non-Final Office Action", U.S. Appl. No. 13/229,556, Mar. 28, 2014, 12 pages.
"Non-Final Office Action", U.S. Appl. No. 13/229,693, Mar. 12, 2013, 21 pages.
"Non-Final Office Action", U.S. Appl. No. 13/229,709, Apr. 7, 2014, 12 pages.
"Non-Final Office Action", U.S. Appl. No. 13/335,001, Sep. 13, 2013, 15 pages.
"Non-Final Office Action", U.S. Appl. No. 13/335,001, Jan. 8, 2014, 17 pages.
"Non-Final Office Action", U.S. Appl. No. 13/345,383, Feb. 28, 2013, 25 pages.
"Non-Final Office Action", U.S. Appl. No. 13/492,495, Dec. 19, 2012, 6 pages.
"Non-Final Office Action", U.S. Appl. No. 13/492,495, Sep. 17, 2012, 8 pages.
"Non-Final Office Action", U.S. Appl. No. 13/655,386, Dec. 26, 2012, 23 pages.
"Non-Final Office Action", U.S. Appl. No. 13/655,390, Dec. 17, 2012, 12 pages.
"Non-Final Office Action", U.S. Appl. No. 13/656,354, Feb. 6, 2013, 10 pages.
"Non-Final Office Action", U.S. Appl. No. 13/656,574, Jan. 31, 2013, 21 pages.
"Non-Final Office Action", U.S. Appl. No. 13/656,639, Feb. 7, 2013, 29 pages.
"Non-Final Office Action", U.S. Appl. No. 13/657,621, Feb. 7, 2013, 19 pages.
"Non-Final Office Action", U.S. Appl. No. 13/657,646, Jan. 3, 2013, 13 pages.
"Non-Final Office Action", U.S. Appl. No. 13/657,789, Jan. 9, 2013, 38 pages.
"Non-Final Office Action", U.S. Appl. No. 13/658,694, Feb. 13, 2014, 19 pages.
"Non-Final Office Action", U.S. Appl. No. 13/658,694, Apr. 26, 2013, 13 pages.
"Normalizing Text: A Java Tutorial by Oracle", Retrieved from: <http://docs.oracle.com/javase/tutorial/i18n/text/normalizerapi.html> on Apr. 8, 2014, Nov. 11, 2006, 3 pages.
"Notice of Allowance", U.S. Appl. No. 11/215,052, Mar. 14, 2012, 5 pages.
"Notice of Allowance", U.S. Appl. No. 11/305,789, Nov. 23, 2009, 8 pages.
"Notice of Allowance", U.S. Appl. No. 12/414,382, Apr. 4, 2012, 4 pages.
"Notice of Allowance", U.S. Appl. No. 12/414,434, Aug. 17, 2012, 4 pages.
"Notice of Allowance", U.S. Appl. No. 12/414,455, Jan. 4, 2012, 4 pages.
"Notice of Allowance", U.S. Appl. No. 12/414,458, Oct. 31, 2011, 2 pages.
"Notice of Allowance", U.S. Appl. No. 12/414,458, Nov. 29, 2011, 2 pages.
"Notice of Allowance", U.S. Appl. No. 12/414,458, Aug. 10, 2011, 6 pages.
"Notice of Allowance", U.S. Appl. No. 12/433,667, Jun. 25, 2013, 14 pages.
"Notice of Allowance", U.S. Appl. No. 12/469,419, Nov. 27, 2012, 13 pages.
"Notice of Allowance", U.S. Appl. No. 12/470,558, Apr. 2, 2012, 7 pages.
"Notice of Allowance", U.S. Appl. No. 12/470,558, Aug. 23, 2012, 2 pages.
"Notice of Allowance", U.S. Appl. No. 12/484,799, Oct. 22, 2012, 10 pages.
"Notice of Allowance", U.S. Appl. No. 12/484,845, Mar. 16, 2012, 5 pages.
"Notice of Allowance", U.S. Appl. No. 12/721,422, Jul. 11, 2013, 9 pages.
"Notice of Allowance", U.S. Appl. No. 12/977,584, Jun. 19, 2013, 5 pages.
"Notice of Allowance", U.S. Appl. No. 12/978,184, Nov. 6, 2013, 5 pages.
"Notice of Allowance", U.S. Appl. No. 12/978,184, Aug. 2, 2013, 5 pages.
"Notice of Allowance", U.S. Appl. No. 13/196,272, Nov. 8, 2013, 8 pages.
"Notice of Allowance", U.S. Appl. No. 13/492,495, Apr. 26, 2013, 5 pages.
"Notice of Allowance", U.S. Appl. No. 13/655,386, Apr. 25, 2014, 6 pages.
"Notice of Allowance", U.S. Appl. No. 13/655,390, May 24, 2013, 5 pages.
"Notice of Allowance", U.S. Appl. No. 13/656,639, Aug. 19, 2013, 14 pages.
"Notifications", retrieved from <http://msdn.microsoft.com/enus/library/aa511497.aspx> on May 10, 2011, 16 pages.
"OmneMon™ System Resource Metrics", retrieved from <http://www.omnesys.com/documents/OmneMonSRM_Brochure.pdf> on Jun. 10, 2011, 3 pages.
"ONYX Graphics Announces New ONYX Prepedge Job Preparation Software", retrieved from <http://www.largeformatreview.com/rip-software/433-onyx-graphics-announces-new-onyx-> on May 10, 2011, 2 pages.
"Oracle Mobile Sales Assistant User Guide for BlackBerry", Retrieved from <http://download.oracle.com/docs/cd/E12547_01/books/PDF/MobileSalesAsstBB.pdf.>, Nov. 2008, 20 pages.
"Oracle8i Application Developer's Guide—Advanced Queuing Release 2 (8.1.6)", Retrieved from: http://www.cs.otago.ac.nz/oradocs/appdev.817/a76938/adq01in5.htm on May 6, 2009., Dec. 1999, 8 pages.
"Oracle8i Application Developer's Guide—Advanced Queuing", Retrieved from: http://www.cs.umbc.edu/help/oracle8/server.815/a68005/03_adq1i.htm on May 6, 2009., Feb. 1999, 29 Pages.
"Oracle8i Concepts Release 8.1.5", Retrieved from: http://www.cs.umbc.edu/help/oracle8/server.815/a67781/c16queue.htm on May 6, 2009., Feb. 1999, 10 Pages.
"Palette Extender 1.0.2", Retrieved from: <http://palette-extender.en.softonic.com/symbian> on Nov. 6, 2008, Jan. 21, 2003, 2 pages.
"Parallax Scrolling", Retrieved from: <http://en.wikipedia.org/wiki/Parallax_scrolling> on May 5, 2009., May 4, 2009, 3 Pages.
"Purple Swivel Rotating Stand Case Cover Wireless Bluetooth Keyboard for iPad Air", Retrieved From: <http://www.ebay.com/itm/Purple-Swivel-Rotating-Stand-Case-Cover-Wireless-Bluetooth-Keyboard-for-iPad-Air-/400686726944> Mar. 31, 2014, Mar. 2014, 9 Pages.
"Push Notifications Overview for Windows Phone", Retrieved from: <http://msdn.microsoft.com/en-us/library/ff402558%28VS.92%29.aspx> on Sep. 30, 2010, Sep. 3, 2010, 1 page.
"QNX Photon microGUI Windowing System", Retrieved from: <http://www.qnx.com/developers/docs/6.5.0/index.jsp?topic=°/02Fcom.qnx.doc.photon_prog_guide%2Fdragndrop.html> on Apr. 6, 2014, 22 pages.
"QODE Ultimate Keyboard Case for iPad (4th & 3rd gen) and iPad 2", Available at: <http://www.belkin.com/us/p/P-F5L149/>, Mar. 28, 2013, 8 pages.
"Remapping the Keyboard", Retrieved from: <http://publib.boulder.ibm.com/infocenter/hodhelp/v9r0/index.jsp?topic=/com.ibm.hod9.doc/help/assignkey.html> on Dec. 11, 2008., Jul. 15, 2005, 5 Pages.
"Restriction Requirement", U.S. Appl. No. 13/118,265, Feb. 27, 2014, 7 pages.
"Restriction Requirement", U.S. Appl. No. 13/118,288, Mar. 4, 2014, 7 pages.
"Restriction Requirement", U.S. Appl. No. 13/658,694, Feb. 6, 2013, 6 pages.
"SAVFY® Google NEXUS 7 Flip Stand Leather Folio Case Cover Multi-Function Smart Cover with Magnetic Auto Sleep and Wake up Sensor, Free Bonus: Clear Screen Protector + SAVFY Cleaning Cloth for Google Nexus 7 Asus Tablet Android 4.1 Jellybean 8GB / 16GB/32GB", retrieved from http://www.amazon.co.uk/

(56) References Cited

OTHER PUBLICATIONS

SAVFY®-Google-Leather-Multi-Function-Magnetic/dp/ B00F36H4AK on Oct. 29, 2014, 4 pages.
"SecureMe-Anti-Theft Security Application for S60 3rd", Retrieved from: <http://www.killermobile.com/newsite/mobile-software/s60-applications/secureme-%11-anti%11theft-security-application-for-s60-3rd.htm> on Jun. 28, 2011, Dec, 15, 2008, 3 pages.
"Snap", Windows 7 Features—retrieved from <http://windows.microsoft.com/en-US/windows7/products/features/snap> on Sep. 23, 2011, 2 pages.
"Supplemental Notice of Allowance", U.S. Appl. No. 12/433,667, Aug. 1, 2013, 2 pages.
"Supplemental Notice of Allowance", U.S. Appl. No. 12/977,584, Sep. 16, 2013, 2 pages.
"Supplemental Notice of Allowance", U.S. Appl. No. 12/977,584, Oct. 11, 2013, 2 pages.
"Supplemental Notice of Allowance", U.S. Appl. No. 12/978,184, Feb. 25, 2014, 2 pages.
"Supplemental Notice of Allowance", U.S. Appl. No. 13/655,390, Sep. 19, 2013, 2 pages.
"Supplemental Notice of Allowance", U.S. Appl. No. 13/655,390, Jul. 25, 2013, 2 pages.
"Supplementary European Search Report", European Patent Application No. 10823883.3, Jul. 31, 2012, 3 pages.
"Switch between Windows of the Same App", Retrieved from <http://www.ntwind.com/software/vistaswitcher/instance-switcher.html> on Feb. 20, 2013, May 12, 2012, 2 pages.
"Symbian Applications", Retrieved from: <http://symbianfullversion.blogspot.com/2008_12_01_archive.html> on May 5, 2009., Jan. 2009, 51 Pages.
"TaskOS", AppBrain retrieved from <http://www.appbrain.com/app/taskos/com.profete162.TaskOS> on Nov. 18, 211, 2 pages.
"The Map Screen", retrieved from <http://www.symbianos.org/whereamiusersguide> on Jun. 17, 2011, 3 pages.
"The Start Menu (overview)", retrieved from <http://web.archive.org/web/20101219151141/http://www.windows.microsoft.com/en-US/windows-vista/The-Start-menu-overview> on Feb. 12, 2013, Dec. 19, 2010, 5 pages.
"ThumbJot", Retrieved form <http://thumbjot.com/wp/?page_id=8>, 2008, 2 pages.
"Tiles and Notifications for Windows Phone", Retrieved From: <http://msdn.microsoft.com/en-us/library/windowsphone/develop/jj662933.aspx> Apr. 1, 2014, Mar. 11, 2014, 2 Pages.
"Top 3 Task Switchers for Android", TechCredo—retrieved from <http://www.techcredo.com/android/top-3-task-switchers-for-android> on May 11, 2011, Mar. 9, 2011, 5 pages.
"Top Android App: Swipepad", Best Android Apps Review—retrieved from <http://www.bestandroidappsreview.com/2011/01/top-android-app-swipepad-launcher.html> on May 11, 2011, 4 pages.
"Touch Shell Free", Retrieved from: <http://www.pocketpcfreeware.mobi/download-touch-shell-free.html> on May 5, 2009., Feb. 23, 2009, 2 Pages.
"User Guide", retrieved from <http://wireframesketcher.com/help/help.html> on Jun. 17, 2011, 19 pages.
"USRobotics Adds 360° Rotating Folio Case/Stand for the iPad 2 to Tablet Accessory Product Portfolio", retrieved from http://usr-lat.com/press/pr-press-release.asp?loc=mxco&prid=679 on Oct. 29, 2014, Jul. 12, 2011, 2 pages.
"What's new in Excel 2013", Retrieved From: <http://office.microsoft.com/en-in/excel-help/what-s-new-in-excel-2013-HA102809308.aspx> Mar. 28, 2014, Oct. 30, 2012, 5 Pages.
"Windows 8 Is Gorgeous, But Is It More Than Just A Shell? (Video)", retrieved from <http://techcrunch.com/2011/06/02/windows-8-gorgeous-shell-video/> on Jun. 20, 2011, Jun. 2, 2011, 6 pages.
"Windows Phone 7 (Push Notification)", retrieved from <http://unknownerror.net/2011-06/windows-phone-7-push-notification-36520> on Jul. 6, 2011, 4 pages.
"Windows Phone 7 Live Tiles", Retrieved from: <http://www.knowyourmobile.com/microsoft/windowsphone7/startscreen/640737/windows_phone_7_live_tiles.html> on May 11, 2011, Oct. 20, 2010, 3 pages.
"Winterface Review", Retrieved from: <http://www.mytodayscreen.com/winterface-review/> on Nov. 12, 2008, Jul. 9, 2008, 42 pages.
"Womma", Retrieved from: <http://www.womma.org/blog/links/wom-trends/> on May 5, 2009., 2007, 70 Pages.
"Working with Multiple Windows", MSOFFICE tutorial!—retrieved from <http://www.msoffice-tutorial.com/working-with-multiple-windows.php> on Sep. 23, 2011, 3 pages.
"You've Got Mail 1.4 Build", retrieved from <http://www.fileshome.com/Shows_Animation_Plays_Sound_Automatic_N . . . > on Jan. 6, 2010, Jun. 18, 2007, 2 pages.
"YUI 3: ScrollView [beta]", Retrieved from: <http://developer.yahoo.com/yui/3/scrollview/> on Sep. 28, 2010, 5 pages.
"ZAGGkeys PROfolio+ Keyboard", Retrieved From: <http://www.zagg.com/accessories/zaggkeys-ipad-profolio-plus-keyboard-case/7063?cj_aid=10539646&cj_pid=6146810&cj_sid=fwn62ieocicw#7063?cj_aid=10539646&cj_pid=6146810&cj_sid=fwn62ieocicw&_suid=13959948728450884 1408342879342> Mar. 31, 2014, 2013, 9 pages.
Aguilar, "How to Run Multiple Instances of the Same App in Mac OS X", Retrieved from <http://operating-systems.wonderhowto.com/how-to/run-multiple-instances-same-app-mac-os-x-0140144/> on Feb. 20, 2013, Jan. 1, 2013, 4 Pages.
Al "Droptiles—Metro Style Live Tiles Enabled Web 2.0 Dashboard", Retrieved from <http://oazabir.github.com/Droptiles/> on Mar. 5, 2013, Jul. 18, 2012, 7 pages.
Bates, "A Framework to Support Large-Scale Active Applications", University of Cambridge Computer Laboratory—Available at <http://citeseerx.ist.psu.edu/viewdoc/download?doi=10.1.1.48. 1690&rep=rep1&type=pdf>, 1996, 8 pages.
Baweja, "OpenHeatMap: Create Heat Maps For Excel Spreadsheets With Geo Data", Retrieved From: <http://www.makeuseof.com/tag/openheatmap-create-heat-maps/> Mar. 29, 2014, Jul. 24, 2010, 4 Pages.
Beiber, et al.,' "Screen Coverage: A Pen-Interaction Problem for FDA's and Touch Screen Computers", In Proceedings of ICWMC 2007, Mar. 2007, 6 pages.
Bhatnagar, "Locate and Kill Annoying Processes in Windows", Trouble Fixers: All About Fixing Computer Troubles—retrieved from <http://www.troublefixers.com/locate-and-kill-annoying-processes-in-windows/> on Nov. 18, 2011, Apr. 19, 2010, 4 pages.
Bjork, et al.,' "Redefining the Focus and Context of Focus+Context Visualizations", In Proceedings of INFOVIS 2000—Available at <http://www.johan.redstrom.se/papers/redefining.pdf>, Oct. 2000, 9 pages.
Blankenburg, "31 Days of Mango | Day #11: Live Tiles", Retrieved from <http://www.jeffblankenburg.com/2011/11/11/31-days-of-mango-day-11-live-tiles/> on Mar. 5, 2013, Nov. 11, 2011, 10 pages.
Bolton, "A Slide-out Keyboard on an Android tablet. Genius or total madness?", Retrieved From: <http://www.techradar.com/reviews/pc-mac/tablets/asus-eee-pad-slider-1036296/review> Mar. 31, 2014, Oct. 25, 2011, 8 pages.
Bowes, et al.,' "Transparency for Item Highlighting", Faculty of Computing Science, Dalhousie University—Available at <http://torch.cs.dal.ca/~dearman/pubs/GI2003-bowes,dearman,perkins-paper.pdf>, 2003, 2 pages.
Bruzzese, "Using Windows 7, Managing and Monitoring Windows 7—Chapter 11", Que Publishing, May 5, 2010, 33 pages.
Buring, "User Interaction with Scatterplots on Small Screens—A Comparative Evaluation of Geometric-Semantic Zoom and Fisheye Distortion", IEEE Transactions on Visualization and Computer Graphics, vol. 12, Issue 5, Available at <http://citeseerx.ist.psu.edu/viewdoc/download?doi=10.1.1.134.4568&rep=rep1 &type=pdf>,Sep. 2006, pp. 829-836.
Carrera, et al.,' "Conserving Disk Energy in Network Servers", available at <http://citeseerx.ist.psu.edu/viewdoc/download-?doi=10.1.1.6.8301&rep=rep1&type=ps>, Nov. 2002, 15 pages.

(56) References Cited

OTHER PUBLICATIONS

Cawley, "How to Customize Your Windows Phone 7", Retrieved from: <http://www.brighthub.com/mobile/windows-mobile-platform/articles/95213.aspx> on May 10, 2011, Nov. 12, 2010, 3 pages.

Cawley, "Windows Phone 7 Customization Tips and Tricks", retrieved from <http://www.brighthub.com/mobile/windows-mobile-platform/articles/95213.aspx> on Jun. 20, 2011, May 16, 2011, 2 pages.

Cohen, et al.,' "Automatic Strategies in the Siemens RTL Tiled Window Manager", In Proceedings: The 2nd IEEE Conference on Computer Workstations, Mar. 7, 1988, pp. 111-119.

Cohen, et al.,' "Wang Tiles for Image and Texture Generation", In Proceedings of SIGGRAPH 2003—Available <http://research.microsoft.com/en-s/um/people/cohen/WangFinal.pdf>, 2003, 8 pages.

Crouch, "Smartphone Wars: Micron's Slide-to-Unlock Patent", Jan. 30, 2013, 2 pages.

Damien, "7 Ways to Supercharge Multitasking in Android", retrieved from <http://maketecheasier.com/7-ways-to-supercharge-multitasking-in-android/2011/01/22/> on May 11, 2011, Jan. 22, 2011, 5 pages.

Danish, "Win7sé Brings Mac-Like Screen Corners to Windows 7 & Windows 8", retrieved from <http://technomondo.com/2011/11/13/win7se-brings-mac-like-screen-corners-to-windows-7-windows8/> on Nov. 23, 2011, Nov. 13, 2011, 4 pages.

Davis, "A WPF Custom Control for Zooming and Panning", Retrieved from: <http://www.codeproject.com/KB/WPF/zoomandpancontrol.aspx> on Sep. 28, 2010, Jun. 29, 2010, 21 pages.

Delimarsky, "Sending Tile Push Notifications on Windows Phone 7", retrieved from <http://mobile.dzone.com/articles/sending-tile-push> on May 10, 2011, Aug. 25, 2010, 2 pages.

Denoue, et al.,' "WebNC: Efficient Sharing of Web Applications", In Proceedings of WWW 2009—Available at <http://www.fxpal.com/publications/FXPAL-PR-09-495.pdf>, 2009, 2 pages.

Dixon, "Living in the Online Cloud: The T-Mobile G1 / Google Android Smartphone", Retrieved from <http://www.manifest-tech.com/media_pda/t-mobile_g1_android.htm>, Dec. 2008, 3 pages.

Dolcourt, "Webware", Retrieved from: <http://news.cnet.com/webware/?categoryId=2010> on May 5, 2009., May 5, 2009, 13 Pages.

Dunsmuir, "Selective Semantic Zoom of a Document Collection", Available at <http://www.cs.ubc.ca/~tmm/courses/533/projects/dustin/proposal.pdf>, Oct. 30, 2009, pp. 1-9.

Egan, "Modifying Live Tiles in a Background Process", Retrieved from <http://thesociablegeek.com/windows-8/livetiles/modifying-live-tiles-in-a-background-process/> on Mar. 5, 2013, Aug. 31, 2012, 24 pages.

Farrugia, et al.,' "Cell Phone Mini Challenge: Node-Link Animation Award Animating Multivariate Dynamic Social Networks", IEEE Symposium on Visual Analytics Science and Technology, Columbus, OH, USA, Oct. 21-23, 2008, 2 pages.

Fisher, "Cool Discussion of Push Notifications—Toast and Tile—on Windows Phone", Retrieved from: <http://www.windowsphoneexpert.com/Connection/forums/p/4153/18399.aspx> on Sep. 29, 2010, May 3, 2010, 3 pages.

Friedlaender, "Better Way to Delete and Close Apps from Task Manager", retrieved from <http://www.ideasproject.com/ideas/14475> on Nov. 21, 2011, Nov. 15, 2011, 2 pages.

Gade, "Samsung Alias u740", Retrieved from: <http://www.mobiletechreview.com/phones/Samsung-U740.htm> on Nov. 20, 2008, Mar. 14, 2007, 6 pages.

Gao, "A General Logging Service for Symbian based Mobile Phones", Retrieved from: <http://www.nada.kth.se/utbildning/grukth/exjobb/rapportlistor/2007/rapporter07/gao_rui_07132.pdf.> on Jul. 17, 2008, Feb. 2007, pp. 1-42.

Gralla, "Windows XP Hacks, Chapter 13—Hardware Hacks", O'Reilly Publishing, Feb. 23, 2005, 25 pages.

Greenberg, "Review: SHARKK Apple iPad Air Wireless Bluetooth Keyboard Case", Retrieved From: <http://www.runaroundtech.com/2014/01/25/review-sharkk-apple-ipad-air-wireless-bluetooth-keyboard-case/> Mar. 31, 2014, Jan. 25, 2014, 6 Pages.

Ha, et al.,' "SIMKEYS: An Efficient Keypad Configuration for Mobile Communications", Retrieved from: < http://ieeexplore.ieee.org/stamp/stamp.jsp?arnumber=01362557.> on Dec. 17, 2008, Nov. 2004, 7 Pages.

Hahn, "Freedom Case, the Adjustable Stand and Protective Case for Microsoft Surface Tablets with Patent-Pending Folding Design, Launches Pre-Orders on Kickstarter", Retrieved From: <http://www.prweb.com/releases/2014/02/prweb11583725.htm> Mar. 3, 2014, Feb. 8, 2014, 4 Pages.

Harrison, "Symbian OS C++ for Mobile Phones vol. 3", Retrieved from: <http://www.amazon.co.uk/Symbian-OS-Mobile-Phones-Press/dp/productdescription/0470066415> on Oct. 23, 2008, Symbian Press,Jun. 16, 2003, 4 pages.

Hickey, "Google Android has Landed; T-Mobile, HTC Unveil G1", Retrieved from: <http://www.crn.com/retail/210603348> on Nov. 26, 2008., Sep. 23, 2008, 4 pages.

Horowitz, "Installing and Tweaking Process Explorer part 2", Retrieved from <http://web.archive.org/web/20110510093838/http://blogs.computerworld.com/16165/installing_and_tweaking_process_explorer_part_2> on Mar. 12, 2013, May 23, 2010, 7 pages.

Janecek, et al.,' "An Evaluation of Semantic Fisheye Views for Opportunistic Search in an Annotated Image Collection", Available at <http://citeseerx.ist.psu.edu/viewdoc/download?doi=10.1.1.67.3084&rep=rep1&type=pdf>, Feb. 15, 2005, pp. 1-15.

Jason, "Oyster Ergonomic Keyboard Review", Retrieved from <http://allthingsergo.com/blog/reviews/oyster-ergonomic-keyboard-review/> on Oct. 31, 2014, Oct. 16, 2014, 4 pages.

Kandogan, et al.,' "Elastic Windows: Improved Spatial Layout and Rapid Multiple Window Operations", In Proceedings of the Workshop on Advanced Visual Interfaces, May 27, 1996, 10 Pages.

Kcholi, "Windows CE .NET Interprocess Communication", Retrieved from http://msdn.microsoft.com/en-us/library/ms836784.aspx on Jul. 17, 2008., Jan. 2004, 15 Pages.

Kendrick, "Belkin Ultimate Keyboard Case for iPad: It's the magnets (review)", retrieved from http://www.zdnet.com/belkin-ultimate-keyboard-case-for-ipad-its-the-magnets-review-7000013164/ on Oct. 29, 2014, Mar. 27, 2013, 7 pages.

Keranen, "OpenGL-based User Interface Toolkit for Symbian Mobile Devices", Master of Science Thesis, Tamere University of Technology, Department of Information Technology, Apr. 6, 2005, 88 pages.

Kurdi, "Acer GridVista: snap your windows to pre-defined sections on your screen(s)", Retrieved from <http://www.freewaregenius.com/acer-gridvista-snap-your-windows-to-pre-defined-sections-of-your-screens/> on Jun. 30, 2013, Jan. 19, 2010, 6 pages.

Kurdi, "WinSplit Revolution", Retrieved from <http://www.freewaregenius.com/winsplit-revolution/> on Jun. 30, 2013, Aug. 22, 2007, 4 Pages.

La, "Parallax Gallery", Available at <http://webdesignerwall.comtutorials/parallax-gallery/comment-page-1>, Apr. 25, 2008, 16 pages.

Livingston, et al.,' "Windows 95 Secrets", 1995, I DG Books Worldwide, 3rd Edition, 1995, pp. 121-127.

Long, "Gmail Manager 0.6", Retrieved from: <https://addons.mozilla.org/en-US/firefox/addon/1320/> on Sep. 29, 2010, Jan. 27, 2010, 4 pages.

Mann, et al.,' "Spectrum Analysis of Motion Parallax in a 3D Cluttered Scene and Application to Egomotion", Journal of the Optical Society of America A, vol. 22, No. 9—Available at <http://www.cs.uwaterloo.ca/~mannr/snow/josa-mann-langer.pdf>, Sep. 2005, pp. 1717-1731.

Mantia, "Multitasking: What Does It Mean?", retrieved from <http://mantia.me/blog/multitasking/> on Sep. 23, 2011, 3 pages.

Mao, "Comments of Verizon Wireless Messaging Services, LLC", Retrieved from: http://www.ntia.doc.gov/osmhome/warnings/comments/verizon.htm on May 6, 2009., Aug. 18, 2000, 5 Pages.

(56) References Cited

OTHER PUBLICATIONS

Marie, "MacBook Trackpad Four Fingers Swipe Left/Right to Switch Applications", MacBook Junkie—retrieved from <http://www.macbookjunkie.com/macbook-trackpad-four-fingers-swipe-left-right-to-switch-applications/> on May 11, 2011, Nov. 13, 2010, 4 pages.

Matejka, et al.,' "Patina: Dynamic Heatmaps for Visualizing Application Usage", In Proceedings: The SIGCHI Conference on Human Factors in Computing Systems, Autodesk Research, Toronto, Ontario, Canada,Apr. 27, 2013, pp. 3227-3236.

Mazo, "How to Switch Applications and Multitask on the Galaxy S3", Retrieved from <http://www.androidcentral.com/how-switch-applications-and-multitask-samsung-galaxy-s3> on Feb. 18, 2013, Jul. 17, 2012, 7 pages.

Mei, et al.,' "Probabilistic Multimodality Fusion for Event Based Home Photo Clustering", Retrieved from: <http://ieeexplore.ieee.org//stamp/stamp.jsp?tp=&arnumber=04036960.>, Dec. 26, 2006, pp. 1757-1760.

Michaluk, "Using the Application Switcher and Closing Apps When Finished to Maximize your BlackBerry Efficiency", Retrieved from <http://crackberry.com/using-application-switcher-and-closing-apps-when-finished-maximize-your-blackberry-efficiency> on Feb. 19, 2013, Aug. 17, 2009, 14 pages.

Mpdooley, "SeaMonkey Hangs during Drag Operation", mozillaZine—retrieved from <http://forums.mozillazine.org/viewtopic.php?f=5&t=1783735> on Nov. 18, 2011, Mar. 5, 2010, 2 pages.

Nguyen et al.,' "BendID: flexible interface for localized deformation recognition", In Proceedings of the ACM international Joint Conference on Pervasive and Ubiquitous Computing, Sep. 13, 2014, pp. 553-557.

Nordgren, "Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.

Oliver, "Potential iPhone Usability and Interface Improvements", Retrieved from: <http://www.appleinsider.com/articles/08/09/18/potential_iphone_usability_and_interface_improvements.html> on Nov. 12, 2008, AppleInsider,Sep. 18, 2008, 4 pages.

Oryl, "Review: Asus P527 Smartphone for North America", Retrieved from: <http://www.mobileburn.com/review.jsp?Id=4257> on Dec. 17, 2008., Mar. 5, 2008, 1 Page.

Padilla, "Palm Treo 750 Cell Phone Review—Hardware", Retrieved from: <http://www.wirelessinfo.com/content/palm-Treo-750-Cell-Phone-Review/Hardware.htm> on Dec. 11, 2008., Mar. 17, 2007, 4 Pages.

Paul, "Hands-on: KDE 4.5 Launches with Tiling, New Notifications", Retrieved from: <http://arstechnica.com/open-source/reviews/2010/08/hands-on-kde-45-launches-with-tiling-new-notifications.ars> on Sep. 29, 2010, Aug. 2010, 3 pages.

Pendharkar, "Fluid Home Screen for Mobile Phones", Helsinki Metropolia University of Applied Sciences, Master of Engineering, Information Technology, Thesis, Available at <http://theseus17-kk.lib.helsinki.fi/bitstream/handle/10024/46481/FinalThesis3.pdf?sequence=1/>,Apr. 12, 2012, 48 pages.

Perry, "Teach Yourself Windows 95 in 24 Hours", 1997, Sams Publishing, 2nd Edition, 1997, pp. 193-198.

Raghaven, et al.,' "Model Based Estimation and Verification of Mobile Device Performance", Available at http://alumni.cs.ucsb.edu/~raimisl/emsoft04_12.pdf., Sep. 27-29, 2004, 10 Pages.

Rathbone, "Windows Phone 7 Live Tile Schedules—How to Execute Instant Live Tile Updates", Retrieved from <http://www.diaryofaninja.com/blog/2011/04/03/windows-phone-7-live-tile-schedules-ndash-executing-instant-live-tile-updates> on Mar. 11, 2013, Apr. 3, 2011, 8 pages.

Ray, "Microsoft Re-Tiles Mobile Platform for Windows 7 Era", retrieved from <http://www.theregister.co.uk/2010/02/15/windows_phone_7_series/> on May 11, 2011, Feb. 15, 2010, 2 pages.

Reed, "Microsoft Demos Windows Mobile 6.1 at CTIA", Retrieved from: <http://www.networkworld.com/news/2008/040208-ctia-microsoft-windows-mobile.html> on Jul. 18, 2008, Apr. 2, 2008, 1 page.

Redmond, "Mobile Marketing Solutions", Retrieved from: <http://www.mobilemarketingmagazine.co.uk/mobile_social_networking/> on May 5, 2009., Apr. 28, 2009, 16 Pages.

Rice, et al.,' "A System for Searching Sound Palettes", Proceedings of the Eleventh Biennial Symposium on Arts and Technology Available at <http://www.comparisonics.com/FindSoundsPalettePaper.pdf>,Feb. 2008, 6 pages.

Ritchie, "iOS 4 features: iPod touch Wi-Fi stays connected when asleep—iPhone too?", Retrieved from: <http://www.goip.com/2010/06/ios-4-features-ipod-touch-wi-fi-stays-connected-when-asleep-%E2%80%94-iphone-too/> on Sep. 30, 2010, Jun. 14, 2010, 2 pages.

Ritscher, "Using Surface APIs in your WPF application—Part 1", Retrieved from: <http://blog.wpfwonderland.com/2009/06/30/using-surface-apis-in-your-wpf-application/> on Sep. 28 2010, Jun. 30, 2009, 7 pages.

Roberts, "Touching and Gesturing on the iPhone", Available at <http://www.sitepen.com/blog/2008/07/10/touching-and-gesturing-on-the-iphone/comments-pare-1>, Jul. 10, 2008, 16 pages.

Sandoval, "A development platform and execution environment for mobile applications", Universidad Autónoma de Baja California, School of Chemical Sciences and Engineering, Available at <http://citeseerx.ist.psu.edu/viewdoc/download?doi=10.1.1.86.7989&rep=rep1&type=pdf>,2004, 18 pages.

Simeone, "A Cross-Device Drag-and-Drop Technique", In Proceedings of MUM 2013, Dec. 2013, 4 pages.

Singh, et al.,' "Cinema: Columbia InterNet Extensible Multimedia Architecture", Available at <http://www1.cs.columbia.edu/~library/TR-repository/reports/reports-2002/cucs-011-02.pdf>, Sep. 3, 2002, 83 Pages.

Smith, et al.,' "GroupBar: the TaskBar Evolved", Proceedings of OZCHI 2003—Available at <http://research.microsoft.com/pubs/64316/ozchi2003-groupbar.pdf>, Nov. 2003, pp. 1-10.

Spradlin, "Switcher Provides an Incredible Gesture-based App Switching Tool", Retrieved from <http://www.androidpolice.com/2012/07/09/switcher-proof-of-concept-hits-the-play-store-providing-an-incredible-gesture-based-app-switching-tool/> on Feb. 18, 2013, Jul. 9, 2012, 7 pages.

Stark, "Review: Logitech Ultrathin Keyboard Cover for iPad", Retrieved From: <http://www.gadgetguy.com.au/product/logitech-ultrathin-keyboard-cover-for-ipad/> Feb. 26, 2014, Jun. 8, 2012, 4 Pages.

Stebih, "Windows 8 Mouse and Keyboard Commands", retrieved from <http://www.helpdesktv.ca/windows/windows-8-mouse-and-keyboard-commands.html> on Nov. 23, 2011, Sep. 21, 2011, 5 pages.

Steinicke, et al.,' "Multi-Touching 3D Data: Towards Direct Interaction in Stereoscopic Display Environments coupled with Mobile Devices", Advanced Visual Interfaces (AVI) Workshop on Designing Multi-Touch Interaction Techniques for Coupled Public, Available at <http://viscg.uni-muenster.de/publications/2008/SHSK08/ppd-workshop.-pdf.>,Jun. 15, 2008, 4 Pages.

Sun, "Clamshell Keyboard Case transforms the iPad Mini into a Laptop and Gets Raving Review from RunAroundTech.com", Retrieved From: <http://www.prweb.com/releases/2014/01/prweb11456818.htm> Apr. 1, 2014, Jan. 6, 2014, 3 Pages.

Suror, "PocketShield-New Screenlock App for the HTC Diamond and Pro", Retrieved from: <http://wmpoweruser.com/?tag=htc-touch-diamond> on Jun. 28, 2011, Oct. 23, 2008, 2 pages.

Terpstra, "Beta Beat: Grape, a New Way to Manage Your Desktop Clutter", Retrieved from: http://www.tuaw.com/2009/04/14/beta-beat-grape-a-new-way-to-manage-your-desktop-clutter/, Apr. 14, 2009, 4 pages.

Ueland, "25 Apps for Dropbox", Retrieved from: <http://www.practicalecommerce.com/articles/3984-25-Apps-for-Dropbox> on Apr. 6, 2014, Apr. 15, 2013, 10 pages.

(56) References Cited

OTHER PUBLICATIONS

Vallerio, et al.,' "Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.
Vermeulen, "BlackBerry PlayBook Hands-on", retrieved from <http://mybroadband.co.za/news/gadgets/20104-BlackBerry-PlayBook-hands-.html> on May 11, 2011, May 8, 2011, 4 pages.
Vtiticci, "Growl 1.3 to Be Released on Mac App Store, Introduce Lion Support and Drop GrowlMail Support", Retrieved from: <http://www.macstories.net/stories/grow1-1-3-to-be-released-on-mac-app-store-introduce-lion-support-and-drop-growlmail-support/> on Jul. 22, 2011, Jul. 6, 2011, 6 pages.
Vornberger, "Bluetile", Retrieved from: <http://www.bluetile.org> on Sep. 29, 2010, 5 pages.
Webster, "VsNotepad: An Improved Way To Jot Down On Windows Mobile", Retrieved from <http://pocketnow.com/index.php/index.php?a=portal_detail&t=news&id=7424>, May 19, 2009, 2 pages.
Wells, "Advanced Task Killer", Android Tapp: Android App Reviews—retrieved from <http://www.androidtapp.com/advanced-task-killer/> on Nov. 18, 2011, Aug. 28, 2009, 15 pages.
Wilson, "How the iPhone Works", Retrieved from: <http://electronics.howstuffworks.com/iphone2.htm> on Apr. 24, 2009, Jan. 2007, 9 pages.
Wilson, "Robust Computer Vision-Based Detection of Pinching for One and Two-Handed Gesture Input", In Proceedings of UIST 2006—Available at <http://research.microsoft.com/en-us/um/people/awilson/publications/wilsonuist2006/uist%202006%20taffi.pdf>, Oct. 2006, 4 pages.
Wobbrock, et al.,' "User-Defined Gestures for Surface Computing", CHI 2009, Apr. 4-9, 2009, Boston, MA—available at <http://faculty.washington.edu/wobbrock/pubs/chi-09.2.pdf>, Apr. 4, 2009, 10 pages.
Wollman, "Sony gives the slider another shot with the VAIO Duo 13", Retrieved From: <http://www.engadget.com/2013/06/04/sony-duo-13/> Mar. 31, 2014, Jun. 4, 2013, 7 Pages.
Wu, et al.,' "Achieving a Superior Ownership Experience in Manageability and Quality for Siebel CRM", available at <http://www.oracle.com/us/products/enterprise-manager/superior-exp-for-siebel-crm-068962.pdf>, Aug. 2008, 25 pages.
Wyatt, "/Flash/the art of parallax scrolling", .net Magazine, Aug. 1, 2007, pp. 74-76.
Yang, et al.,' "Dual-Surface Input: Augmenting One-Handed Interaction with Coordinated Front and Behind-the-Screen Input", Proceedings: MobileHCI '09, Sep. 15-18, 2009, Bonn, Germany—retrieved from <http://www.cs.ualberta.ca/~wfb/publications/C-2009-MobileHCI-Yang.pdf>, Sep. 18, 2009, 10 pages.
Yang, et al.,' "Semantic Photo Album Based on MPEG-4 Compatible Application Format", Retrieved from:.<http://ieeexplore.ieee.org/stamp/stamp.jsp?arnumber=04146254.>, 2007, 2 Pages.
"Non-Final Office Action", U.S. Appl. No. 14/517,332, Apr. 15, 2016, 13 pages.
"Final Office Action", U.S. Appl. No. 14/516,294, May 9, 2016, 15 pages.
Ex Parte Quayle Action, U.S. Appl. No. 14/517,332, Jul. 8, 2016, 6 pages.
Final Office Action, U.S. Appl. No. 14/517,379, May 19, 2016, 18 pages.
Non-Final Office Action, U.S. Appl. No. 14/516,294, Jul. 5, 2016, 18 pages.

* cited by examiner

COLLAPSIBLE SHELL COVER FOR COMPUTING DEVICE

RELATED APPLICATION

This application claims priority under 35 U.S.C. §119(d) to PCT Patent Application No. PCT/CN2014/075038, filed on Apr. 10, 2014 and titled "Collapsible Shell Cover for Computing Device," the entire disclosure of which is incorporated in its entirety by reference herein.

BACKGROUND

Users have access to an ever increasing variety of functionality in a variety of different settings. For example, users traditionally interacted with desktop computing devices (e.g., desktop PCs) to perform word processing and so forth. Mobile computing devices were then developed and began with use of simple functionality such as text messages and progressed to advanced functionality including feature-rich applications However, the form factor of the mobile computing devices used to promote mobility of the device may limit an ability of a user to interact with this functionality in an efficient manner. For example, use of an onscreen keyboard may limit a user to basic inputs and thus even though an application may support rich features the input techniques made available to a user may limit interaction with these features.

SUMMARY

Techniques including use of a collapsible shell cover for a computing device are described. In one or more implementations, the collapsible shell cover apparatus includes a holder portion, an input device portion, and kickstand portion. The collapsible shell cover is configured to support a computing device having a slate form factor at a viewing angle in an open configuration and to form a shell cover for the computing device in a collapsed configuration. The holder portion is configured to receive the computing device between edge members having support lips to support the computing device. The input device portion and kickstand portion are rotatably secured to the holder portion along opposing ends of the edge members of the holder portion. The input device portion and kickstand portion are configured to rotate relative to the holder position to assume the open configuration in which the holder portion is positioned at the viewing angle, the kickstand portion is rotated to a support position at a rear of the holder portion, and the input device portion is rotated to an input position that extends outward from the front of the holder portion. The input device portion and kickstand portion are also configured to rotate into the collapsed configuration in which the holder portion, input device portion, and kickstand portion are aligned in a common plane to form the shell cover which corresponds to a shape of the computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

The ways in which a user may interact with a mobile computing device has followed the increases in functionality of applications made available via mobile computing devices. Accordingly, mobile computing devices such as tablets and mobile phones may provided access to advanced functionality such as productivity applications (e.g., word processors, presentations, and spreadsheets) but may be limited in the ways in which interaction with this functionality is performed using conventional techniques.

Techniques including use of a collapsible shell cover for a computing device are described. In one or more implementations, the collapsible shell cover apparatus includes a holder portion, an input device portion, and kickstand portion. The collapsible shell cover is configured to support a computing device having a slate form factor at a viewing angle in an open configuration and to form a shell cover for the computing device in a collapsed configuration. The holder portion is configured to receive the computing device between edge members having support lips to support the computing device. The input device portion and kickstand portion are rotatably secured to the holder portion along opposing ends of the edge members of the holder portion. The input device portion and kickstand portion are configured to rotate relative to the holder position to assume the open configuration in which the holder portion is positioned at the viewing angle, the kickstand portion is rotated to a support position at a rear of the holder portion, and the input device portion is rotated to an input position that extends outward from the front of the holder portion. The input device portion and kickstand portion are also configured to rotate into the collapsed configuration in which the holder portion, input device portion, and kickstand portion are aligned in a common plane to form the shell cover which corresponds to a shape of the computing device.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
FIG. 1 is an illustration of an environment in an example implementation that is operable to employ the collapsible shell cover computing device techniques.

FIG. 1 is an illustration of an environment 100 in an example implementation that is operable to employ techniques described herein. The illustrated environment 100 includes a computing device 102 and an apparatus 104 that may function as a collapsible shell cover for the computing device 102. The computing device 102 may be configured in a variety of ways.

For example, a computing device may be configured as a mobile computing device having a housing formed according to a slate configuration. The housing is configured to support a display device 103, which may incorporate touchscreen functionality to support user interaction with a user interface displayed on the display device 103, such as a start screen as illustrated. A surface of the computing device from which the display device 103 is viewed may be referred to herein as a front side of the computing device and an opposing surface may be referred to as a back side of the computing device. Mobile computing devices may take a variety of different forms in the slate configuration, such as a tablet, mobile phone, portable game device, portable media player, and so forth. Thus, the computing device 102 may range from full resource devices with substantial memory and processor resources (e.g., tablet computers) to a low-resource device with limited memory and/or processing resources (e.g., traditional portable media players). Further discussion of an example of a computing device 102 may be found in relation to FIG. 12.

The apparatus 104 may include an input device portion 106, a holder portion 108, and a kickstand portion 110 that may be secured one to another and manipulated relative to one another to assume multiple different configurations in various ways described herein. The apparatus 104 may formed out of various material including one or a combination of aluminum, magnesium, various metal alloys, plastics, rubber, and so forth. In one approach, the apparatus 104 may be formed entirely of a metal or metal alloy, such as aluminum. In the illustrated example, the computing device 102 and the apparatus 104 are depicted as being arranged in an open configuration that supports interaction with the display device 103 (e.g., to view the device and/or interact with touchscreen functionality). The open configuration also supports input functionality of the apparatus 104 provided via interaction with the input device portion 106. The input device portion 106 is configured to provide one or more inputs to the computing device 104 to initiate one or more operations of the computing device 104. The input device portion 106 may be configured in a variety of ways to accept inputs from a user, such as being a keyboard as illustrated, a track pad, functionality configured to detect gestures, a camera, and so on. The inputs may be communicated in a variety of way, such as via a physical communicative coupling, a wireless communicative coupling (e.g., Bluetooth®, Wi-Fi®), and so forth. Output functionality may also be incorporated by the apparatus 104 to cause outputs as indicated by the computing device 102. Examples of output functionality include supplemental display devices (e.g., an electronic ink display), speakers, lighted indications, and so on. A variety of other functionality may also be incorporated within the apparatus 104, such as a supplemental power source, e.g., battery.

In the open configuration, the apparatus 104 is configured to support the computing device 102 at a viewing angle as depicted. The holder portion 108 is designed to secure the computing device 102 removably within the apparatus, and the kickstand portion 110 is designed to provide support generally at a back side of the apparatus (e.g., a side that opposes the display device) for maintaining the holder portion 108 and computing device at the viewing angle. Accordingly, the apparatus 104 is also configured to support placement of the computing device 102 and apparatus 104 on a surface (e.g., a table, a user's lap) to type on the keyboard and position a surface of the display device 106 at an angle relative to the surface.

The apparatus 104 is also configured to assume a collapsed configuration in which the apparatus 104 forms a shell cover that may be employed to protect the computing device 102, such as by inserting the computing device 102 into the shell cover with the display device 103 facing inward thereby protecting the display device 103 from damage. Details regarding the open and collapsed configurations that the apparatus 104 may assume and the components of the apparatus are described in relation to the following figures.

Figure 2:
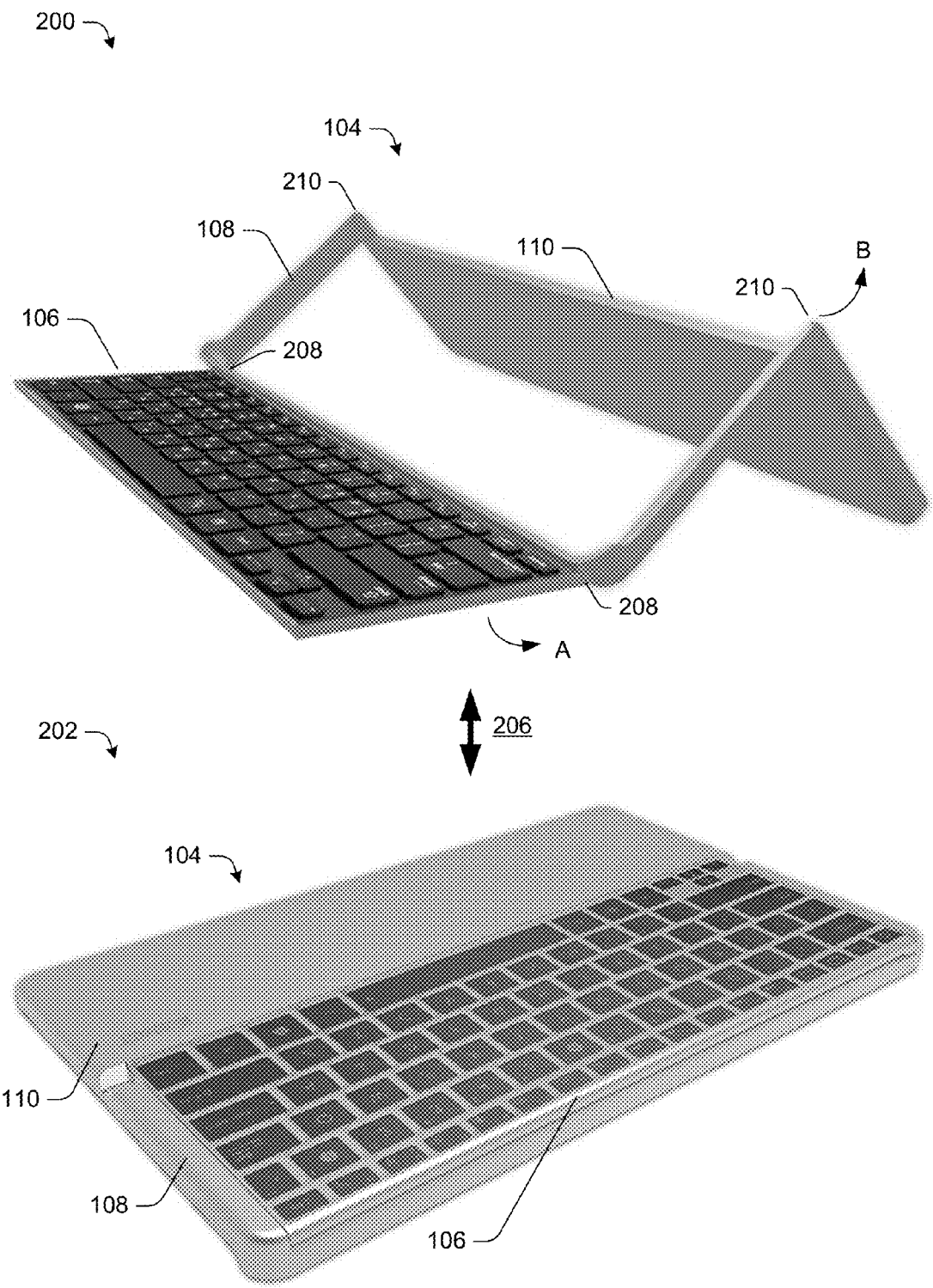
FIG. 2 is diagram that depicts both an open configuration and a collapsed configuration for the apparatus.

In particular, FIG. 2 is diagram that depicts both an open configuration 200 and a collapsed configuration 202 for the apparatus 104 without the computing device 102 of FIG. 1. FIG. 2 also represents a transition 206 between the two illustrated configurations. The apparatus 104 includes input device portion 106 and the kickstand portion 110, which are rotatably secured to the holder portion 108. In an implementation, the input device portion 106 and the kickstand portion 110 are secured at respective pivot points 208, 210 that enable rotation of the components one to another to assume the different configurations. The pivot point may implemented in various ways such as using hinges, pins, snap-in connection, spring mechanisms, and other devices suitable to establish rotatable connections.

In the open configuration 200, the apparatus 104 is configured to support a computing device at a viewing angle that is established by a position of the holder portion 108. In particular the computing device may be inserted into the apparatus 104 (as shown in FIG. 1) such that edges of the computing device fit within a perimeter of the holding portion 108 and a back side of the computing device rests upon and is held upright at the viewing angle by the kickstand portion 110.

Accordingly, the kickstand portion 110 is rotated to a support position at a rear of the holder portion that opposes a front of the holder portion 108 configured to receive the computing device. In an implementation, the kickstand portion 110 in the support position is substantially perpendicular to a plane in which the computing device is inserted into the apparatus (e.g., a plane corresponding to the perimeter of the holding portion 108 and sides of the device (e.g., display surface and back side)). The input device portion 106 is rotated to an input position that extends outward from the holder portion 108 such that input device portion 106 is arranged to lay substantially flat in front of the holder and/or a display device 103 of a computing device 102 in the holder when that apparatus is placed on a surface (e.g. a table, couch, a user's lap). However, other angles between the holding portion and the kickstand portion may be appropriate."

In the collapsed configuration 202, the holder portion 108, input device portion 106, and kickstand portion 110 are aligned in a common plane to form a shell cover for protection of the computing device that corresponds a shape of the computing device. The shell cover may be designed to fit tightly over a display device 103 and at least partially around edges of the computing device to protect the display and create an attachment of the cover to the device. The shell cover has a shape that generally corresponds a shape of the device, such as a rectangular shape for a slate form computing device. For example, the shell cover may have a shape like a tray with raised edges surrounding a flat interior surface to create an interior cavity or "shell" into which the computing device may be inserted. The raised edges are designed to surround and frame the edges of the computing device and hold the cover in place when the computing device is inserted into the shell cover.

In order to assume the collapsed configuration 202, a transition 206 may occur in which the input device portion 106 portion is rotated inward and underneath the holder portion 108 as represented by the curved arrow "A". As discussed in greater detail below, the input device portion 106 in the collapsed configuration 202 may be configured to fit within a perimeter of the holder portion 108 so as to fill open space within the interior of the holder. The transition 206 may additionally involve rotation of the kickstand portion 110 out and away from the holder portion 108 as represented by the curved arrow "B" such that the peaks shown at the pivot points 210 collapses downward and the kickstand portion 110 flattens down in-line with the holder portion 108. Accordingly, in the collapsed configuration 202, the holder portion 108, input device portion 106, and kickstand portion 110 are folded together into a common plane and flush one to another such that interior and exterior surfaces of the shell cover formed in the collapsed configuration 202 are substantially flat and planar. A transition back the open configuration involves rotation of the input device portion 106 and kickstand portion 110 opposite of the directions illustrated in the example of FIG. 2.

Figure 3:
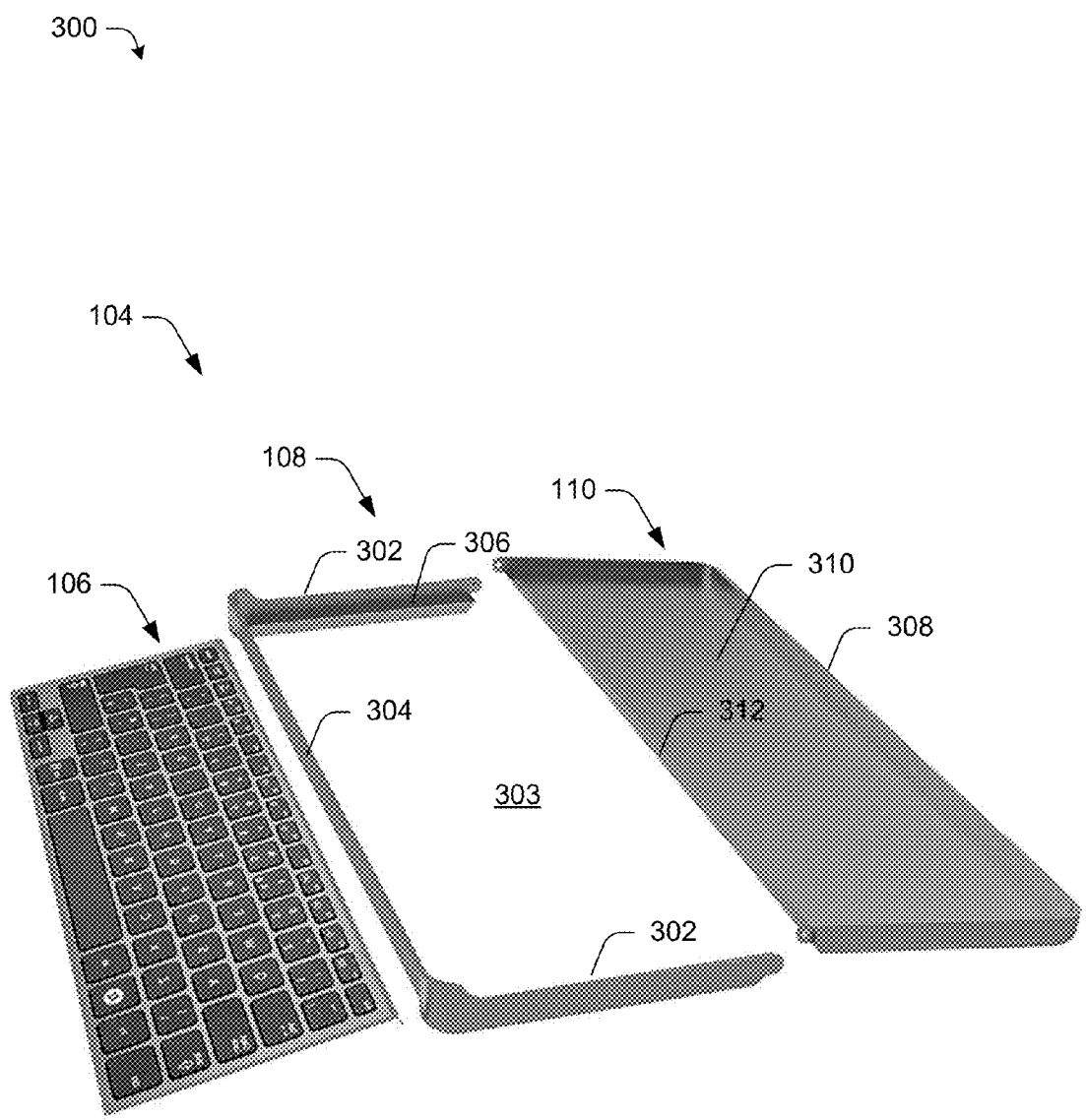
FIG. 3 depicts an exploded view of the apparatus showing aspects of the input device portion, holder portion, and kickstand portion in greater detail.

FIG. 3 depicts generally at 300 an exploded view of the apparatus 104 showing aspects of the input device portion 106, holder portion 108, and kickstand portion 110 in greater detail. As noted, the input device portion 106 and kickstand portion 110 may be rotatably attached to the holder portion 108. In an implementation, either of both of the input device portion 106 and kickstand portion 110 may be removably attached. In the case of the input device portion 106 for instance, the input device portion 106 may be detached from the holder portion 108 to enable wireless use of the input device portion when removed. The input device portion 106 may then be reattached to the holder portion 108 for use in the open configuration and to enable the collapsed configuration. The input device portion 106 may have a rectangular shape as shown, although other configurations are also contemplated.

The holder portion 108 as shown in FIG. 3 may be configured as a frame that includes edge members 302 separated by open interior space 303 and at least one cross beam member 304 that spans the open interior space 303 and connects the edge members 302. The cross beam member 304 is designed to support the computing device 102 along a bottom edge when inserted into the holder in the open configuration and restrict the computing device from sliding out of the holder toward the front of the apparatus in the direction of the input device/keyboard. Here, the holder portion 108 is illustrated as a three-sided frame that include a pair of edge members connected by a cross beam member 304 on one side and open on an opposing side. Alternatively, another additional cross beam member may be employed on the opposing side in some implementations to form a complete four-sided frame component. Each of the edge members 302 may include a lip portion 306 that extends along the length of the edge member. The lip portions 306 provide support for the computing device in the open configuration and may act as rails to facilitate slidable insertion of a computing device into and out of the holder portion 108. In one or more implementations, the lip portions can form an "L" shaped ridge to slidingly receive the input device, from a friction mount to "snap in" the input device, form a loose alignment and/or stabilizer to loosely receive the input, or any other suitable form of connection The lip portions 306 also form part of the interior and exterior surfaces of the shell cover in the collapsed configuration. If an additional cross beam member is employed, the additional cross beam member may be arranged perpendicularly to the depicted cross beam member 304 and in a plane flush with the interior surface of the lip portions 306 so as not to interfere with insertion of a computing device into the holder.

The kickstand portion 110 as shown in FIG. 3 is configured as a partial tray or shell. In particular, the kickstand portion 110 has raised edges 308 on three sides surrounding an interior planar surface 310. The kickstand portion 110 additionally includes a leading edge 312 that a back side of the computing device may rest upon for support when the kickstand portion 110 is rotated to a support position for the open configuration, as mentioned previously.

When attached together and arranged flat, the holder portion 108 and the kickstand portion 110 form a perimeter of raised edges for the shell cover or in other words a complete frame. In this arrangement, the interior planar surface 310 of the kickstand portion 110 and the interior surface of the lip portions 306 are substantially flush to each other in a common plane. This combination of just the holder portion 108 and the kickstand portion 110 still includes the open interior space 303 and thus would create an incomplete shell cover.

However, the input device portion 106 is designed to fill the open interior space 303 in the collapsed configuration. In other words, the shape of the input device portion 106 corresponds to shape of the open interior space 303 such that a complete shell cover is formed in the collapsed configuration. A surface of the input device portion 106 that ends up in the interior of the shell cover is also aligned with the interior planar surface 310 of the kickstand portion 110 and the interior surface of the lip portions 306 in a common plane to form a planar surface on the interior of the shell cover. Taken together, the combination of the input device portion 106 and the holder portion 108 also form a partial tray or shell that is designed to mesh with and complement the partial tray or shell of the kickstand portion 110 to form the completed shell. In an implementation, the kickstand portion 110 and the combination of the input device portion 106 and the holder portion 108 each provide approximately half of the shell cover, although other variations may use different complementary splits for partial components of a shell cover.

An exterior of the shell cover that is formed in the collapsed configuration may also be planar and substantially flat. In one approach, keys and/or other input mechanisms of the input device portion 106 are configured to retract into a body of the input device portion 106 to form a smooth surface and/or deactivate, thereby preventing unintended input when the input device portion 106 is rotated inward to fill the open interior space 303. This may be accomplished using a mechanical switch, an electrical sensor, a combination of switches and sensors, or other mechanism/devices to detect the rotation and trigger the retraction and/or deactivation. When the input device portion 106 is rotated back to an input position in the open configuration, the keys and/or other input mechanisms may pop-out or otherwise be re-exposed and activated to enable input interaction.

For example, the input device portion 106 may be configured as a keyboard having a plurality of mechanical keys. The plurality of mechanical keys are configured to retract into a body of the keyboard in the collapsed configuration to form a flat surface for an exterior of a shell cover and then pop-out of the body of the keyboard to enable input interaction in the open configuration. In this way, a flat and smooth surface for the exterior of the shell cover may be achieved in the collapsed configuration. The mechanical keys may also be activated in the open configuration and de-activated in the collapsed configuration.

In addition or alternatively, non-retractable input mechanisms may be employed using any or a combination of electrical and mechanical devices or implementations. In this case, the non-retractable input mechanisms may still be activated and de-activated in the open and collapsed configurations respectively, responsive to rotation of the input device portion to assume the different configurations.

Figure 4:
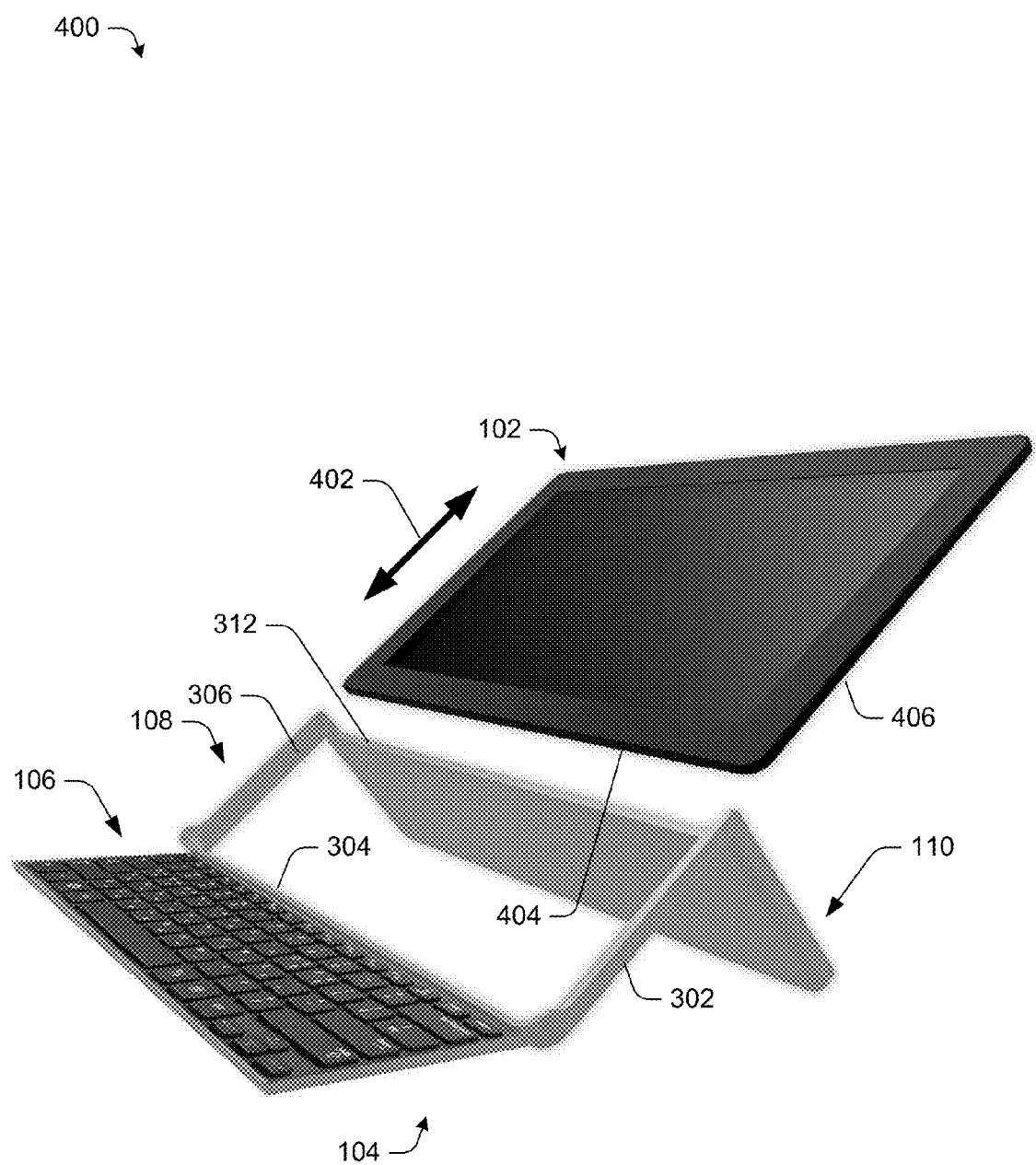
FIG. 4 depicts generally at an illustration of insertion and removal of a computing device into the apparatus.

FIG. 4 depicts generally at 400 an illustration of insertion and removal of a computing device into the apparatus 104. In particular, when the apparatus is in the open configuration, a computing device 102 may be removably inserted into or taken out of the holder portion 108 as represented by the arrow 402. One way this may occur is by sliding the computing device 102 along the edge members 306 of the holder and over the leading edge 312 of the kickstand 110. In addition or alternatively, the holder portion 108 may be configured to enable a computing device to snap-in and snap-out of the holder.

When the computing device 102 is inserted, the cross beam member 304 supports the computing device 102 along a bottom edge 404 and restricts the computing device from moving downward. The edge members 302 secure the computing devices along corresponding side edges 406 and may restrict lateral movement. The leading edge 312 supports the device on the back side of the computing device. In an embodiment, a support angle formed between the kickstand 110 and the holder portion 108 is about ninety degrees in the open configuration. Accordingly, the kickstand 110 may provide angular support the computing device 102.

Figure 5:
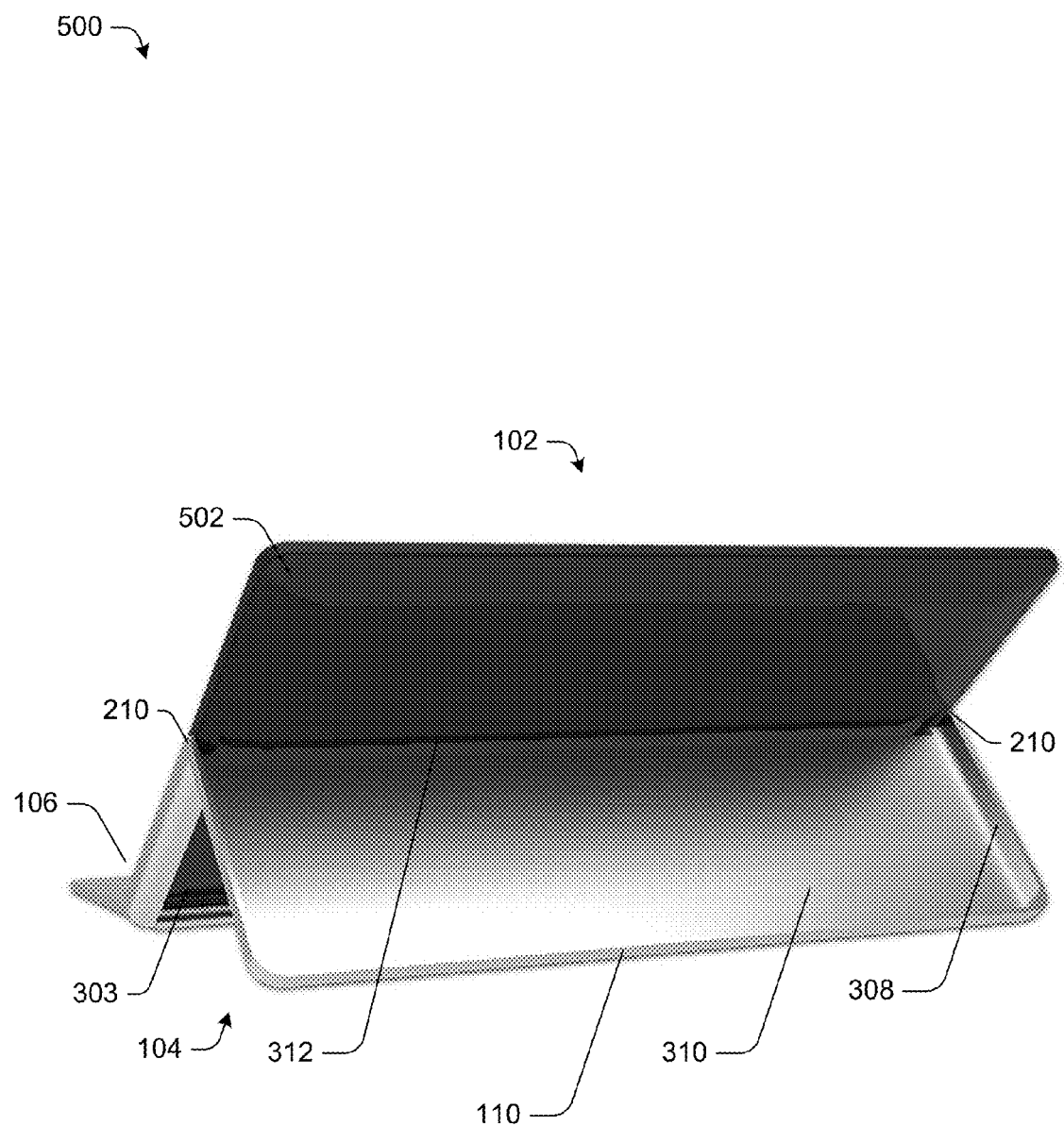
FIG. 5 depicts a back view of a system having the apparatus with a computing device inserted into the apparatus in the open configuration.

FIG. 5 depicts generally at 500 a back view of a system having the apparatus 104 with a computing device 102 inserted into the apparatus in the open configuration. In this view, a back side 502 of the computing device 102 is shown. Note that the back side 502 is supported by the kickstand portion 110 and in particular by the leading edge 312. Additionally, the tray or shell shape of the kickstand portion 110 having the raised edges 308 and interior surface planar 310 is exposed in the depicted example. Further, attachment of the kickstand portion 110 at pivot points 210 is shown.

Observe that the partial tray or shell of the kickstand portion may rotate upward via the pivot points 210 such that the portion of the computing device 102 that extends over the leading edge 312 fits within the interior of the partial tray or shell. Additionally, the input device portion 106 (a portion of which is shown) may be rotated down and around to fill the open interior space 303 (a portion of which is shown) associated with the holder portion 108 in the manner described previously to form the collapsed configuration. In this arrangement, the shell cover may be attached on the back side 502 of the device and the display device 103 may be exposed on the front side for interaction in a tablet-mode without the use of the input device portion 106. Of course the computing device 102 may also be removed from the apparatus 104, turned around, and inserted with the display device first into the shell cover for protection of the display device 103, such as when the computing device is being transported and/or is not being used.

Figure 6:
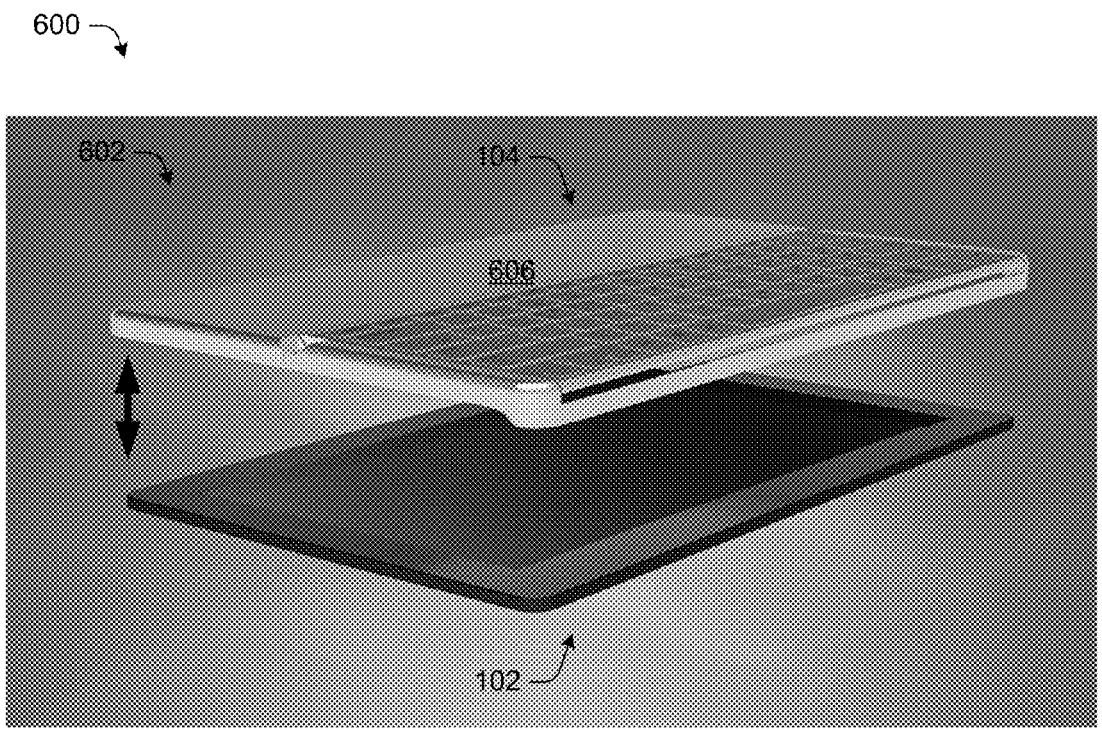
FIG. 6 depicts views of using an apparatus as a cover to protect a computing device.
Figure 6:
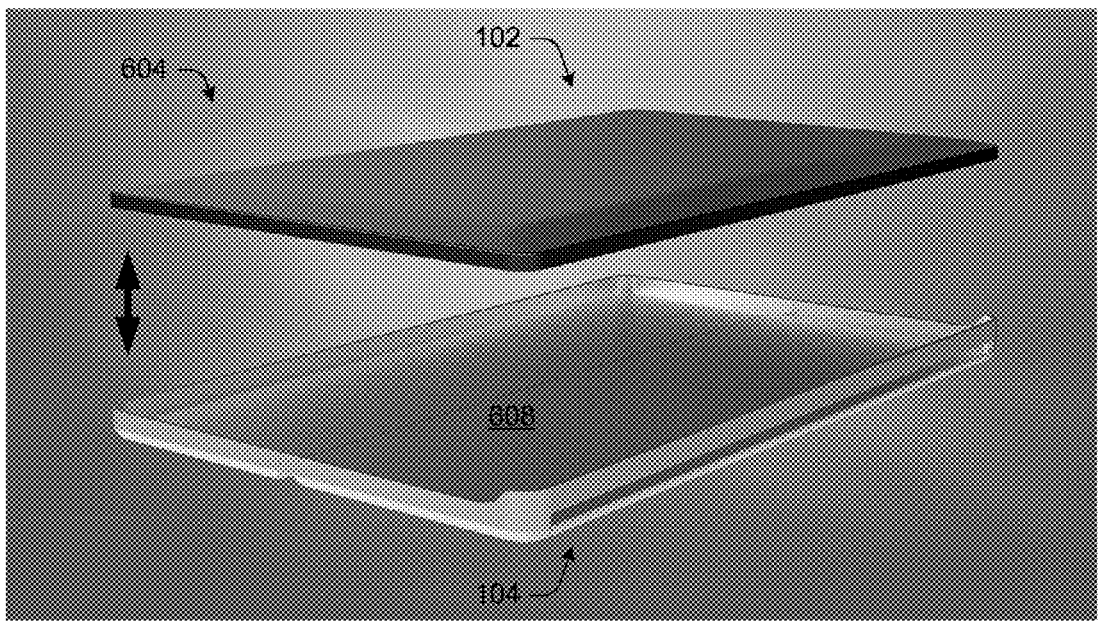

FIG. 6 depicts generally at 600 views 602 and 604 of using an apparatus 104 as a cover to protect a computing device 102. As noted the apparatus in the collapsed configuration may form a shell cover that as illustrated has a substantially flat exterior surface 606 that is formed by the input device portion, holder portion, and kickstand portion being folder together. In view 602, the apparatus 104 in the collapsed configuration is shown as being fitted over a computing device 102. Alternatively, the computing device 102 may be inserted within a cavity of the shell cover formed by the apparatus 104. Keys of a keyboard and/or other mechanical features of an input device may retract in the collapsed configuration as is represented for the flat exterior surface 606 and was discussed previously. View 604 is an inverted view of the view 602 that shows a substantially flat interior surface 608 for the shell cover into which the computing device 102 is received. Here, the input device portion, holder portion, and kickstand portion align in a common plane to form the flat interior surface 608.

Figure 7:
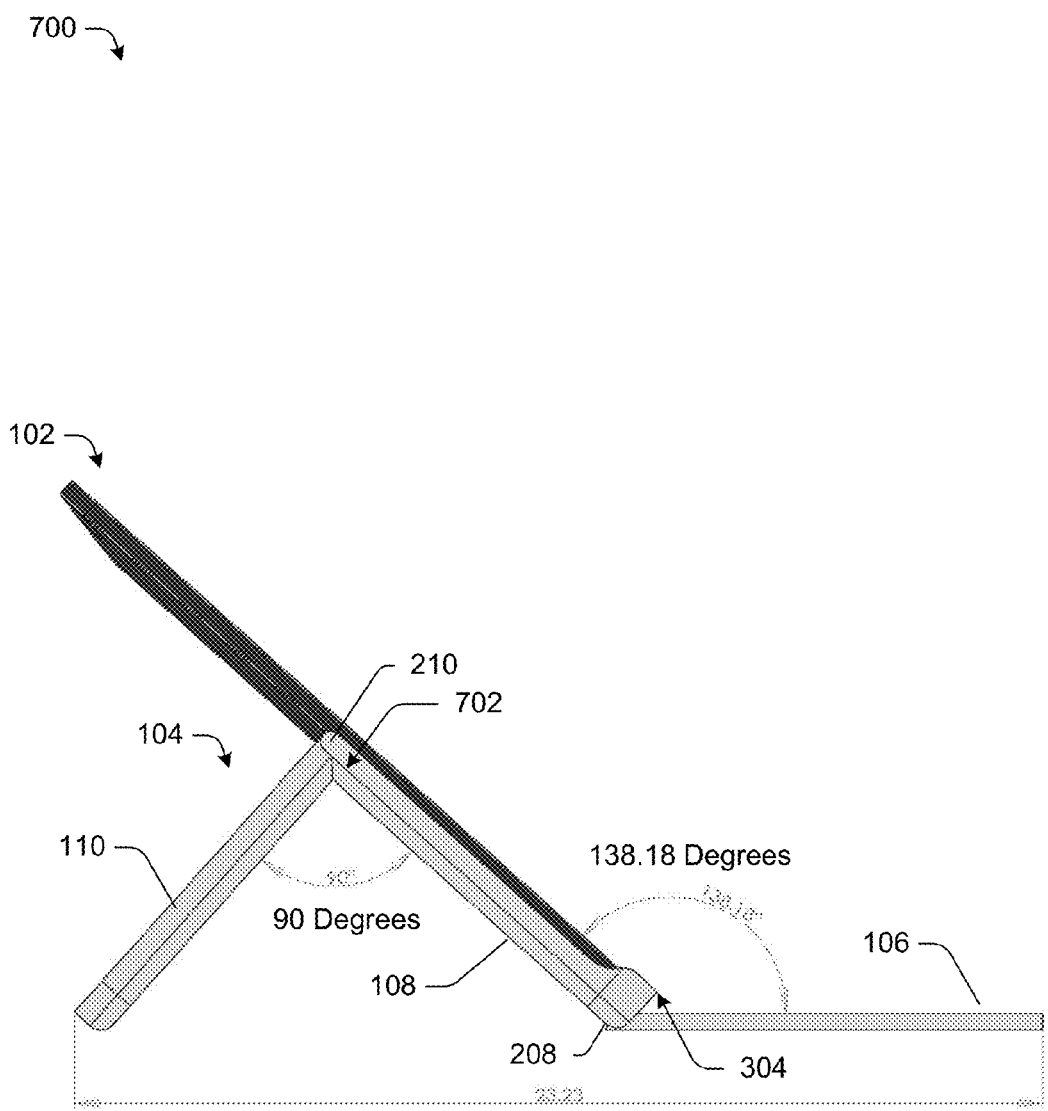
FIG. 7 depicts a side view of a system in an example implementation having the apparatus with a computing device inserted into the apparatus in the open configuration.

FIG. 7 depicts generally at 700 a side view of a system in an example implementation having the apparatus 104 with a computing device 102 inserted into the apparatus in the open configuration. In the depicted implementation, the kickstand portion 110 is rotated at a support angle of approximately ninety degrees relative to the holder portion 108 via the pivot point 210. In one approach the kickstand portion 110 and holder portion 108 may both have beveled edges that are configured to meet to form the support angle as shown at 702. For example, at least portions of leading edge that aligns with edge members 302 may be beveled. Likewise ends of the edge members 302 or lips 306 of the holder may have a complementary bevel such that the bevels couple one to another in open configuration to form the designated support angle. The coupling of the beveled edges in the open configuration produces a self-supporting support structure for supporting the computing device and the apparatus itself. For a ninety degree support angle, forty-five degree bevels may be employed for opposing edges. Although an angle of approximately ninety degrees is depicted, other support angles may be used in some scenarios. The opposing bevels when rotated together prevent over-rotation and produce the supporting structure for the apparatus 104. In an implementation a fastening mechanism such as a magnetic closure device, spring pins, hook and loop fasteners, and so forth may be employed to couple opposing bevels together and thereby increase an amount of force applied to de-couple the closure and collapse the apparatus. This may prevent the apparatus from collapsing unexpectedly and/or under the influence of relatively small applied force.

The example of FIG. 7 additionally depicts the computing device 102 and holder portion 108 as being supported by the kickstand portion 110 at a viewing angle of approximately one-hundred and thirty eight point one eight degrees relative to the input device portion 106 and/or a surface upon which the apparatus is placed. Again, different arrangements may achieve different support angles and viewing angles for different use scenarios. Additionally, an apparatus may support multiple different viewing modes in which the kickstand portion 110 may assume multiple "open" positions thereby creating multiple viewing options. For example, the kickstand portion 110 may be configured to support the holder portion 108 and computing device 102 at multiple different support positions for viewing angles in a range of ninety to one-hundred and eighty degrees.

The curved or cupped shape or any appropriate shape such as an "L" shape may be designed to extend slightly over a bottom edge of the device being supported to securely (or in some cases loosely) hold the device and made it less likely that the device will flip out of the holder portion 108 when in either or both of the open position and the closed position.

The side view of FIG. 7 additionally shows the cross beam member 304 as having a curved or cupped shape. The curved or cupped shape (or any other appropriate shape such as an "L" shape) may be designed to extend slightly over a bottom edge of the device being supported to securely (or in some cases loosely) hold the device and make it less likely that the device will flip out of the holder portion 108, when in either or both of the open position and the closed position.

Although not shown, the cross beam member 304 may include a connection interface (e.g., a multi-pin slot, adapter, or other connector) designed to create a communicative and physical coupling (e.g. a wired connection) to the computing device 102 when inserted into the apparatus. The connection interface may be configured to mate with a complementary interface or connector of the computing device 102. The connection interface portion may additionally create a communicative and physical coupling to the input device portion 106. Accordingly, data, input, commands, messages, power between batteries or power supplies of components, and so forth may be exchanged between the computing device 102 and the input device portion 106 via the connection interface. Wireless connections may also be employed in addition or in lieu of wired connections.

Figure 8:
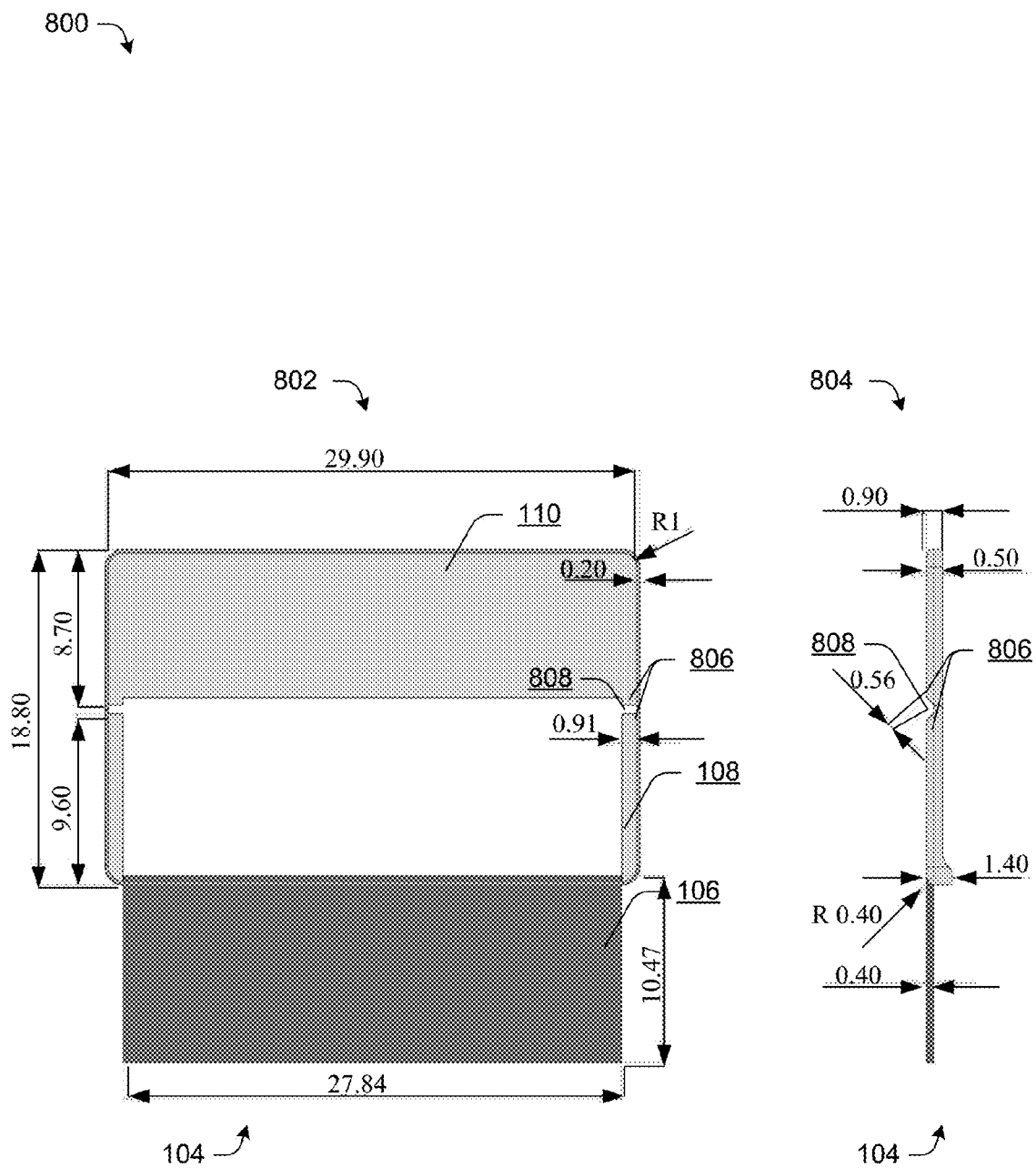
FIG. 8 depicts an example implementation showing an overhead view and a side view of an example apparatus with the kickstand portion collapsed and the input device portion arranged in an input position.

FIG. 8 depicts generally at 800 an example implementation showing an overhead view 802 and a side view 804 of an example apparatus with the kickstand portion 110 collapsed and the input device portion arranged in an input position (e.g., extending out from the holder portion 108). In this example, beveled edge portions 806 associated with the kickstand portion 110 and the holder portion 108 are visible. With the kickstand portion 110 collapsed and arranged in-line with the holder portion 108 in a common plane, the beveled edge portions 806 result in gaps 808 or notches being formed at the pivot points where the kickstand portion 110 is attached to the holder portion 108. When the kickstand portion 110 is rotated into a support position, the gaps 808 close together to form the support angle and thereby define the viewing angle in the manner previously described.

The coupling of the beveled edge portions 806 in the open configuration produces a self-supporting support structure for supporting the computing device and the apparatus itself.

Figure 9:
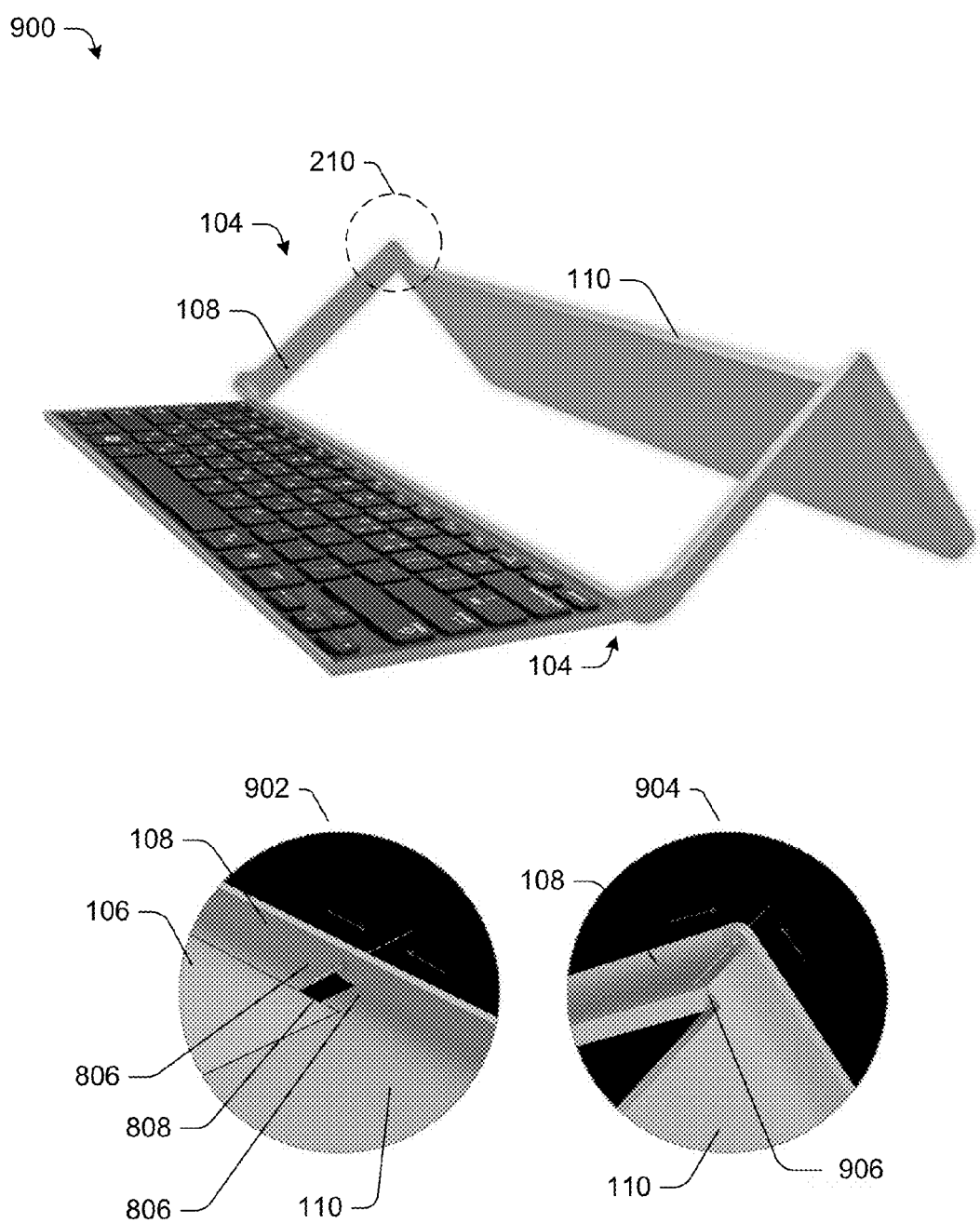
FIG. 9 depicts close up views of beveled portions and gaps described in relation to FIG. 8.

For example, FIG. 9 depicts generally at 900 close up views of the beveled edge portions 806 and gaps 808 described in relation to FIG. 8. In particular, a close-up view 902 of an example pivot point 210 is shown that corresponds to a collapsed configuration of the apparatus 104. As noted, the pivot point 210 may be implemented in various ways such as using hinges, pins, snap-in connection, spring mechanisms, and other devices suitable to establish rotatable connections. In the depicted example, the pivot point 210 is formed by a circular indent or hole associated with the kickstand portion 110 that fits around a complementary protrusion (e.g., a cylindrical protrusion) on the holder portion 108 and is able to rotate around a center axis of the protrusion. Naturally, the arrangement may be reversed such that the protrusion is disposed on the kickstand portion 110 and a complementary circular indent or hole is disposed on the holder portion 108. Moreover, various other hinges and connections may alternatively be employed.

In the close-up view 902, the pivot point 210 is arranged to position the kickstand portion 110 in-line with the holder portion 108 in a common plane. The input device portion 106 is additionally visible in this view as being rotated into the open interior space 303 of the holder portion 108 so as to form a substantially flat interior surface 608 for a shell cover as previously discussed. Opposing beveled edge portions 806 for the holder portion 108 and kickstand portion 110 are also shown along with a corresponding gap 808.

The close-up view 904 of the example pivot point 210 corresponds to an open configuration of the apparatus 104. In the close-up view 904, the pivot point 210 is arranged to position the kickstand portion 110 in a support position at a designated support angle relative to the holder portion 108. Here, the beveled edge portions 806 are coupled together and the gap is closed as shown at 906 to form the self-supporting structure as previously discussed.

Figure 10:
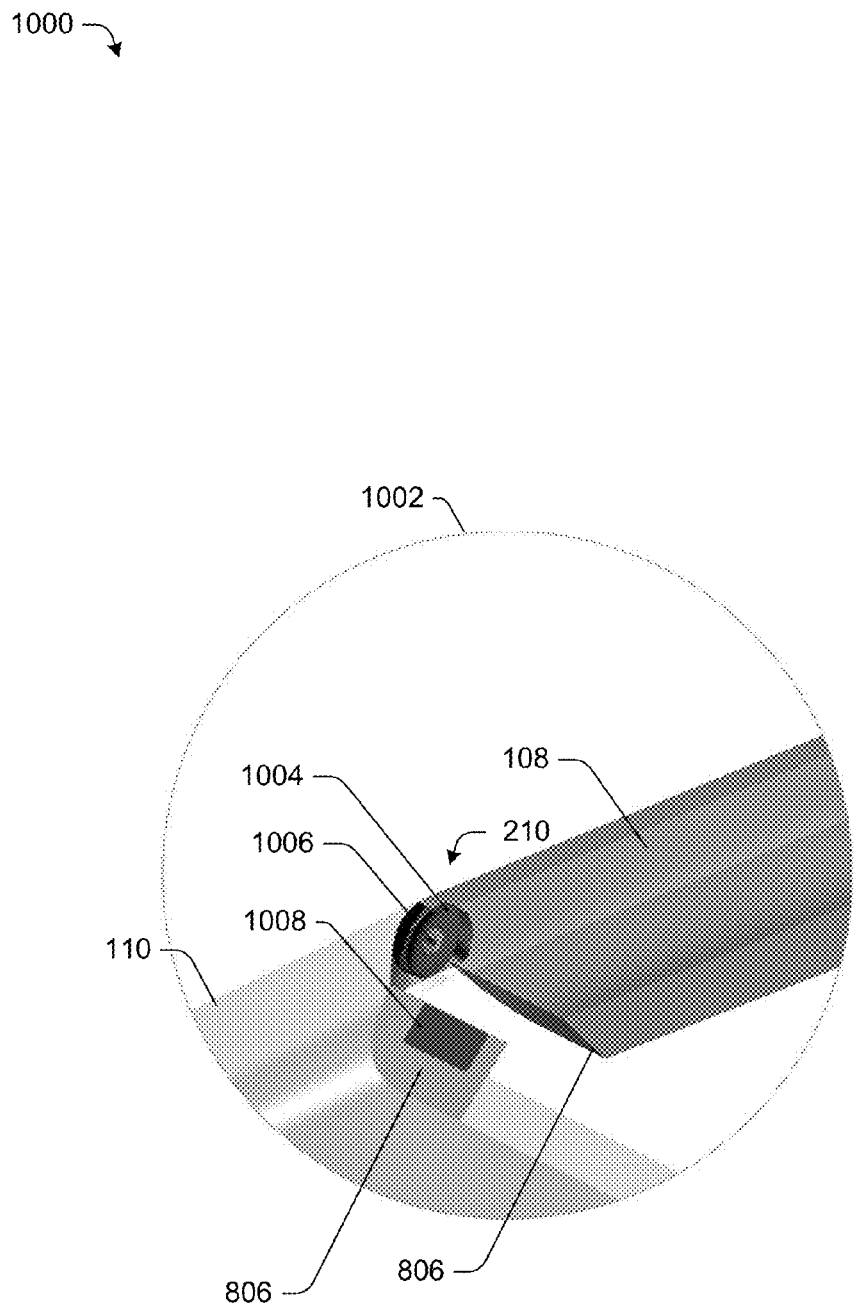
FIG. 10 depicts another close-up view of an example pivot point.

FIG. 10 depicts generally at 1000 another close-up view 1002 of an example pivot point 210. In the close-up view 1002, the example pivot point 210 is illustrated as being formed by a circular indent or hole 1004 that fits around a cylindrical protrusion 1006 as discussed previously. Naturally, a comparable pivot point 210 may be formed on an opposing side of the apparatus 104 also as represented in FIG. 2. A variety of other mechanisms are also contemplated, such as use of a flexible hinge.

In addition, the close-up view 1002 represents the use of a fastening mechanism 1008 in connection with beveled edges 806. A noted, the fastening mechanism 1008 is employed to securely couple opposing bevels together and thereby increase an amount of force applied to break the closure (e.g., decouple) and collapse the apparatus. In the depicted example, the fastening mechanism 1008 is configured as a magnetic closure device embedded within a bevel of the kickstand portion 110 that may magnetically couple the bevel the corresponding bevel of the holder device. Other types of fastening mechanism 1008 are contemplated as noted previously. Further, the use of the fastening mechanism 1008 may be omitted altogether in one or more implementations.

Figure 11:
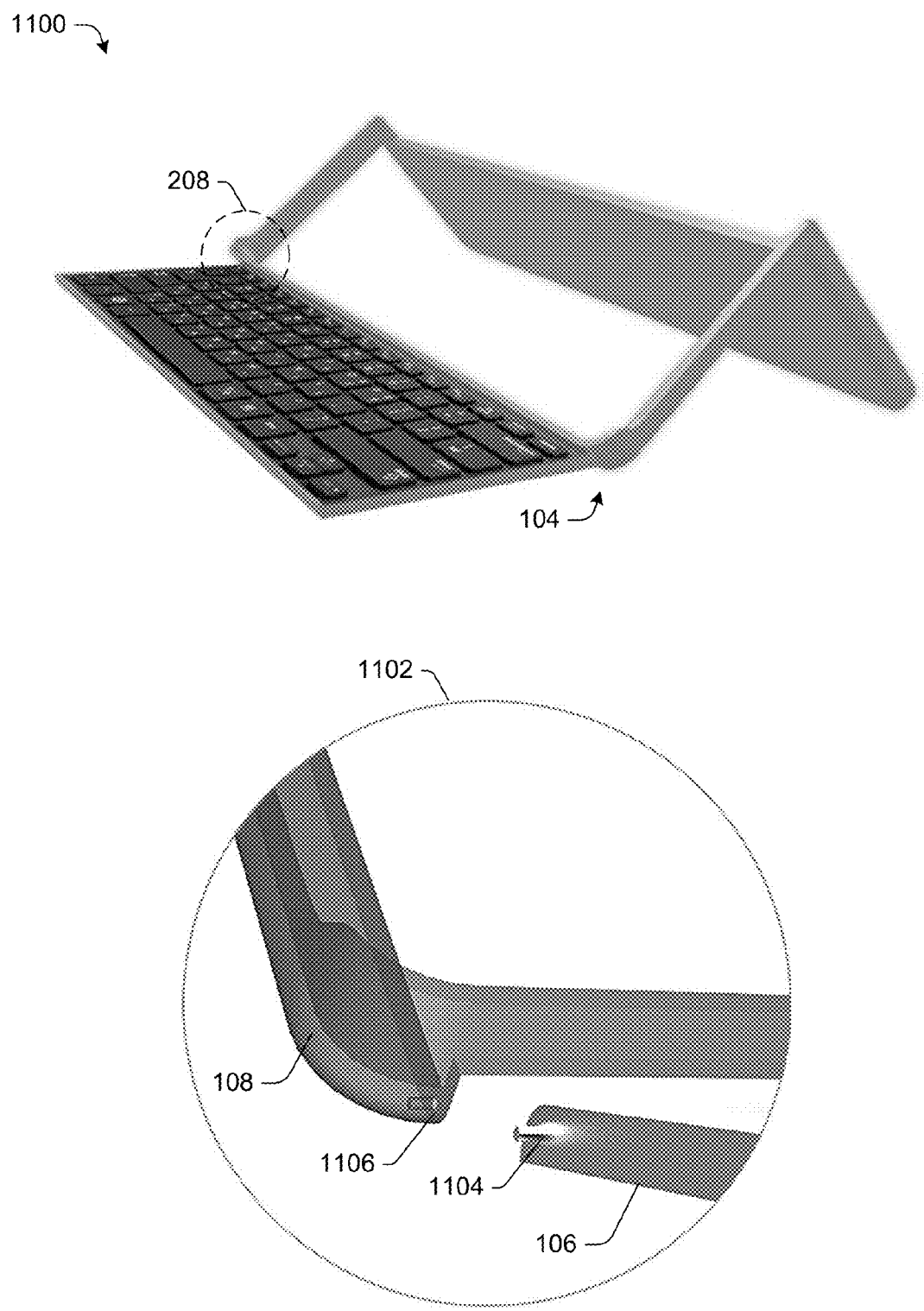
FIG. 11 depicts a close-up view of an example pivot point that may be employed to secure an input device portion to a holder portion.

FIG. 11 depicts generally at 1100 a close-up view 1102 of an example pivot point 208 that may be employed to secure an input device portion 106 to a holder portion 108 in one or more implementations. The pivot point 208 may be implemented in various way to establish a rotatable attachment of the input device portion 106 to the holder portion 108. Additionally, the pivot point 208 may be configured to enable a removable attachment such that the input device portion 106 may be detached and reattached to the holder portion 108 for different interaction scenarios and configurations of the apparatus 104. In one or more implementations, the input device portion 106 may also be reversibly attached. For example, an input device portion may be attached such that the keys side of a keyboard faces out for interaction with a device in an open configuration. Then, the keyboard may be removed and re-attached with the key side face down, such that the keys end up positioned towards the interior of the shell cover when the collapsed configuration described herein is assumed. In this arrangement, the keys and/or other input functionality of the input device portion 106 are also protected and the functionality is deactivated and inaccessible, which prevent inadvertent and unintentional input from occurring.

In the example shown in FIG. 11, the pivot point 208 is formed using spring loaded pins 1104 disposed on the edge of the input device portion 106 that are received into a complementary orifices 1106 of the holder portion 108. Naturally, comparable pivot points 208 may be formed on two opposing sides of the apparatus 104 as represented in FIG. 2. The spring loaded pins 1104 may be configured to snap-in and out of corresponding orifices to removably and/or reversibly attach the input device portion 106 to the holder portion 108. A variety of other mechanisms are also contemplated, such as use of a flexible hinge.

Example Computing Device

Figure 12:
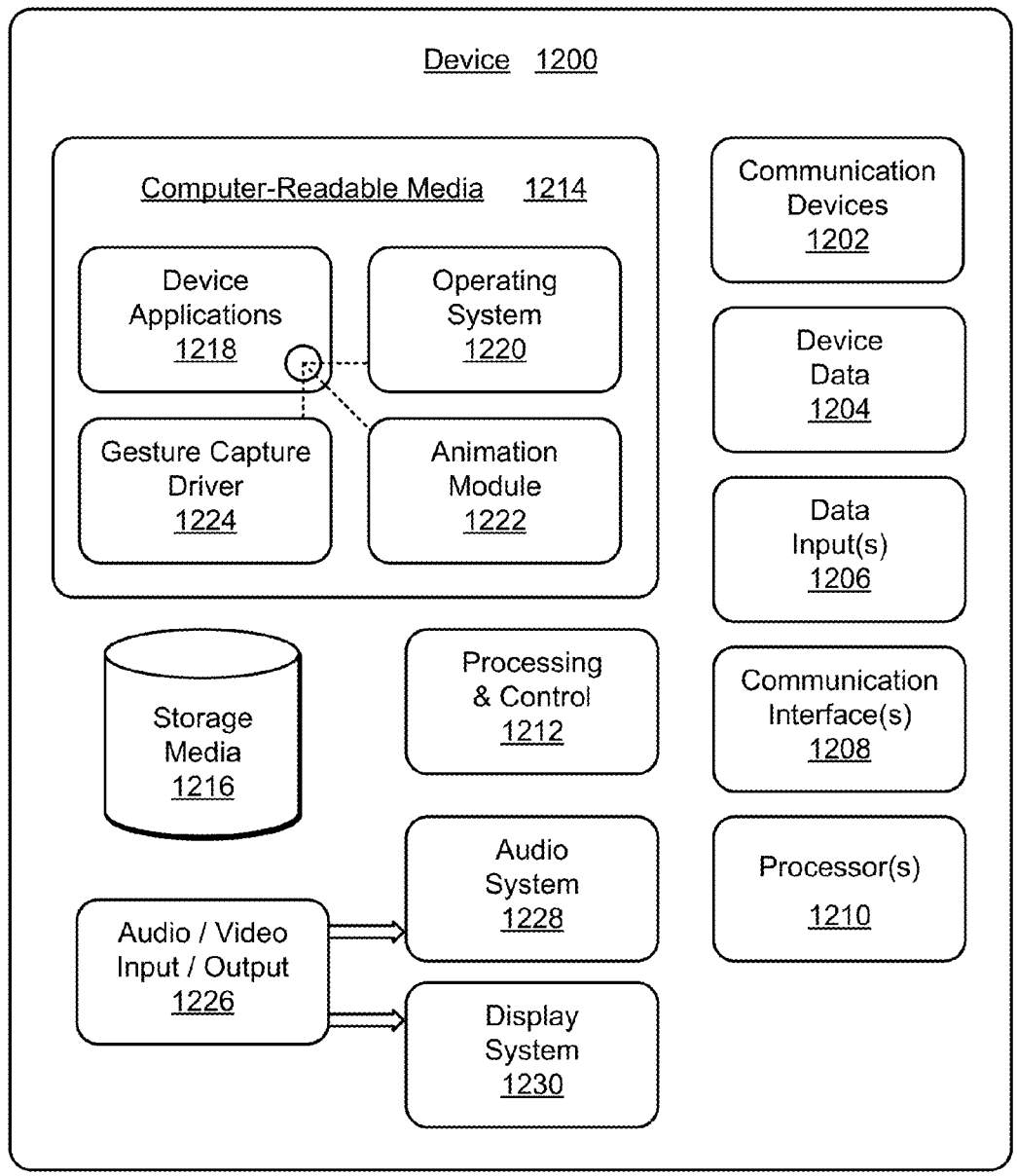
FIG. 12 illustrates an example system including various components of an example device that can be implemented as any type of computing device as described with reference to FIGS. 1-11 to implement embodiments of the techniques described herein.

FIG. 12 illustrates various components of an example device 1200 that can be implemented as any type of portable and/or computer device as described with reference to FIGS. 1-11 to implement embodiments of the cover techniques described herein. Device 1200 includes communication devices 1202 that enable wired and/or wireless communication of device data 1204 (e.g., received data, data that is being received, data scheduled for broadcast, data packets of the data, etc.). The device data 1204 or other device content can include configuration settings of the device, media content stored on the device, and/or information associated with a user of the device. Media content stored on device 1200 can include any type of audio, video, and/or image data. Device 1200 includes one or more data inputs 1206 via which any type of data, media content, and/or inputs can be received, such as user-selectable inputs, messages, music, television media content, recorded video content, and any other type of audio, video, and/or image data received from any content and/or data source.

Device 1200 also includes communication interfaces 1208 that can be implemented as any one or more of a serial and/or parallel interface, a wireless interface, any type of network interface, a modem, and as any other type of communication interface. The communication interfaces 1208 provide a connection and/or communication links between device 1200 and a communication network by which other electronic, computing, and communication devices communicate data with device 1200.

Device 1200 includes one or more processors 1210 (e.g., any of microprocessors, controllers, and the like) which process various computer-executable instructions to control the operation of device 1200 and to implement embodiments of a touch pull-in gesture. Alternatively or in addition, device 1200 can be implemented with any one or combination of hardware, firmware, or fixed logic circuitry that is implemented in connection with processing and control circuits which are generally identified at 1212. Although not shown, device 1200 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1200 also includes computer-readable media 1214, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1200 can also include a mass storage media device 1216.

Computer-readable media 1214 provides data storage mechanisms to store the device data 1204, as well as various device applications 1218 and any other types of information and/or data related to operational aspects of device 1200. For example, an operating system 1220 can be maintained as a computer application with the computer-readable media 1214 and executed on processors 1210. The device applications 1218 can include a device manager (e.g., a control application, software application, signal processing and control module, code that is native to a particular device, a hardware abstraction layer for a particular device, etc.). The device applications 1218 also include any system components or modules to implement embodiments of the gesture techniques described herein. In this example, the device applications 1218 include an interface application 1222 and an input module 1224 (which may be the same or different as input module 114) that are shown as software modules and/or computer applications. The input module 1224 is representative of software that is used to provide an interface with a device configured to capture inputs, such as a touchscreen, track pad, camera, and so on. Alternatively or in addition, the interface application 1222 and the input module 1224 can be implemented as hardware, software, firmware, or any combination thereof. Additionally, the input module 1224 may be configured to support multiple input devices, such as separate devices to capture touch and stylus inputs, respectively. For example, the device may be configured to include dual display devices, in which one of the display device is configured to capture touch inputs while the other stylus inputs.

Device 1200 also includes an audio and/or video input-output system 1226 that provides audio data to an audio system 1228 and/or provides video data to a display system 1230. The audio system 1228 and/or the display system 1230 can include any devices that process, display, and/or otherwise render audio, video, and image data. Video signals and audio signals can be communicated from device 1200 to an audio device and/or to a display device via an RF (radio frequency) link, S-video link, composite video link, component video link, DVI (digital video interface), analog audio connection, or other similar communication link. In an embodiment, the audio system 1228 and/or the display system 1230 are implemented as external components to device 1200. Alternatively, the audio system 1228 and/or the display system 1230 are implemented as integrated components of example device 1200.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. An apparatus comprising:
    a holder portion configured to receive a computing device having a slate form factor between edge members to support the computing device;
    an input device portion and kickstand portion rotatably secured to the holder portion, the kickstand portion configured as a partial tray having raised edges on three sides surrounding an interior planar surface, the input device portion and kickstand portion configured to rotate relative to the holder position such that the apparatus is configured to assume:
        an open configuration in which the holder portion is positioned at viewing angle for viewing of a display device of the computing device when received into the holder portion, the kickstand portion is rotated to a support position at a rear of the holder portion that opposes a front of the holder portion configured to receive the computing device such that the kickstand portion is arranged to support the holder portion and computing device at the viewing angle, and the input device portion is rotated to an input position that extends outward from the front of the holder portion configured to receive the computing device such that input device portion is arranged to lay flat in front of the display device when placed on a surface; and
        a collapsed configuration in which the holder portion, input device portion, and kickstand portion are aligned in a common plane to form a shell cover for protection of the computing device that corresponds to a shape of the computing device.

2. An apparatus as described in claim 1, wherein the holder portion is configured to form a communicative and physical coupling to the computing device when inserted into the apparatus.

3. An apparatus as described in claim 1, wherein the holder portion is configured as a frame with a pair of the edge members connected by a cross beam on one side and open on an opposing side.

4. An apparatus as described in claim 3, wherein the input device portion is configured to fill open space between the pair of the edge members in the collapsed configuration to form a portion of the shell cover in combination with the holder portion.

5. An apparatus as described in claim 1, wherein the kickstand portion is configured to support the holder portion and computing device at multiple different support positions in which the viewing angle is in a range of about ninety to one-hundred and eighty degrees.

6. An apparatus as described in claim 1, wherein a combination of the kickstand portion and the holder portion forms a perimeter of raised edges for the shell cover in the collapsed configuration.

7. An apparatus as described in claim 1, wherein the input device portion is removably attached to the holder portion to enable wireless use of the input device portion when removed.

8. An apparatus as described in claim 1, wherein the kickstand portion and holder portion include beveled edges configured to couple when the kickstand portion is rotated to a support position in the open configuration to form a support angle between the kickstand portion and the holder portion.

9. An apparatus as described in claim 8, wherein the beveled edges are coupled together in the open configuration using a magnetic closure device.

10. An apparatus as described in claim 1, wherein the input device portion and kickstand portion are rotatably secured at opposing ends of the edge members of the holder portion.

11. An apparatus as described in claim 1, wherein the input device portion comprises a keyboard.

12. An apparatus as described in claim 1, wherein input functionality associated with the input device portion is deactivated in the collapsed configuration and activated to enable input interaction in the open configuration.

13. A collapsible shell cover for a computing device comprising a holder portion, and an input device portion and kickstand portion both rotatably secured to the holder portion, the kickstand portion configured as a partial tray having raised edges on three sides surrounding an interior planar surface, such that the collapsible shell cover is manipulable to assume:
    a collapsed configuration in which a combination of the holder portion and input device portion and kickstand portion are aligned in a common plane to form a shell cover for protection of the computing device configured to receive the computing device in a cavity on an interior of the shell cover; and
    an open configuration in which the kickstand portion is rotated to support the holder portion and the computing device inserted into the holder portion at a viewing angle and the input device portion is rotated to an input position that extends outward from a front of the holder portion to facilitate input via the input device portion, the holder portion having a frame including edge members having lip portions configured to receive the computing device and support the computing device along side edges of the computing device and a cross beam member configured to connect the edge members and support the computing device along a bottom edge.

14. A collapsible shell cover as described in claim 13, wherein the input device portion includes a keyboard or a track pad.

15. A collapsible shell cover as described in claim 13, wherein the shell cover formed by the holder portion, input device portion, and kickstand portion in the collapsed configuration is configured to have a tray shape with a perimeter of raised edges surrounding a planar surface that corresponds to a shape of the computing device.

16. A collapsible shell cover as described in claim 13, wherein the holder portion is configured to form a communicative and physical coupling to the computing device when inserted into the holder portion.

17. A system comprising:
    a computing device having a slate form factor; and
    a collapsible shell cover to receive the computing device including a holder portion, and an input device portion and kickstand portion both rotatably secured to the holder portion, the kickstand portion configured as a partial tray having raised edges on three sides surrounding an interior planar surface, such that the collapsible shell cover is manipulable to assume multiple configurations including:
        a collapsed configuration in which a combination of the holder portion and input device portion and kickstand portion each form partial portions of a shell cover for protection of the computing device that corresponds to a shape of the computing device so as to receive the computing device in a cavity on an interior of the shell cover; and an open configuration in which the kickstand portion is rotated to support the holder portion and the computing device inserted into the holder portion at a viewing angle and the input device portion is rotated to an input position that extends outward from a front of the holder portion to facilitate input via the input device portion, the holder portion having a frame including edge members configured to enable slidable insertion of the computing device into the holder portion and a cross beam member configured to connect the edge members and support the computing device along a bottom edge.

18. A system as described in claim 17, wherein the partial portions each comprise approximately half of the shell cover, which when arranged in the collapsed configuration form a tray shape having the cavity on an interior of the shell cover surrounded by raised edges around a perimeter of the shell cover.

19. A system as described in claim 17, wherein the input device portion is configured as a keyboard having a plurality of mechanical keys, the plurality of mechanical keys configured to retract into a body of the keyboard in the collapsed configuration to form a flat surface for an exterior of the shell cover and to pop-out of the body of the keyboard to enable input interaction in the open configuration.

20. A system as described in claim 17, wherein the collapsed configuration is configured such that the combination of the holder portion and input device portion is formed by rotation of the input device portion to fill interior space between the edge members.

* * * * *